United States Patent
Atkinson et al.

(10) Patent No.: US 7,441,253 B2
(45) Date of Patent: *Oct. 21, 2008

(54) METHOD AND SYSTEM FOR NAMING AND BINDING OBJECTS

(75) Inventors: Robert G. Atkinson, Woodinville, WA (US); Antony S. Williams, Redmond, WA (US); Edward Koo Jung, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 126 days.

This patent is subject to a terminal disclaimer.

(21) Appl. No.: 11/481,345

(22) Filed: Jul. 3, 2006

(65) Prior Publication Data

US 2007/0061817 A1 Mar. 15, 2007

Related U.S. Application Data

(60) Continuation of application No. 10/283,627, filed on Oct. 29, 2002, now Pat. No. 7,150,024, which is a continuation of application No. 09/867,853, filed on May 29, 2001, now Pat. No. 6,519,764, which is a continuation of application No. 08/916,999, filed on Aug. 20, 1997, now Pat. No. 6,263,379, which is a continuation of application No. 08/467,917, filed on Jun. 6, 1995, now Pat. No. 5,740,439, which is a division of application No. 08/088,724, filed on Jul. 6, 1993, now Pat. No. 5,581,760, which is a continuation-in-part of application No. 07/909,983, filed on Jul. 6, 1992, now abandoned.

(51) Int. Cl.
*G06F 13/00* (2006.01)

(52) U.S. Cl. .................. 719/331; 719/330; 719/332

(58) Field of Classification Search ................. 719/330, 719/331, 332
See application file for complete search history.

(56) References Cited

U.S. PATENT DOCUMENTS 4,674,040 A 6/1987 Barker et al.

(Continued)

FOREIGN PATENT DOCUMENTS

JP 61-156289 12/1984

(Continued)

OTHER PUBLICATIONS

Fujinami and Yokote, "Naming and Addressing of Objects Without Unique Identifiers," Proc. 12th ICDCS, Yokohama, Japan, Jun. 9-12, 1992, pp. 581-588 (1992).

(Continued)

*Primary Examiner*—Andy Ho
(74) *Attorney, Agent, or Firm*—Klarquist Sparkman, LLP

(57) ABSTRACT

A method and system for referring to and binding to objects using a moniker object is provided. In preferred embodiments a moniker object contains information to identify linked source data and provides methods through which a program can bind to the linked source data. A binding method is provided that returns an instance of an interface through which the linked source data can be accessed. In a preferred embodiment, the moniker object provides other methods including a reducing method that returns a more efficient representation of the moniker object; equality and hash methods for comparing moniker objects; and inverse, common prefix, and relative-path-to methods for comparing and locating moniker objects from other moniker objects. Several implementations of a moniker object are provided. Each implementation is a moniker class and has a class identifier that identifies code to manage the moniker class.

20 Claims, 54 Drawing Sheets

U.S. PATENT DOCUMENTS

| | | | |
|---|---|---|---|
| 4,739,477 | A | 4/1988 | Barker et al. |
| 4,815,029 | A | 3/1989 | Barker et al. |
| 4,933,880 | A | 6/1990 | Borgendale et al. |
| 4,962,475 | A | 10/1990 | Hernandez et al. |
| 5,072,412 | A | 12/1991 | Henderson, Jr. et al. |
| 5,187,786 | A | 2/1993 | Densmore et al. |
| 5,191,645 | A | 3/1993 | Carlucci et al. |
| 5,204,947 | A | 4/1993 | Bernstein et al. |
| 5,237,680 | A | 8/1993 | Adams et al. |
| 5,249,275 | A | 9/1993 | Srivastava |
| 5,274,803 | A | 12/1993 | Dubin et al. |
| 5,297,283 | A | 3/1994 | Kelly, Jr. et al. |
| 5,313,646 | A | 5/1994 | Hendricks et al. |
| 5,339,423 | A | 8/1994 | Beitel et al. |
| 5,339,424 | A | 8/1994 | Fushimi |
| 5,341,478 | A | 8/1994 | Travis, Jr. et al. |
| 5,369,766 | A | 11/1994 | Nakano et al. |
| 5,369,778 | A | 11/1994 | San Soucie et al. |
| 5,381,547 | A * | 1/1995 | Flug et al. .................. 719/331 |
| 5,408,665 | A | 4/1995 | Fitzgerald |
| 5,410,688 | A | 4/1995 | Williams et al. |
| 5,440,744 | A | 8/1995 | Jacobson et al. |
| 5,446,842 | A | 8/1995 | Schaeffer et al. |
| 5,459,865 | A | 10/1995 | Heninger et al. |
| 5,481,722 | A | 1/1996 | Skinner |
| 5,517,655 | A | 5/1996 | Collins et al. |
| 5,535,389 | A | 7/1996 | Elder et al. |
| 5,551,035 | A | 8/1996 | Arnold et al. |
| 5,805,885 | A * | 9/1998 | Leach et al. ................ 719/316 |

FOREIGN PATENT DOCUMENTS

| | | |
|---|---|---|
| JP | 02-77872 | 9/1988 |
| JP | 3191429 | 8/1991 |

OTHER PUBLICATIONS

Tony Williams, "On Inheritance: What It Means and How to Use It," 13 pp. (1990) (downloaded from the World Wide Web).

Shimizu et al., "Operating System Based on the BTRON Specifications," Microprocessors and Microsystems, vol. 13, No. 8, pp. 525-535 (1989).

"A Little History of the World Wide Web," 5 pp. [Downloaded Jul. 23, 2001.].

Berners-Lee, "World Wide Web," 9 pp. [Downloaded Aug. 30, 2001.].

Berners-Lee, "Information Management: A Proposal," 13 pp. [Downloaded Jul. 23, 2001.].

Berners-Lee et al., "WorldWideWeb: Proposal for a Hypertext Project," 7 pp. [Downloaded Jul. 23, 2001.].

Berners-Lee et al., "The WorldWideWeb Project," 12 pp. [Downloaded Jul. 23, 2001.].

Berners-Lee, "WorldWideWeb for C5," 17 pp. (May 1991). [Downloaded Aug. 30, 2001.].

Berners-Lee et al., "World Wide Web Seminar," 25 pp. [Downloaded Jul. 23, 2001.].

Berners-Lee, "HyperText91," 3 pp. [Downloaded Jul. 23, 2001.].

Berners-Lee, "What's new in '92," 2 pp. [Downloaded Aug. 30, 2001.].

Berners-Lee, "A quick look at Erwise," 2 pp. [Downloaded Aug. 30, 2001.].

Berners-Lee, "An updated quick look at ViolaWWW," 2 pp. [Downloaded Aug. 30, 2001.].

Berners-Lee, "World-Wide-Web," 40 pp. [Downloaded Aug. 30, 2001.].

Clapp, Doug, "The NeXT Application Kit, Part I: Non-Responsive Classes," *The NeXT Bible*, Brady Books, N.Y., 1990, pp. 275-280.

Daiyou and Akiyama, "Linking Windows Applications with OLE," *Nikkei Byte*, pp. 239-252 (Feb. 1992) (Japanese-language article and English-language translation).

Herzner, Wolfgang et al., "DAM—Compound Document Access and Management. An Object-Oriented Approach," Multimedia, Systems, Interaction and Applications, *Eurographics Workshop*, Apr. 1991, Stockholm, Sweden, pp. 17-36.

"History to Date," 2 pp. [Downloaded Jul. 23, 2001.].

IBM, "Creating In-Line Objects Within an Integrated Editing Environment," *IBM Technical Disclosure Bulletin*, 27(5):2962, Oct. 1984.

Kobayashi, Masaaki et al., "An Update on BTRON-specification OS Development," *IEEE Proceedings of the $8^{th}$ Tron Project Symposium*, Cat. Nr. 91TH0412-7, Nov. 1991, Tokyo, Japan, pp. 132-140.

"NeXTSTEP General Reference, vol. 1," *NeXT Publications*, Addison-Wesley Publishing Co., 1992, pp. 1-3 to 1-37, 2-5 to 2-16, 2-390 to 2-419, 2-503 to 2-507, 2-895 to 2-896, 2-986 to 2-987, 2-1045 to 2-1046.

Peterson et al., "Unix Variants," *Unix Review*, 10(4):29-31, Apr. 1992.

Pike et al., "UNIX—The Legend Evolves," *Plan 9 from Bell Labs, Proceedings of the Summer 1990 UKUUG Conference*, Jul. 9-13, 1990, Royal Lancaster Hotel, London, UK, ISBN: 0 9513181 7 9.

Pike et al., "The Use of Name Spaces in Plan 9," Operating Systems Review, 27(2):72-76, Apr. 1993, ISSN: 0163-5980.

"W3C Team Talks and Presentations," 17 pp. [Downloaded Jul. 24, 2001.].

Zdonik, Stanley B., "Object Management System Concepts," *Association for Computing Machinery*, ACM # ACM 0-89791-140-7/84/006/0013, 1984.

Zdonik, Stanley Benjamin, Jr., "Object Management System Concepts: Supporting Integrated Office Workstation Applications," Doctoral Thesis, *Massachusetts Institute of Technology*, 1983.

* cited by examiner

101 — VAC1.DOC

VAC1 PROJECT
July 1, 1990

SCHEDULE:

| | WK1 | WK2 | WK3 | WK4 | WK5 |
|---|---|---|---|---|---|
| MODULE2 | | | | | |
| MODULE1 | | | | | |
| GLOBAL | | | | | |

TABLE: SCHEDULE — 102

104

BUDGET:

| ITEM | EST $ | EXP TO DATE | DELTA | RUNNING |
|---|---|---|---|---|
| SUPPLIES | 100.00 | 50.00 | +50.00 | 50.00 |
| COMPUTERS | 4000.00 | 3895.00 | +195.00 | 3945.00 |
| MANUALS | 500.00 | 500.00 | 0.00 | 4445.00 |
| TOTAL | 5600.00 | 4445.00 | +245.00 | 4445.00 |

TABLE 2: VAC1 BUDGET — 103

*FIG. 1*

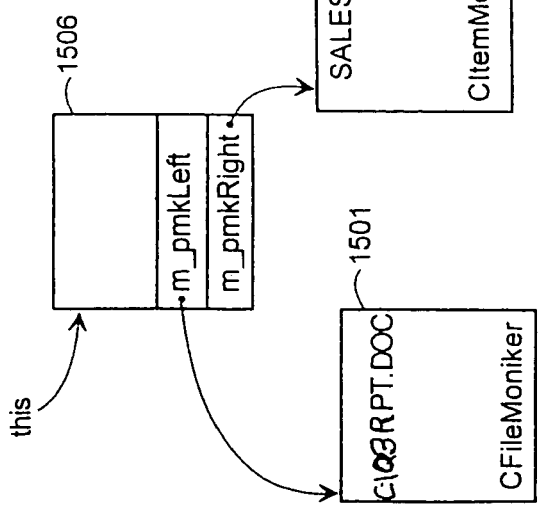
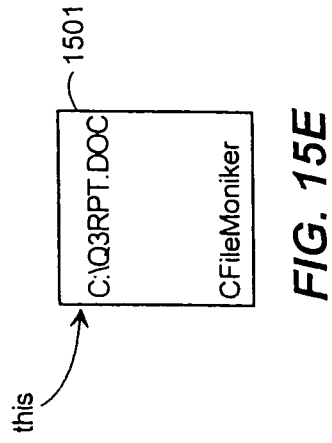
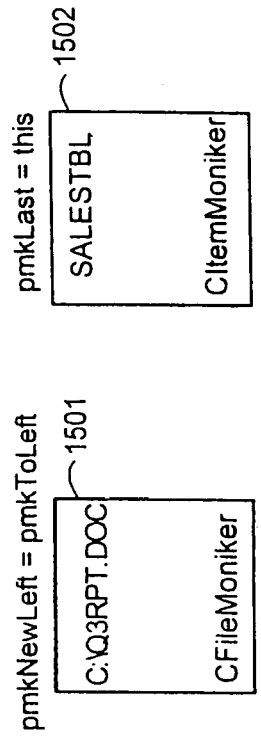
FIG. 15C
FIG. 15D
FIG. 15E

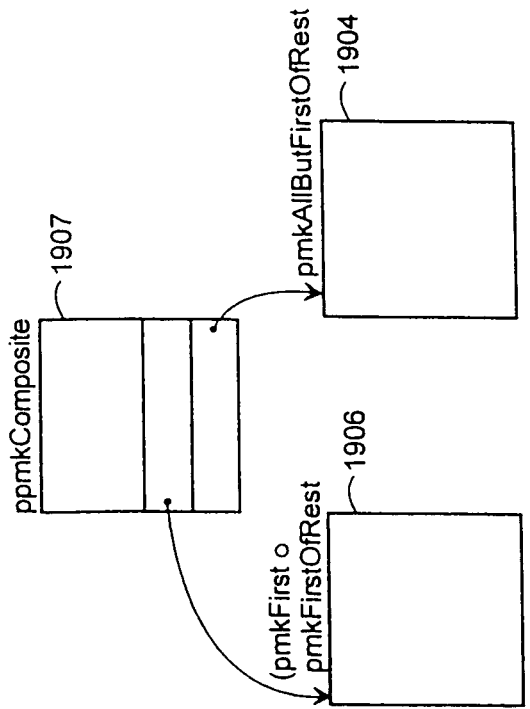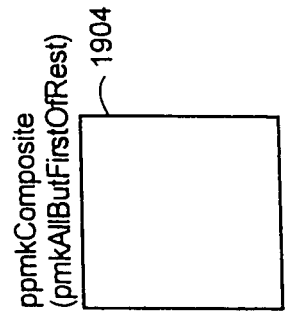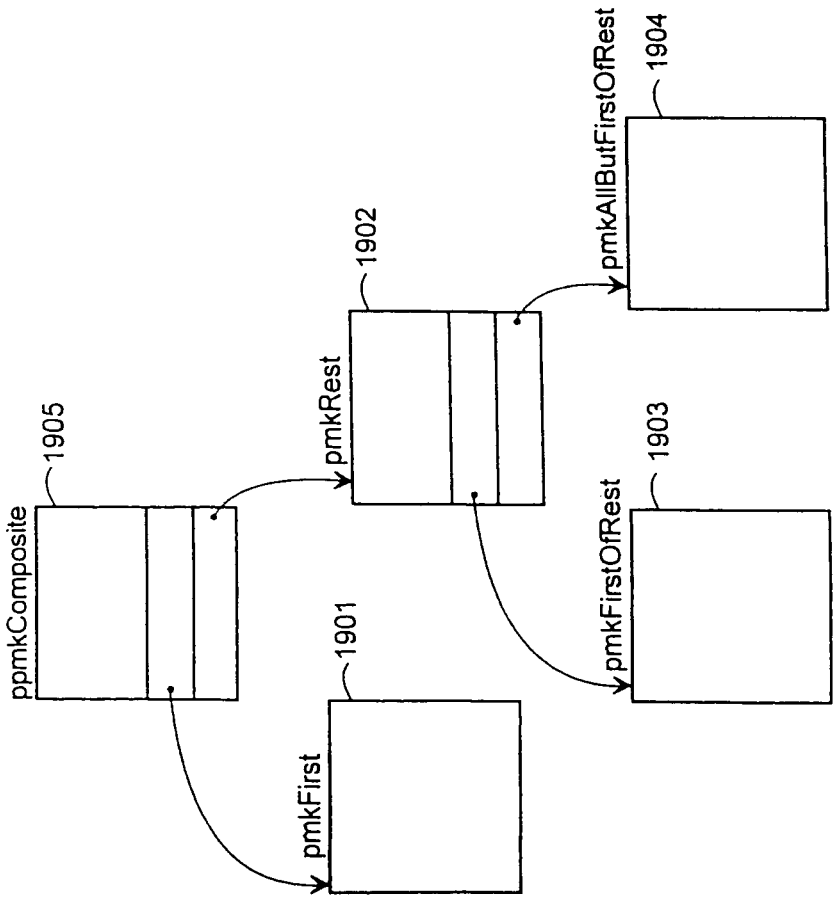
FIG. 19B
FIG. 19C
FIG. 19A

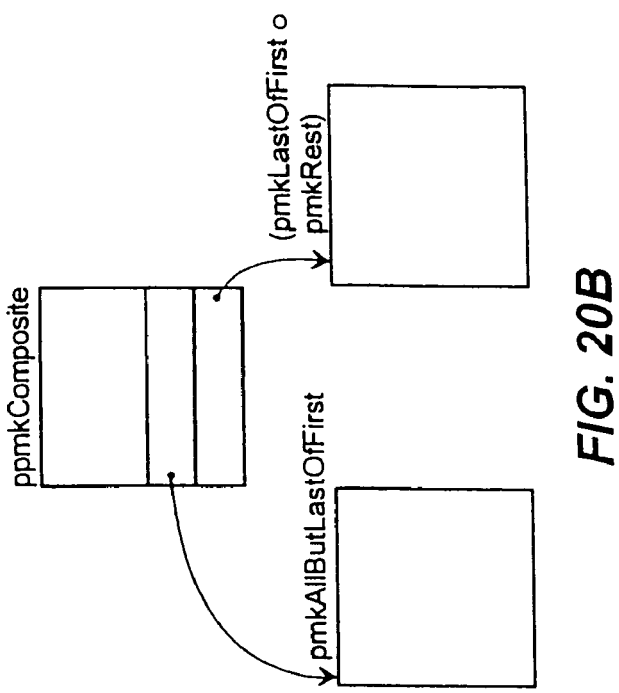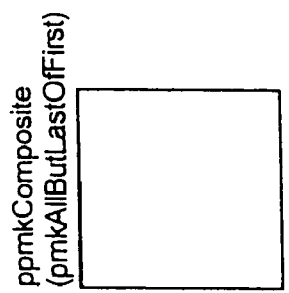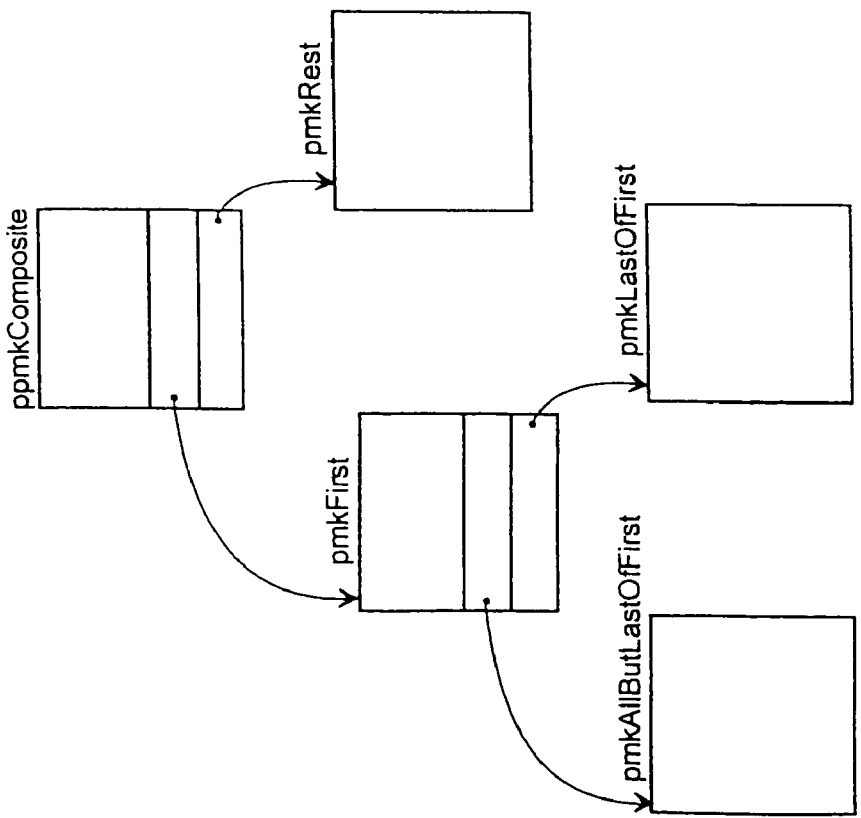
*FIG. 20B*
*FIG. 20C*
*FIG. 20A*

METHOD AND SYSTEM FOR NAMING AND BINDING OBJECTS

RELATED APPLICATION DATA

This application is a continuation of U.S. patent application Ser. No. 10/283,627, filed Oct. 29, 2002, entitled, "Method and System for Naming and Binding Objects," now U.S. Pat. No. 7,150,024, the disclosure of which is hereby incorporated by reference, which is a continuation of U.S. patent application Ser. No. 09/867,853, filed May 29, 2001, entitled "Method and System for Naming and Binding Objects," now U.S. Pat. No. 6,519,764, which is a continuation of U.S. patent application Ser. No. 08/916,999, filed Aug. 20, 1997, entitled "Method and System for Referring to and Binding to Objects Using Identifier Objects," now U.S. Pat. No. 6,263,379, which is a continuation of U.S. patent application Ser. No. 08/467,917, filed Jun. 6, 1995, entitled "Method and System for Referring to and Binding to Objects Using Identifier Objects," now U.S. Pat. No. 5,740,439, which is a divisional of U.S. patent application Ser. No. 08/088,724, filed Jul. 6, 1993, entitled "Method and System for Referring to and Binding to Objects Using Identifier Objects," now U.S. Pat. No. 5,581,760, which is a continuation-in-part of U.S. patent application Ser. No. 07/909,983, filed Jul. 6, 1992, entitled "Method and System for Naming and Binding Objects," now abandoned.

TECHNICAL FIELD

This invention relates generally to a computer method and system for referencing objects and, more specifically, to a method and system for naming objects and binding to objects

BACKGROUND OF THE INVENTION

Current document processing computer systems allow a user to prepare compound documents. A compound document is a document that contains information in various formats. For example, a compound document may contain data in text format, chart format, numerical format, etc. FIG. 1 is an example of a compound document. In this example, the compound document 101 is generated as a report for a certain manufacturing project. The compound document 101 contains scheduling data 102, which is presented in chart format; budgeting data 103, which is presented in spreadsheet format; and explanatory data 104, which is presented in text format. In typical prior systems, a user generates the scheduling data 102 using a project management computer program and the budgeting data 103 using a spreadsheet computer program. After this data has been generated, the user creates the compound document 101, enters the explanatory data 104, and incorporates the scheduling data 102 and budgeting data 103 using a word processing computer program.

FIG. 2 shows a method for incorporating the scheduling data, budgeting data, and explanatory data into the compound document. A user generates scheduling data using the project management program 201 and then stores the data in the clipboard 203. The user also generates budgeting data using the spreadsheet program 204 and then stores the data in the clipboard 203. The clipboard 203 is an area of storage (disk or memory) that is typically accessible by any program and is used to transfer data between programs. The project management program 201 and the spreadsheet program 204 typically store the data into the clipboard in a presentation format. A presentation format is a format in which the data is easily displayed on an output device. For example, the presentation format may be a bitmap that can be displayed with a standard bitmap block transfer operation (BitBlt). The storing of data into a clipboard is referred to as "copying" to the clipboard.

After data has been copied to the clipboard 203, the user starts up the word processing program 206 to create the compound document 101. The user enters the explanatory data 104 and specifies the locations in the compound document 101 to which the scheduling data and budgeting data that are in the clipboard 203 are to be copied. The copying of data from a clipboard to a document is referred to as "pasting" from the clipboard. The word processing program 206 then copies the scheduling data 102 and the budgeting data 103 from the clipboard 203 into the compound document 101 at the specified locations. Data that is copied from the clipboard into a compound document is referred to as "embedded" data. The word processing program 206 treats the embedded data as simple bitmaps that it displays with a BitBlt operation when rendering the compound document 101 on an output device. In some prior systems, a clipboard may only be able to store data for one copy command at a time. In such a system, the scheduling data can be copied to the clipboard and then pasted into the compound document. Then, the budgeting data can be copied to the clipboard and then pasted into the compound document.

Since word processors typically process only text data, users of the word processing program can move or delete embedded data, but cannot modify embedded data, unless the data is in text format. Thus, if a user wants to modify, for example, the budgeting data 103 that is in the compound document 101, the user must start up the spreadsheet program 204, load in the budgeting data 103 from a file, make the modifications, copy the modifications to the clipboard 203, start up the word processing program 206, load in the compound document 101, and paste the modified clipboard data into the compound document 101.

Some prior systems store links to the data to be included in the compound document rather than actually embedding the data. When a word processing program pastes the data from a clipboard into a compound document, a link is stored in the compound document. The link points to the data (typically residing in a file) to be included. These prior systems typically provide links to data in a format that the word processing program recognizes or treats as presentation format. For example, when the word processing program 206 is directed by a user to paste the scheduling data and budgeting data into the compound document by linking, rather than embedding, the names of files in which the scheduling data and budgeting data reside in presentation format are inserted into the document. Several compound documents can contain links to the same data to allow one copy of the data to be shared by several compound documents.

A link is conceptually a path name to the data. Some prior systems store two-level links. A two-level link identifies both a file and an area within the file. For example, the two-level link "\BUDGET.XLS\R2C2:R7C4" identifies a spreadsheet file "\BUDGET.XLS" and the range of cells "R2C2:R7C4." The use of two-level links limits the source of the links to data that is nested one level within a file. If a file contains multiple spreadsheets, then a two-level link could identify the file and a spreadsheet, but could not identify a range within the spreadsheet. It would be desirable to have a method and system of supporting links to an arbitrary level.

Since the present invention is described below using object-oriented programming, an overview of well-known object-oriented programming techniques is provided. Two common characteristics of object-oriented programming languages are support for data encapsulation and data type inheritance. Data encapsulation refers to the binding of functions and data. Inheritance refers to the ability to declare a data type in terms of other data types.

In the C++ language, object-oriented techniques are supported through the use of classes. A class is a user-defined type. A class declaration describes the data members and function members of the class. For example, the following declaration defines data members and a function member of a class named CIRCLE.

```
class CIRCLE
    { public:
        int x, y;
        int radius;
        void draw( );
    };
```

Variables x and y specify the center location of a circle and variable radius specifies the radius of the circle. These variables are referred to as data members of the class CIRCLE. The function draw is a user-defined function that draws the circle of the specified radius at the specified location. The function draw is referred to as a function member of class CIRCLE. The data members and function members of a class are bound together in that the function operates on an instance of the class. An instance of a class is also called an object of the class.

In the syntax of C++, the following statement declares the objects a and b to be of type class CIRCLE.

CIRCLE a, b;

This declaration causes the allocation of memory for the objects a and b. The following statements assign data to the data members of objects a and b.

a.x=2;
a.y=2;
a.radius=1;
b.x=4;
b.y=5;
b.radius=2;

The following statements are used to draw the circles defined by objects a and b.

a.draw( );
b.draw( );

A derived class is a class that inherits the characteristics—data members and function members—of its base classes. For example, the following derived class CIRCLE_FILL inherits the characteristics of the base class CIRCLE.

```
class CIRCLE_FILL : CIRCLE
    { public:
        int pattern;
        void fill( );
    };
```

This declaration specifies that class CIRCLE_FILL includes all the data and function members that are in class CIRCLE in addition to those data and function members introduced in the declaration of class CIRCLE_FILL, that is, data member pattern and function member fill. In this example, class CIRCLE_FILL has data members x, y, radius, and pattern and function members draw and fill. Class CIRCLE_FILL is aid to "inherit" the characteristics of class CIRCLE. A class that inherits the haracteristics of another class is a derived class (e.g., CIRCLE_FILL). A class that does not inherit the characteristics of another class is a primary (root) class (e.g., CIRCLE). A class whose characteristics are inherited by another class is a base class (e.g., CIRCLE is a base class of CIRCLE_FILL). A derived class may inherit the characteristics of several classes, that is, a derived class may have several base classes. This is referred to as multiple inheritance.

A derived class may specify that a base class is to be inherited virtually. Virtual inheritance of a base class means that only one instance of the virtual base class exists in the derived class. For example, the following is an example of a derived class with two nonvirtual base classes.

```
class CIRCLE_1 : CIRCLE {...};
class CIRCLE_2 : CIRCLE {...};
class PATTERN : CIRCLE_1, CIRCLE_2{...};
```

In this declaration class PATTERN inherits class CIRCLE twice nonvirtually through classes CIRCLE_1 and CIRCLE_2. There are two instances of class CIRCLE in class PATTERN.

The following is an example of a derived class with two virtual base classes.

```
class CIRCLE_1 : virtual CIRCLE {...};
class CIRCLE_2 : virtual CIRCLE {...};
class PATTERN: CIRCLE_1, CIRCLE_2{...};
```

The derived class PATTERN inherits class CIRCLE twice virtually through classes CIRCLE_1 and CIRCLE_2. Since the class CIRCLE is virtually inherited twice, there is only one object of class CIRCLE in the derived class PATTERN. One skilled in the art would appreciate virtual inheritance can be very useful when the class derivation is more complex.

A class may also specify whether its function members are virtual. Declaring that a function member is virtual means that the function can be overridden by a function of the same name and type in a derived class. In the following example, the function draw is declared to be virtual in classes CIRCLE and CIRCLE_FILL.

```
class CIRCLE
    { public:
        int x, y;
        int radius;
        virtual void draw( );
    };
class CIRCLE_FILL : CIRCLE
    { public:
        int pattern;
        virtual void draw( );
    };
```

The C++ language provides a pointer data type. A pointer holds values that are addresses of objects in memory. Through a pointer, an object can be referenced. The following statement declares variable c_ptr to be a pointer on an object of type class CIRCLE and sets variable c_ptr to hold the address of object c.

```
CIRCLE *c_ptr;
c_ptr = &c;
```

Continuing with the example, the following statement declares object a to be of type class CIRCLE and object b to be of type class CIRCLE_FILL.

```
CIRCLE a;
CIRCLE_FILL b;
```

The following statement refers to the function draw as defined in class CIRCLE.
   a.draw( );

Whereas, the following statement refers to the function draw defined in class CIRCLE_FILL.
   b.draw( );

Moreover, the following statements type cast object b to an object of type class CIRCLE and invoke the function draw that is defined in class CIRCLE_FILL.

```
CIRCLE *c_ptr;
c_ptr = &b;
c_ptr->draw( );           // CIRCLE_FILL::draw( )
```

Thus, the virtual function that is called is function CIRCLE_FILL::draw.

FIG. 3 is a block diagram illustrating typical data structures used to represent an object. An object is composed of instance data (data members) and member functions, which implement the behavior of the object. The data structures used to represent an object comprise instance data structure 301, virtual function table 302, and the function members 303, 304, 305. The instance data structure 301 contains a pointer to the virtual function table 302 and contains data members. The virtual function table 302 contains an entry for each virtual function member defined for the object. Each entry contains a reference to the code that implements the corresponding function member. The layout of this sample object conforms to the. model defined in U.S. patent application Ser. No. 07/682,537, entitled "A Method for Implementing Virtual Functions and Virtual Bases in a Compiler for an Object Oriented Programming Language," which is hereby incorporated by reference. In the following, an object will be described as an instance of a class as defined by the C++ programming language. One skilled in the art would appreciate that objects can be defined using other programming languages.

An advantage of using object-oriented techniques is that these techniques can be used to facilitate the sharing of objects. In particular, object-oriented techniques facilitate the creation of compound documents. A compound document (as described above) is a document that contains objects generated by various computer programs. (Typically, only the data members of the object and the class type are stored in a compound document.) For example, a word processing document that contains a spreadsheet object generated by a spreadsheet program is a compound document. A word processing program allows a user to embed a spreadsheet object (e.g., a cell) within a word processing document. To allow this embedding, the word processing program is compiled using the class definition of the object to be embedded to access function members of the embedded object. Thus, the word processing program would need to be compiled using the class definition of each class of objects that can be embedded in a word processing document. To embed an object of a new class into a word processing document, the word processing program would need to be recompiled with the new class definition. Thus, only objects of classes selected by the developer of the word processing program can be embedded. Furthermore, new classes can only be supported with a new release of the word processing program.

To allow objects of an arbitrary class to be embedded into compound documents, interfaces are defined through which an object can be accessed without the need for the word processing program to have access to the class definitions at compile time. An abstract class is a class in which a virtual function member has no implementation (pure). An interface is an abstract class with no data members and whose virtual functions are all pure.

The following class definition is an example definition of an interface. In this example, for simplicity of explanation, rather than allowing any class of object to be embedded in its documents, a word processing program allows spreadsheet objects to be embedded. Any spreadsheet object that provides this interface can be. embedded, regardless of how the object is implemented. Moreover, any spreadsheet object, whether implemented before or after the word processing program is compiled, can be embedded.

```
class ISpreadSheet
    { virtual void File( ) = 0;
       virtual void Edit( ) = 0;
       virtual void Formula( ) = 0;
       virtual void Format( ) = 0;
       virtual void GetCell (string RC, cell *pCell) = 0;
       virtual void Data( ) = 0;
    }
```

The developer of a spreadsheet program would need to provide an implementation of the interface to allow the spreadsheet objects to be embedded in a word processing document. When the word processing program embeds a spreadsheet object, the program needs access to the code that implements the interface for the spreadsheet object. To access the code, each implementation is given a unique class identifier. For example, a spreadsheet object developed by Microsoft Corporation may have a class identifier of "MSSpreadsheet," while a spreadsheet object developed by another corporation may have a class identifier of "LTSSpreadsheet." A persistent registry in each computer system is maintained that maps each class identifier to the code that implements the class. Typically, when a spreadsheet program is installed on a computer system, the persistent registry is updated to reflect the availability of that class of spreadsheet objects. So long as a spreadsheet developer implements each function member defined by the interface and the persistent registry is maintained, the word processing program can embed the developer's spreadsheet objects into a word processing document.

Various spreadsheet developers may wish, however, to implement only certain function members. For example, a spreadsheet developer may not want to implement database support, but may want to support all other function members. To allow a spreadsheet developer to support only some of the function members, while still allowing the objects to be embedded, multiple interfaces for spreadsheet objects are defined. For example, the interfaces IDatabase and IBasic may be defined for a spreadsheet object as follows.

```
class   IBasic
        { virtual void File( ) = 0;
            virtual void Edit( ) = 0;
            virtual void Formula( ) = 0;
            virtual void Format( ) = 0;
            virtual void GetCell (string RC, cell *pCell) = 0;
        }
class   IDatabase
        { virtual void Data( ) = 0;
        }
```

Each spreadsheet developer would implement the IBasic interface and, optionally, the IDatabase interface.

At run time, the word processing program would need to determine whether a spreadsheet object to be embedded supports the IDatabase interface. To make this determination, another interface is defined (that every spreadsheet object implements) with a function member that indicates which interfaces are implemented for the object. This interface is named IUnknown (and referred to as the unknown interface or the object management interface) and is defined as follows.

```
class IUnknown
    { virtual HRESULT QueryInterface (REFIID iid, void **ppv) = 0;
        virtual ULONG AddRef( ) = 0;
        virtual ULONG Release ( ) = 0;
    }
```

The IUnknown interface defines the function member (method) QueryInterface. The method QueryInterface is passed an interface identifier (e.g., "IDatabase") in parameter iid (of type REFIID) and returns a pointer to the implementation of the identified interface for the object for which the method is invoked in parameter ppv. If the object does not support the interface, then the method returns a false. (The type HRESULT indicates a predefined status, and the type ULONG indicates an unsigned long integer.)

CODE TABLE 1

```
HRESULT XX::QueryInterface(REFIID iid, void **ppv)
    { ret = TRUE;
        switch (iid)
        { case IID__IBasic:
            *ppv = *pIBasic;
            break;
          case IID__IDatabase:
            *ppv = *pIDatabase;
            break;
          case IID__IUnknown:
            *ppv = this;
            break;
          default:
            ret = FALSE;
        }
        if (ret == TRUE){AddRef( );};
        return ret;
    }
```

Code Table 1 contains C++ pseudocode for a typical implementation of the method QueryInterface for class XX, which inherits the class IUnknown. If the spreadsheet object supports the IDatabase interface, then the method QueryInterface includes the appropriate case label within the switch statement. The variables pIBasic and pIDatabase point to a pointer to the virtual function tables of the IBasic and IDatabase interfaces, respectively. The method QueryInterface invokes the method AddRef (described below) to increment a reference count for the object of class XX when a pointer to an interface is returned.

CODE TABLE 2

```
void XX::AddRef( ) {refcount++;}
void XX::Release( ) {if (--refcount==0) delete this;}
```

The interface IUnknown also defines the methods AddRef and Release, which are used to implement reference counting. Whenever a new reference to an interface is created, the method AddRef is invoked to increment a reference count of the object. Whenever a reference is no longer needed, the method Release is invoked to decrement the reference count of the object and, when the reference count goes to zero, to deallocate the object. Code Table 2 contains C++ pseudocode for a typical implementation of the methods AddRef and Release for class XX, which inherits the class IUnknown.

The IDatabase interface and IBasic interface inherit the IUnknown interface. The following definitions illustrate the use of the IUnknown interface.

```
class IDatabase : public IUnknown
    { public:
        virtual void Data( ) = 0;
    }
class IBasic : public IUnknown
    { public:
        virtual void File( ) = 0;
        virtual void Edit( ) = 0;
        virtual void Formula( ) = 0;
        virtual void Format( ) = 0;
        virtual void GetCell (string RC, cell *pCell) = 0;
    }
```

FIG. 4 is a block diagram illustrating a sample data structure of a spreadsheet object. The spreadsheet object comprises object data structure 401, IBasic interface data structure 403, IDatabase interface data structure 404, the virtual function tables 402, 405, 406 and methods 407 through 421. The object data structure 401 contains a pointer to the virtual function table 402 and pointers to the IBasic and IDatabase interface. Each entry in the virtual function table 402 contains a pointer to a method of the IUnknown interface. The IBasic interface data structure 403 contains a pointer to the virtual function table 405. Each entry in the virtual function table 405 contains a pointer to a method of the IBasic interface. The IDatabase interface data structure 404 contains a pointer to the virtual function table 406. Each entry in the virtual function table 406 contains a pointer to a method of the IDatabase interface. Since the IBasic and IDatabase interfaces inherit the IUnknown interface, each virtual function table 405 and 406 contains a pointer to the methods QueryInterface, AddRef, and Release. In the following, an object data structure is represented by the shape 422 labeled with the interfaces through which the object may be accessed.

The following pseudocode illustrates how a word processing program determines whether a spreadsheet object supports the IDatabase interface.

```
if (pIBasic-> QueryInterface("IDatabase", &pIDatabase) = = S_OK)
\* IDatabase supported
else
\* IDatabase not supported
```

The pointer pIBasic is a pointer to the IBasic interface of the object. If the object supports the IDatabase interface, the method QueryInterface sets the pointer pIDatabase to point to the IDatabase data structure and returns the value S_OK.

Normally, an object can be instantiated (an instance of the object created in memory) by a variable declaration or by the "new" operator. However, both techniques of instantiation need the class definition at compile time. A different technique is needed to allow a word processing program to instantiate a spreadsheet object at run time. One technique provides a global function CreateInstanceXX, which is defined in the following.

static void CreateInstanceXX (REFIID iid, void **ppv)=0;

The method CreateInstanceXX (known as a class factory) instantiates an object of class XX and returns a pointer ppv to the interface of the object designated by parameter iid.

SUMMARY OF THE INVENTION

It is an object of the present invention to provide a method and system for generating links to source data incorporated within a compound document.

It is another object of the present invention for binding links to source data.

It is another object of the present invention for interfacing with these links in a manner that is independent of the underlying source data.

It is another object of the present invention for linking to data nested to an arbitrary level within a compound document.

These and other objects, which will become apparent as the invention is more fully described below, are provided by a method and system for naming and binding data objects. In a preferred embodiment, a link to an object incorporated is stored as a moniker. A moniker is an identifier object that encapsulates the information needed to access the incorporated data and provides methods which bind to the incorporated data.

BRIEF DESCRIPTION OF THE DRAWINGS

FIG. 1 is a block diagram of an example of a compound document.

FIGS. 18, 19A, 19B, 19C, 20A, 20B, 20C, 21A, 21B, and 21C are block diagrams illustrating sample generic composite monikers.

DETAILED DESCRIPTION OF THE INVENTION

Figure 2:
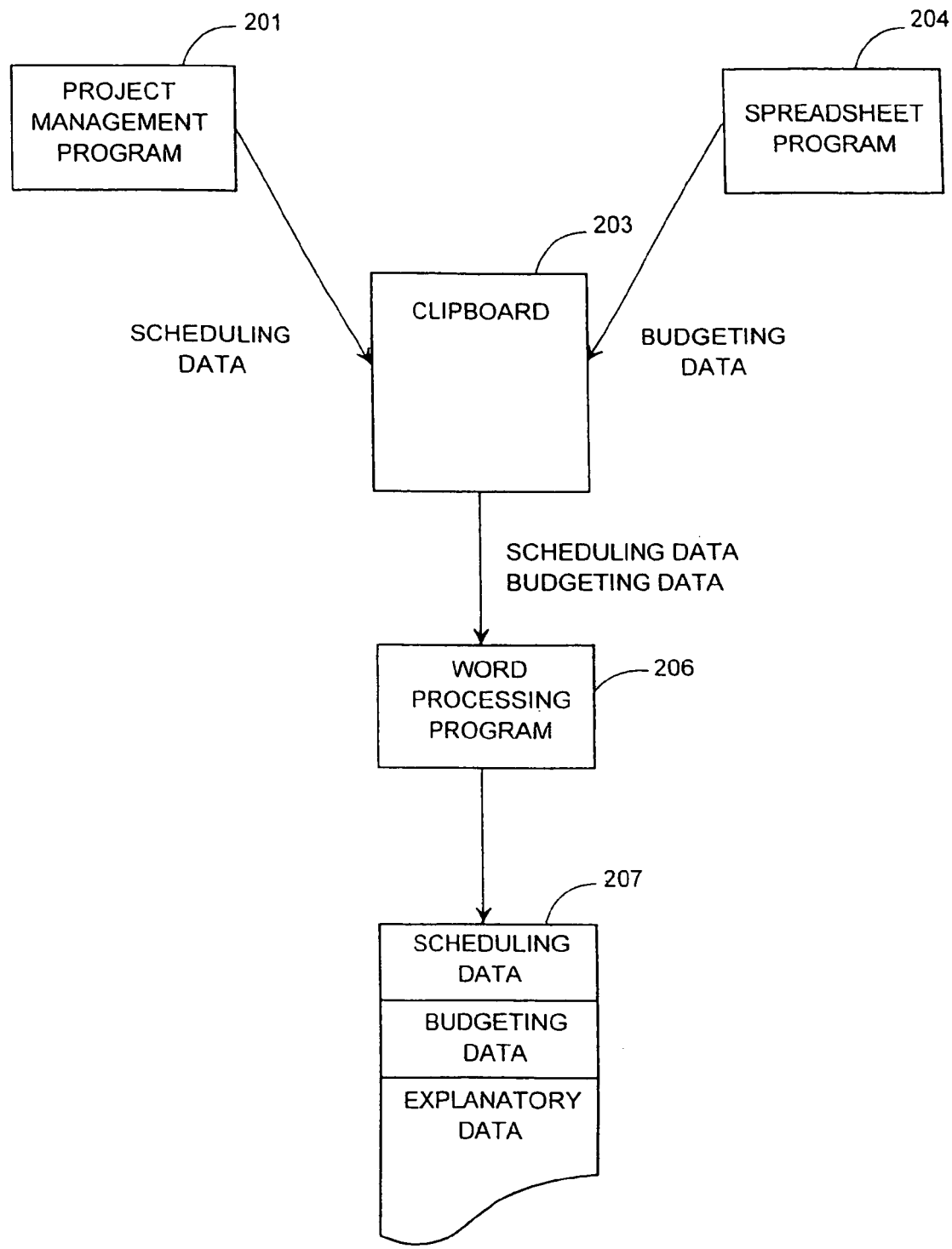
FIG. 2 is a block diagram illustrating scheduling data, budgeting data, and explanatory data.
Figure 3:
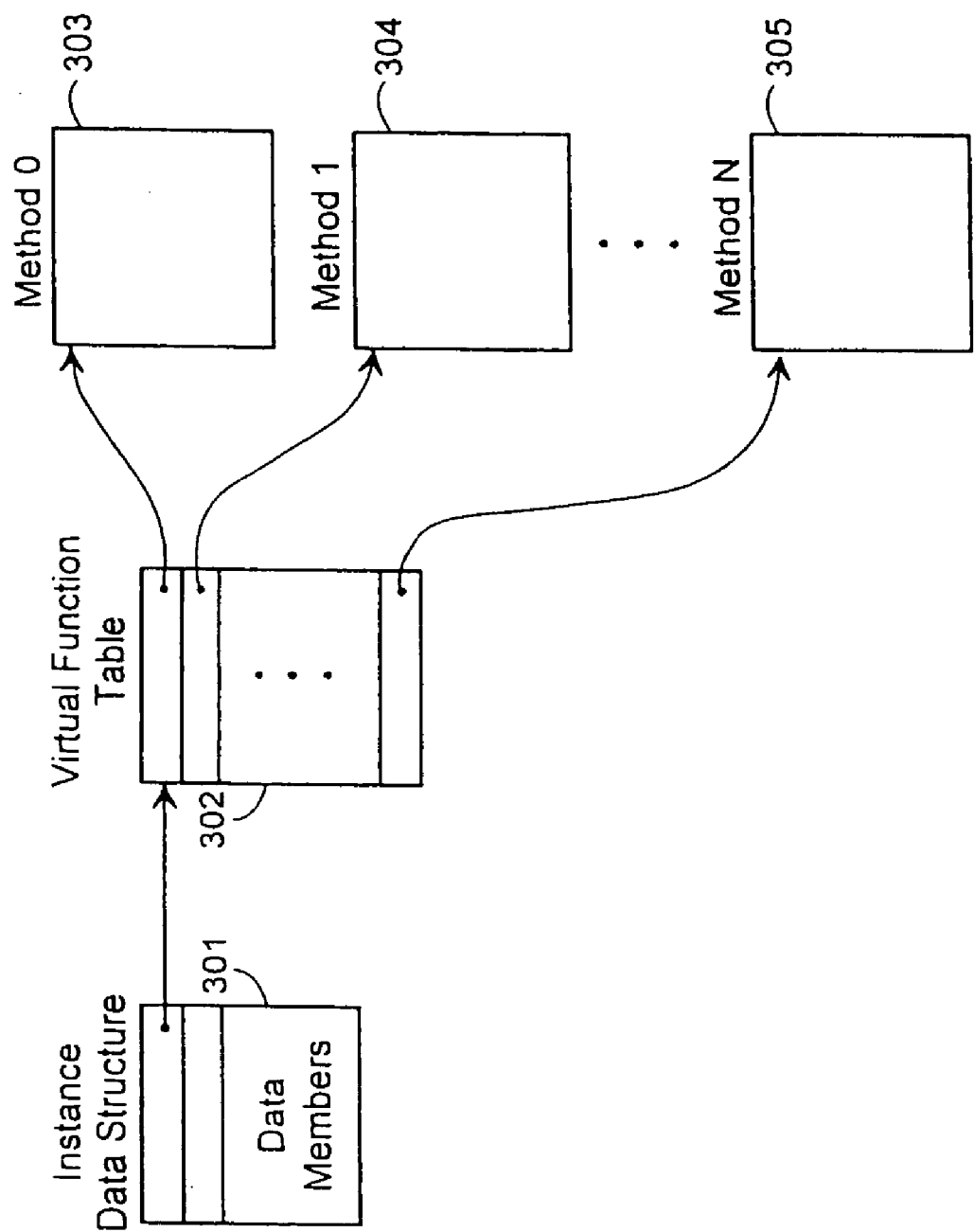
FIG. 3 is a block diagram illustrating typical data structures used to represent an object.
Figure 4:
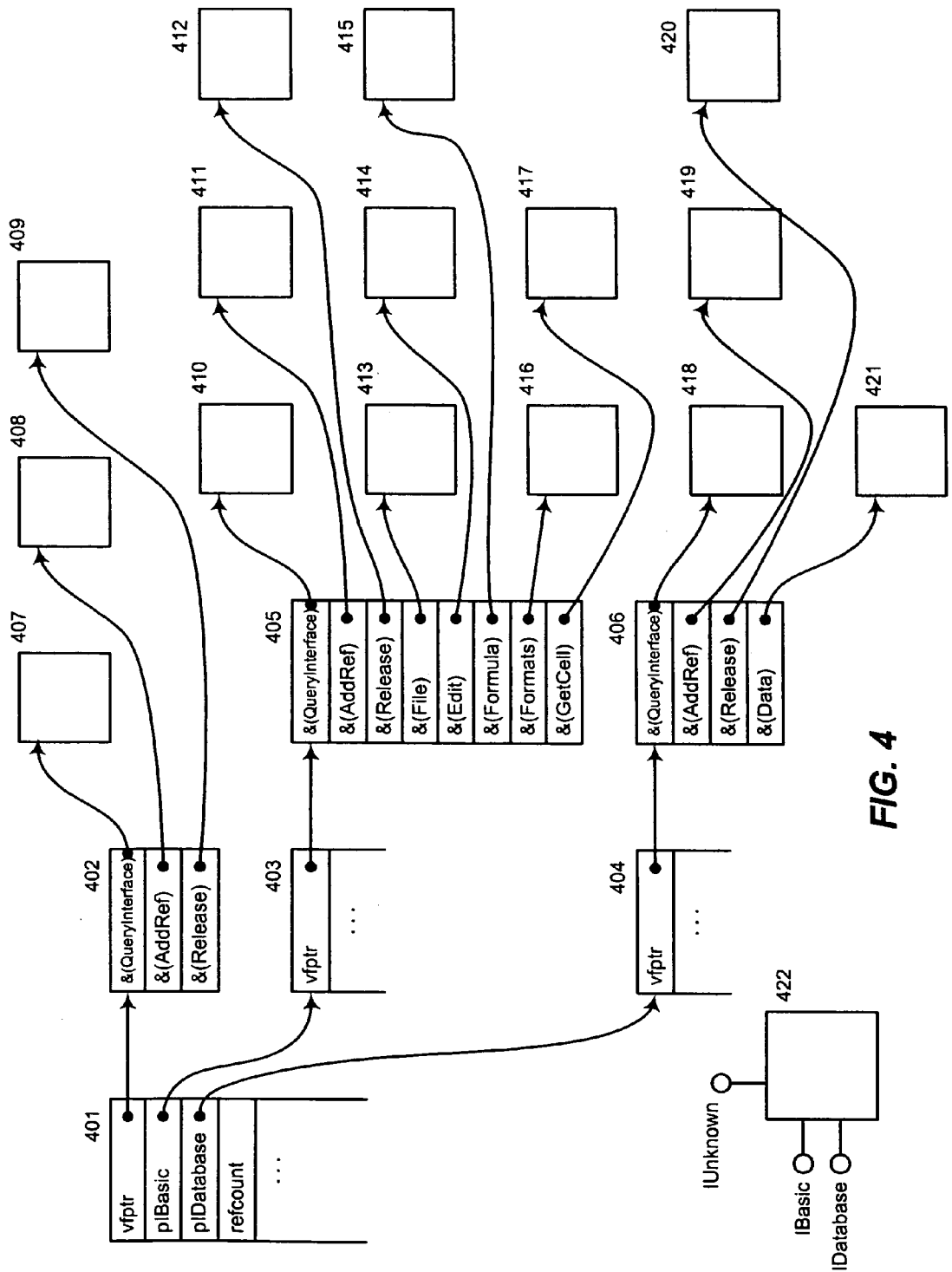
FIG. 4 is a block diagram illustrating a sample data structure of a spreadsheet object.

The present invention provides a computer implemented method and system for naming and binding to linked data. In a preferred embodiment, a compound document that incorporates linked data stores a persistent data handle, called a "moniker," which is a reference to the link source. A moniker is an identifier object that contains information to identify the linked data and provides methods through which a program can bind to the linked data. A binding method returns an instance of an interface through which the linked data can be accessed. A moniker may link to data that is itself embedded data within another compound document. For example, a moniker may link to a range of cells within a spreadsheet table that is contained in a word processing document. A moniker may link to data at any level within a compound document. During execution of the binding method, several applications may be invoked to locate the link data. For example, to bind to the range of cells within a spreadsheet table that is within a word processing document, the word processing program may be invoked to locate the embedded spreadsheet table and the spreadsheet program may be invoked to bind to the range of cells. The present invention defines an interface through which a moniker is accessed. A moniker can identify source data that is stored persistently or non-persistently.

In a preferred embodiment, monikers can be composed to form a composite moniker. A composite moniker is conceptually a path to a source object that is identified by the concatenation of the monikers. For example, if a moniker specifying a certain path (e.g., "c:\reports") is composed with a moniker specifying a certain file name (e.g., "Q3.doc") then the result is the complete path name to the file (e.g., "c:\reports\Q3.doc"). Each composite moniker comprises a plurality of component monikers. The present invention provides a method and system for decomposing a composite moniker. In a preferred embodiment, each moniker provides a method that is used to retrieve each component moniker.

In a preferred embodiment, a moniker provides a reducing method which returns another moniker that is a more efficient representation of a moniker to the same source object. The reducing method may interpret a macro script that identifies the source object. Alternatively, the reducing method may evaluate a query request that identifies the source object.

In a preferred embodiment, a moniker provides an equality method and a hash method. The equality method determines whether two monikers identify the same source object. The hash method provides a hash value for a moniker. The equality method and hash method are used to implement hash tables indexed by monikers.

In a preferred embodiment, a moniker provides an inverse method that generates another moniker that is the inverse of the moniker. When a moniker is composed with its inverse, the result is NULL. The inverse moniker is said to annihilate the moniker. An inverse moniker may be used, for example, to remove portions of a path and is analogous to the ".." functionality of traditional file systems.

In a preferred embodiment, a moniker provides a common prefix with method and a relative path to method. The common prefix with method determines the common prefix portion of two monikers. For example, if one, moniker identifies the object ":\reports\Q3.doc" and another moniker identifies the object "c:\reports\data\Q3.xls" the common prefix is "c:\reports". The relative path to method generates relative path to moniker that when composed with one moniker results in specified moniker. For example, the moniker specifying the path that is the inverse of a moniker identifying object "Q3.doc" composed with a moniker specifying the path "data\Q3.xls" is a relative path to moniker from the moniker ":\reports\Q3.doc" to the moniker "c:\reports\data\Q3.xls". Relative path to monikers are preferably used when identifying objects by relative paths from another object.

In a preferred embodiment, the present invention provides several implementation monikers including a file moniker, an item moniker, a generic composite moniker, a pointer moniker, and an anti moniker. Each implementation is referred to as a moniker class and has a class identifier. A file moniker provides a moniker that conceptually is a path name in a file system. An item moniker provides a moniker that conceptually identifies a portion of an object. A generic composite moniker provides a mechanism for composing monikers with arbitrary implementations. For example, a file moniker can be composed with an item moniker to specify a portion of a file. A generic composite moniker is preferably created by the composing method of the file moniker. A pointer moniker is a moniker that wraps an instantiated source object in a moniker. A pointer moniker contains a pointer to the instantiated source object and when a pointer moniker is bound, it returns the pointer. An anti moniker is a moniker that is the inverse of other monikers. When a moniker is composed with an anti moniker, the result is NULL. If a generic composite moniker is composed with an anti moniker, the result is a moniker comprising all but the last component moniker. The anti moniker annihilates the last component moniker of a generic composite moniker.

In a preferred embodiment of the present invention, an application program that creates a compound document controls the manipulation of linked or embedded data generated by another application. In object-oriented parlance, this data is referred to as an object. (The reference Budd, T., "An Introduction to Object-Oriented Programming," Addison-Wesley Publishing Co., Inc., 1991, provides an introduction to object-oriented concepts and terminology.) An object that is either linked or embedded into a compound document is "contained" within the document. Also, a compound document is referred to as a "container" object and the objects contained within a compound document are referred to as "containee" objects. Referring to FIGS. 1 and 2, the scheduling data 102 and budgeting data 103 are containee objects and the compound document 101 is a container object. The user can indicate to the word processor that the user wants to edit a containee object, such as the budgeting data 103. When the user indicates that the budgeting data 103 is to be edited, the word processing program determines which application should be used to edit the budgeting data (e.g., the spreadsheet program) and launches (starts up) that application. The user can then manipulate the budgeting data using the launched application, and changes are reflected in the compound document. The same procedure is used whether the budgeting data is stored as an embedded or linked object.

Figure 5:
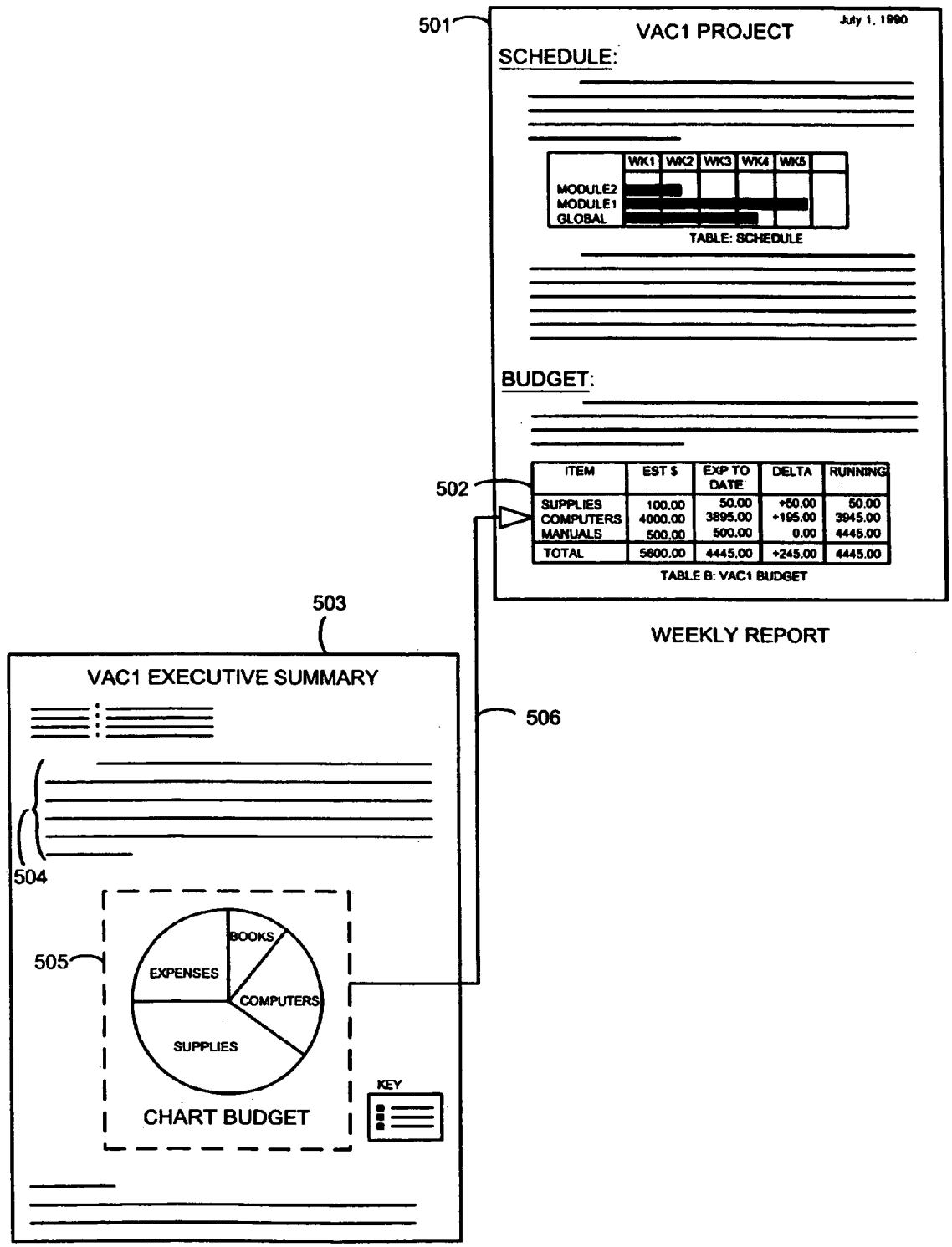
FIG. 5 is a block diagram showing a sample compound document.

FIG. 5 is a block diagram showing a sample compound document. The weekly project report 501 is the same compound document of FIG. 1. The executive summary report 503, contains a budgeting chart 505 that is linked to the weekly project 501. The weekly project 501 contains an embedded spreadsheet 502. The embedded spreadsheet 502 was created by the spreadsheet program 204 in FIG. 2. The data for this spreadsheet, the budget for the project, is stored within the storage of the weekly project report 501 because it is an embedded object. The executive summary document 503 is a compound document which contains native text 504 and a contained object, the budget chart 505. The budget chart 505 is linked to the data contained within the spreadsheet 502 which is embedded in the compound document 501.

In a preferred embodiment, application programs ("applications") cooperate using object linking and embedding facilities to create and manipulate compound documents. An application that creates a compound document is referred to as a client application, and an application that creates and manipulates containee objects are referred to as server applications. An application can behave as both a client and a server. Referring to FIG. 2, the project management program 201 and the spreadsheet program 204 are server applications, and the word processing program 206 is a client application. A client application is responsible for selection of the various objects within the container object and for invoking the proper server application to manipulate the selected containee object. A server application is responsible for manipulating the contents of the containee objects.

In a preferred embodiment, applications are provided with an implementation-independent Application Programming Interface (API) that provides the object linking and embedding functionality. The section entitled "Details of Moniker Related Interfaces" contains a detailed description of several functions within a preferred object linking and embedding system. This preferred object linking and embedding system is further described in Microsoft Corp., *OBJECT Linking & Embedding OLE* 2.0 *Design Specification*. Microsoft Corp., Apr. 15, 1993, which is herein incorporated by reference in its entirety. The API is a set of functions that are invoked by client and server applications. These functions manage, among other things, the setup and initialization necessary for client applications to send and receive messages and data to and from server applications. The API provides functions to invoke the correct server application to act upon a particular containee object and to manipulate containee objects.

In addition, the object linking and embedding API defines "interfaces" through which client applications can communicate with their contained objects. An interface is a set of methods which abide by certain input, output, and behavior rules. If a contained object supports a particular interface, the client application can invoke the methods of that interface to effect the defined behavior. In a preferred embodiment, the client application is not allowed direct access to the object data; it manipulates the object using the supported interfaces. A client application is bound to a contained object through a pointer to an interface. The client application accesses the object by invoking the methods of the interface. To access the object data, the methods may send messages to the server application requesting the specified access. In a preferred embodiment, messages are sent between clients and servers using interprocess communications mechanisms provided by the underlying operating system.

An example will help illustrate the relationship between a client process and a server process. Referring again to FIG. 1, if a user wants to edit the budgeting data 103 of the compound document 101, then the following sequence of events occurs. First, the user starts up the word processor program, which is dynamically linked to the object linking and embedding API. Second, the user opens the compound document for editing. Third, the user selects the budgeting data, which is a containee object, and indicates that the selected object is to be edited. Fourth, the client application invokes a client API routine for performing an action on an object passing the routine a handle (which uniquely identifies the selected object) to the object and an indicator that the action is edit. Fifth, the client API routine determines that the spreadsheet program provides the actions for the budgeting data. Sixth, the client API code starts up the spreadsheet program as a server process, if it is not already started. Seventh, the word processor application sends a message to the spreadsheet program that it should edit the budgeting data. Eighth, the server API code receives the request to edit and invokes a routine in the spreadsheet program for editing the data. When editing is complete, the spreadsheet routine returns to the server API code. The server API code sends a message to the word processor application to indicate that editing is complete. The client API code receives the message and returns from its invocation. Upon return from the invocation, the word processor application knows that the editing is complete.

In addition to the client and server API, the object linking and embedding facilities of the present invention provide information to client and server applications through a persistent global "registry." This registry is a database of information such as (1) for each type of object, the server application that implements the object type, (2) the actions that the each server application provides to client applications, (3) where the executable files for each server application are located, and (4) whether each server application has an associated object handler. An object handler is a collection of functions in a dynamic link library. An object handler can be used to provide certain functions without launching the server.

Figure 6:
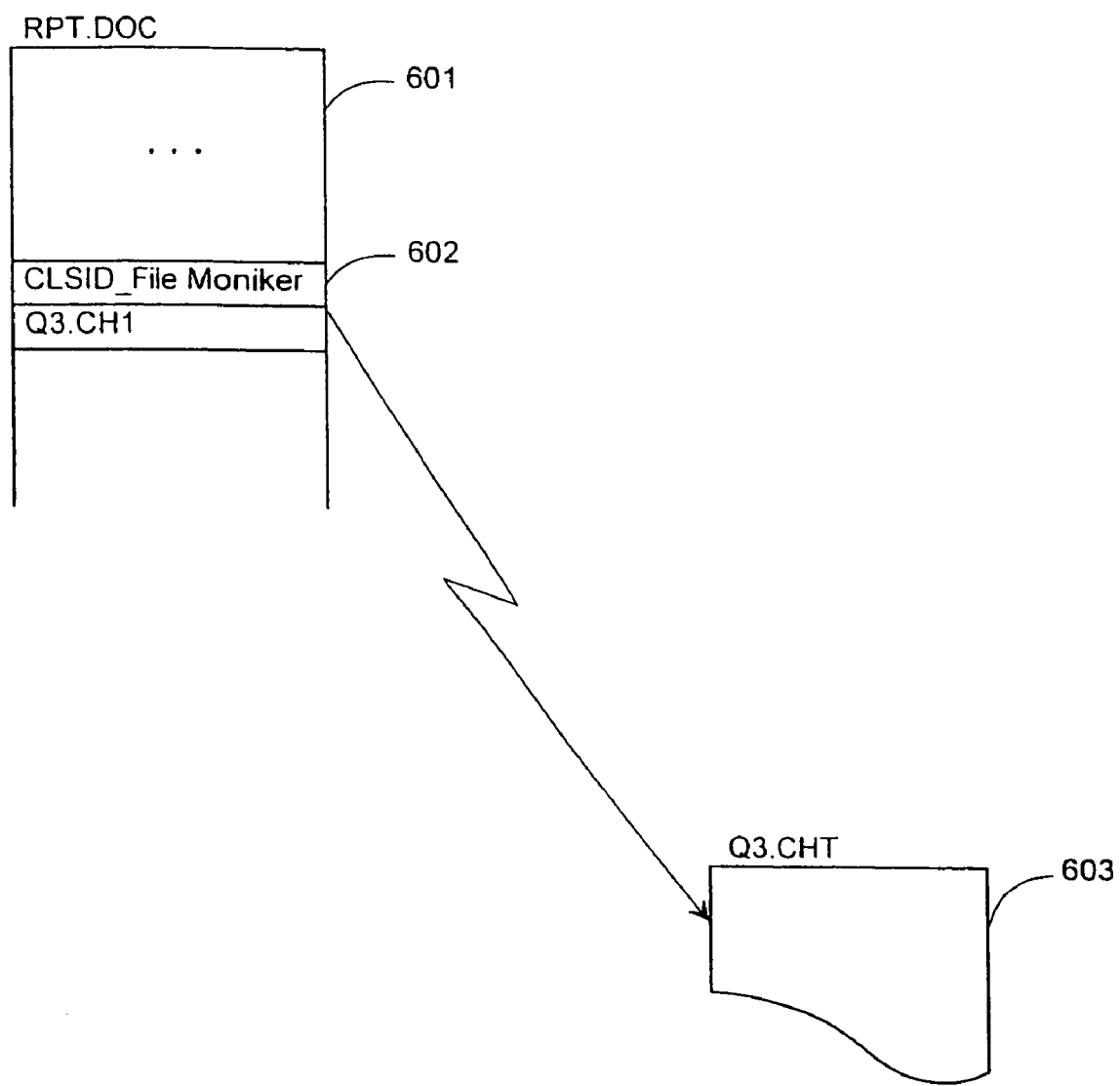
FIGS. 6, 7, and 8 are block diagrams illustrating the use of a moniker by a word processing program.
Figure 7:
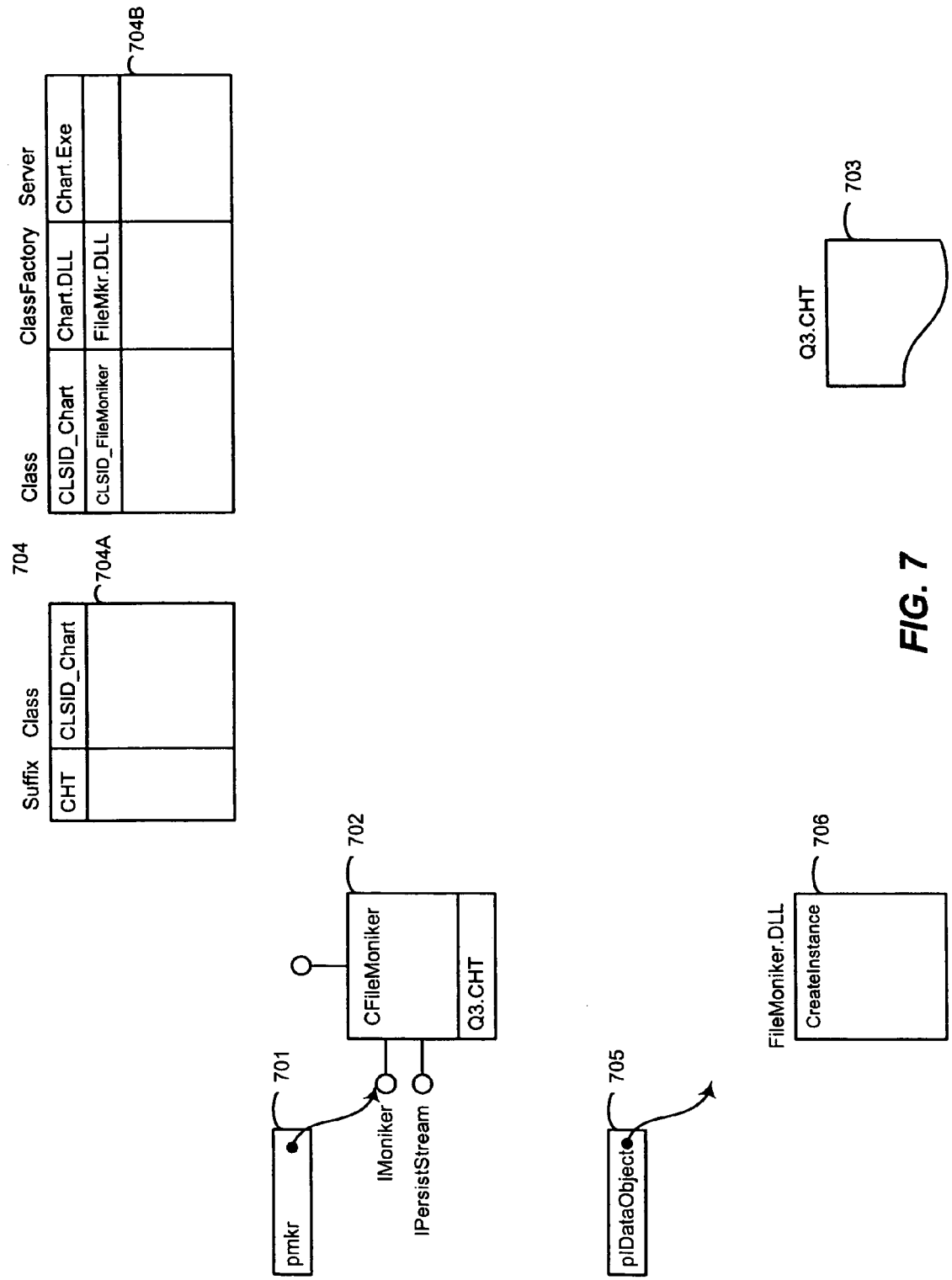
Figure 8:
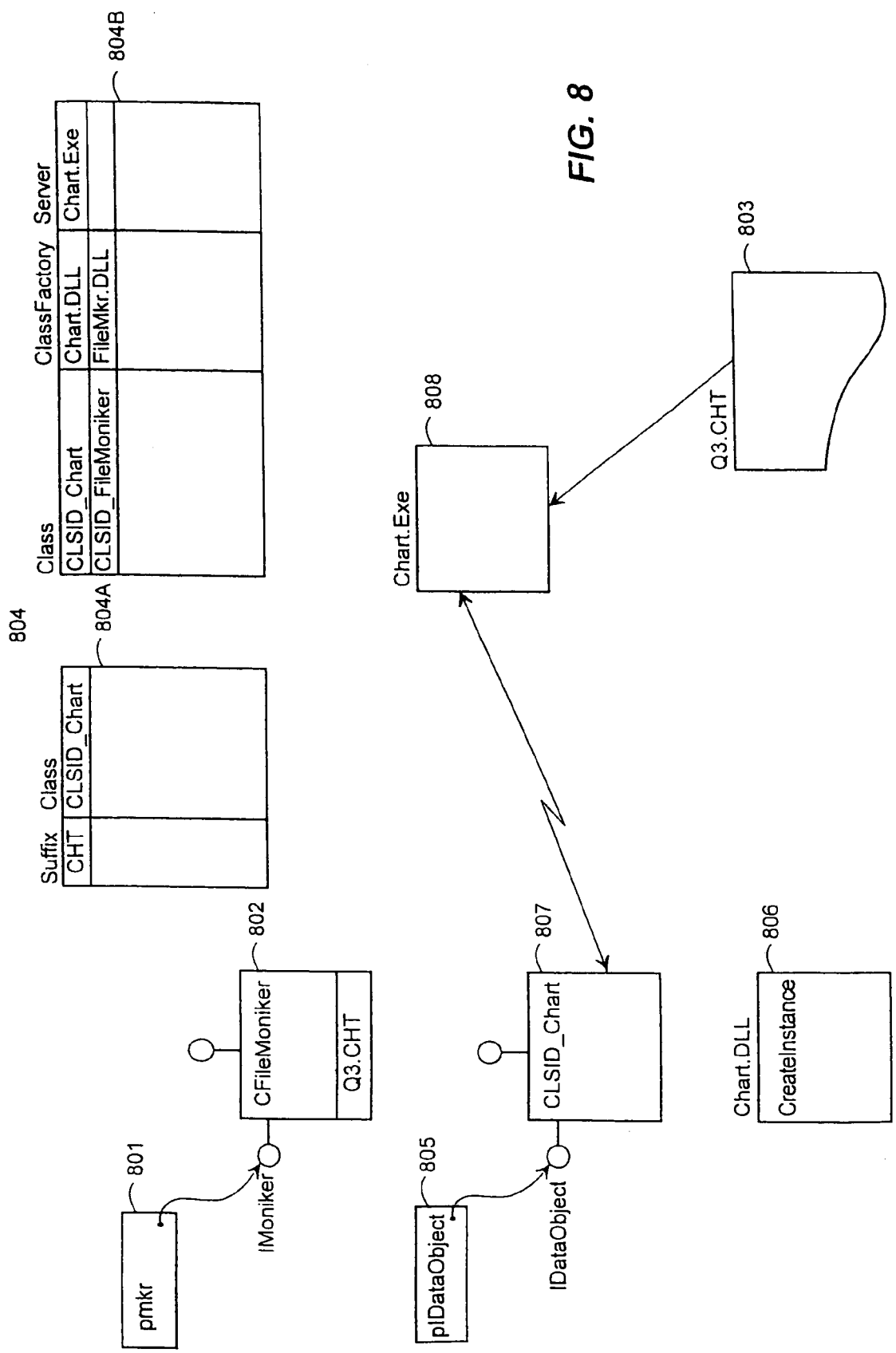

FIGS. 6, 7, and 8 are block diagrams illustrating the use of a moniker by a word processing program. In FIG. 6, the document "RPT.DOC" 601 contains a link 602 to the chart file 603. The link 602 is a moniker that is persistently stored in the document 601. The persistent storage of the moniker includes the class identifier "CLSID_FileMoniker" and the name of the chart file 603 ("Q3.CHT"). When the word processing program displays the chart of chart file 603, it first instantiates a moniker object of type CLSID_FileMoniker, requests the moniker to load its persistent data (e.g., "Q3.CHT"), and then requests the moniker to bind to the file indicated by the loaded data. FIG. 7 is a block diagram illustrating the instantiation of a moniker object. The word processing program first reads in the class identifier of link 602. To determine how to instantiate an object of that class, the program accesses the global registry 704. The global registry includes a mapping from class identifiers to the location of a class factory to create an instance of that class. For example, table 704B indicates that the class factory for the moniker class identified by CLSID_FileMoniker is contained in the dynamic link library named "FileMkr.DLL." The program links to the class factory code within the dynamic link library 706. The program invokes the function CreateInstance to create an instance of an object of class CFileMoniker 702 (a file moniker). The program then requests the IPersistStream interface of the file moniker. The IPersistStream interface. (described in detail in the section entitled "Details of the Monniker Related Interfaces") provides methods through which the internal state (e.g., "Q3.CHT") of a moniker can be saved to persistent storage and then loaded into memory from the persistent storage. Using the methods of the IpersistStream interface, the program loads the moniker internal state persistently stored in link 602 into the file moniker 702. The program then requests the IMoniker interface to the file moniker 702. The pointer to the IMoniker interface is stored in pointer 701. FIG. 8 is a block diagram illustrating the binding of the file moniker 702 to the chart file 603. When a binding method of the file moniker 702 is invoked, the method determines the class identifier for the file identified by the file moniker by accessing the global registry table 704A. The class identifier for files with suffix "CHT" is CLSID_Chart. The program then retrieves the class factory for the class CLSID_Chart from the registry table 704B. The program links to the dynamic link library "CHART.DLL". 806. The program then invokes the CreateInstance method within the dynamic link library 806, which creates an instance of a chart object 807 and returns a pointer to the IDataObject interface. The IDataObject interface (described in detail in the section entitled "Details of the Moniker Related Interfaces") provides methods to pass data to and from an object (e.g., methods GetData and SetData). Through the chart object 807, the program can access the chart file 603 through the chart server 808.

In a preferred embodiment, a moniker is an object that supports the IMoniker interface of Code Table 3. The IMoniker interface inherits the IPersistStream interface; thus, monikers can be saved to and loaded from streams. The persistent form of a moniker contains the class identifier (CLSID) of its implementation which is used during the loading process, and new classes of monikers can be created transparently to clients.

The IMoniker interface provides for binding to the object to which it points, which is supported by the method BindToObject. This method takes as a parameter the interface identifier by which the caller wishes to talk to the object, runs whatever algorithm is necessary in order to locate the object, then returns a pointer of that interface type to the caller. Each moniker class can store arbitrary data in its persistent representation, and can run arbitrary code at binding time.

If there is an identifiable piece of persistent storage in which the object referenced by the moniker is stored, then the method BindToStorage can be used to access it. Many objects have such identifiable storage (e.g., a file), but some, such as the objects which are the ranges in a spreadsheet do not.

Figure 9:
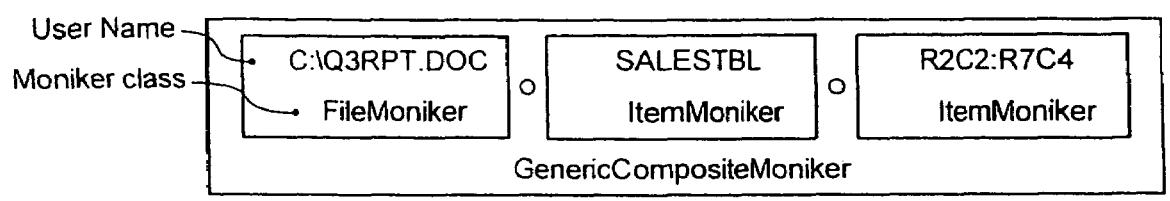
FIG. 9 is a block diagram of a generic composite moniker.

In a preferred embodiment, a particular moniker class is designed to be one step along the path (a component) to a data source. These components can be composed together to form a moniker which represents the complete path to the data source. For example, the moniker stored inside the chart of FIG. 5 might be a generic composite moniker formed from three components as illustrated in FIG. 9. This composite is itself a moniker; it is a moniker which is a sequenced collection of other composite monikers. The composition is generic in that it has no knowledge of the component monikers involved other than that they are monikers.

CODE TABLE 3

```
class IMoniker : IPersistStream {
    virtual   HRESULT   BindToObject(pbc, pmkToLeft,
                                    iidResult, ppvResult) = 0;
    virtual   HRESULT   BindToStorage(pbc, pmkToLeft,
                                     iid, ppvObj) = 0;
    virtual   HRESULT   Reduce(pbc, dwReduceHowFar,
                              ppmkToLeft, ppmkReduced) = 0;
    virtual   HRESULT   ComposeWith(pmkRight,
                                   fOnlyIfNotGeneric, ppmkComposite)
    virtual   HRESULT   Enum(fForward, ppenmMoniker) = 0;
    virtual   HRESULT   IsEqual(pmkOtherMoniker) = 0;
    virtual   HRESULT   Hash(pdwHash) = 0;
    virtual   HRESULT   IsRunning(pbc, pmkToLeft,
                                 pmkNewlyRunning) = 0;
    virtual   HRESULT   GetTimeOfLastChange(pbc,
                                          pmkToLeft, pfiletime) = 0;
    virtual   HRESULT   Inverse(ppmk) = 0;
    virtual   HRESULT   CommonPrefixWith(pmkOther,
                                        ppmkPrefix) = 0;
    virtual   HRESULT   RelativePathTo(pmkOther,
                                      ppmkRelPath);
```

CODE TABLE 3-continued

```
    virtual   HRESULT   GetDisplayName(pbc, pmkToLeft,
                                     lplpszDisplayName) = 0;
    virtual   HRESULT   ParseDisplayName(pbc, pmkToLeft,
                                       lpszDisplayName, pcchEaten,
                                       ppmkOut) = 0;
    virtual   HRESULT   IsSystemMoniker(pdwMksys);
};
```

Figure 10B:
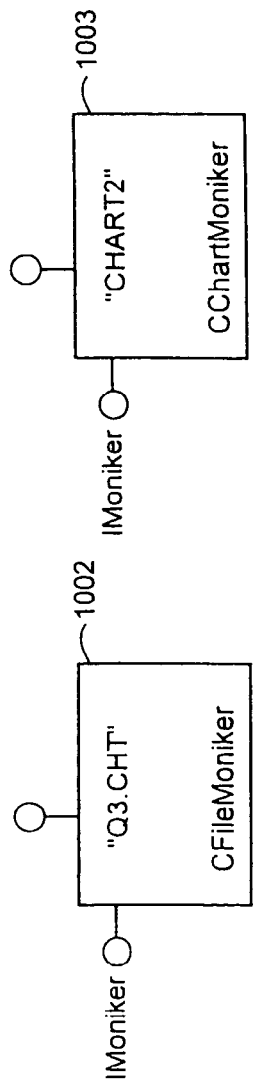
FIGS. 10A, 10B, and 10C are block diagrams illustrating moniker composition.
Figure 10C:
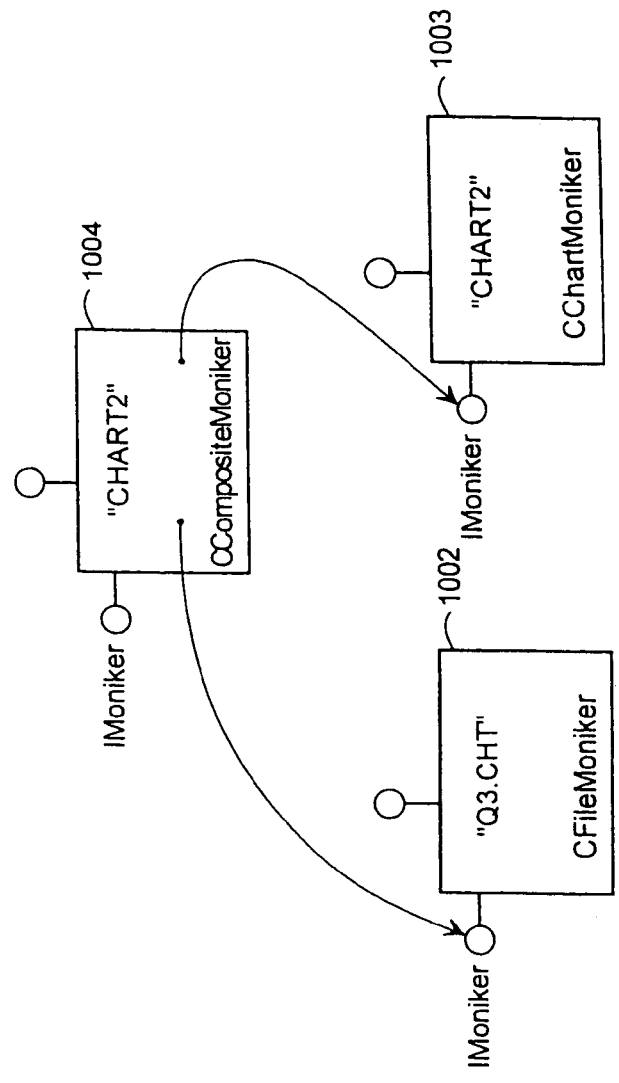
Figure 10A:
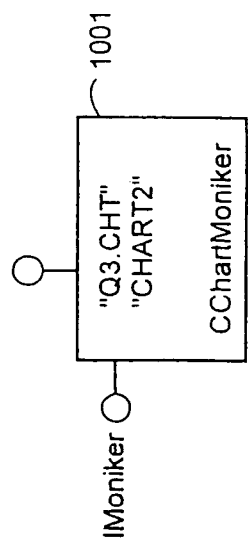

The example of FIGS. 6, 7, and 8 illustrate the use of a moniker that identifies a file. The present invention allows moniker to be combined (composed) to an arbitrary level. FIGS. 10A, 10B, and 10C illustrate moniker composition. For example, if the chart file 603 contained multiple charts, it would be useful to designate a specific chart to be the source of a link. In one embodiment of the present invention, a moniker class named "CChartMoniker" could be implemented by the developer of the chart program. A chart moniker 1001 would contain a name of a chart file ("Q3.CHT") and an indication of a chart within the file ("CHART2"). The methods of the class CChartMoniker would have a behavior similar to that provided by the class CFileMoniker plus behavior needed to bind to the identified chart. As described above, the present invention allows two monikers to be composed to form a third moniker. By composing monikers, a developer can use an implementation developed by someone else. For example, the developer of the chart program could define and implement the class CChartMoniker to contain only an indication of a chart within a file. The class CChartMoniker can be developed assuming that an instance of chart moniker 1003 will be composed with a file moniker (e.g., file moniker 1002). In a preferred embodiment, to facilitate the composing of monikers, a moniker of class CCompositeMoniker is defined and implemented. The class CCompositeMoniker encapsulates any two monikers into single generic composite moniker. The generic composite moniker 1004 encapsulates the file moniker 1002 and the chart moniker 1003. A link to a chart is stored as a generic composite moniker which encapsulates a file moniker and a chart moniker. The client of the link need only know that the moniker supports the IMoniker interface.

In the following, each method of the IMoniker interface is defined. In addition, several implementations of various methods are described. In particular, implementations of methods of the classes CFileMoniker, CCompositeMoniker, and CItemMoniker are described. The class CFileMoniker (a file moniker) is a moniker class that identifies a path name in a file system. When a file moniker is bound to, it determines the class of the file by using the persistent global registry, ensures that the appropriate class server is running, and then requests the server to open the file. The class CCompositeMoniker (a generic composite moniker) is a moniker class that identifies a composition of two monikers (a left and a right moniker). When a generic composite moniker is bound to, it invokes the binding method of the right moniker indicating that the left moniker is composed with the right moniker. The right moniker performs its binding behavior, which may include invoking the binding method of the left moniker. The class CItemMoniker (an item moniker) is a moniker class that implements behavior common to the identification of containee objects. An item moniker can be used to identify, for example, a chart contained within a chart file or a range within a spreadsheet. An item moniker uses the IOIeItemContainer interface (described in detail in the section entitled "Details of the Moniker Related Interfaces") to interact with the container. Code Table 4 contains the class definitions for a file moniker, a generic composite moniker, an item moniker, an anti moniker, and a pointer moniker. An anti moniker and a pointer moniker are described below in detail. A file moniker contains a string (m_szPath) indicating a path name and a count of anti monikers (m_cAnti). A generic composite moniker contains a pointer to the left moniker (m_pmkLeft) and a pointer to the right moniker (m_pmkRight) of the generic composite and a flag (m_fReduced) indicating whether the composite is reduced. An item moniker contains a pointer to a string (m_IpszItem) that defines the item.

CODE TABLE 4

```
class CFileMoniker: IMoniker
    { char FAR *                m_szPath;
      UINT m_cAnti;
    }
class CCompositeMoniker: IMoniker
    { LPMONIKER                 m_pmkLeft;
      LPMONIKER                 m_pmkRight;
      BOOL                      m_fReduced;
    }
class CItemMoniker: IMoniker
    { char FAR *                m_IpszItem;
    }
class CAntiMoniker: IMoniker
    { ULONG                     m_count;
    }
class CPointerMoniker: IMoniker
    { LPUNKNOWN                 m_punk;
    }
```

IMoniker::BindToObject

HRESULT IMoniker::BindToObject(pbc, pmkToLeft, iidResult, ppvResult)

The method BindToObject locates and loads the object semantically referred to by this moniker according to the interface specified by iidResult and returns a pointer to the object through ppvResult. In the following, the term "this moniker" refers to the moniker for which a method is invoked. In general, each class of moniker is designed to be used as one component in a generic composite moniker which gives the complete path to the referenced object. In a generic composite, any component moniker has a certain prefix of the generic composite to its left, and a certain suffix to its right. If the method BindToObject is invoked on a component moniker, then the implementation of BindToObject typically requires certain services of the object indicated by the prefix to its left. Item monikers, for example, require the IOIeItemContainer interface of the object to their left. The Item Moniker implementation of the method BindToObject (as described below) recursively calls pmkToLeft-22 BindToObject in order to obtain this interface. If the moniker does not need services of the object to its left, yet one is provided by the caller nevertheless, no error occurs. Rather, the moniker ignores the object to its left. If the object indicated by the moniker does not exist, then the error MK_E_NOOBJECT is returned.

In general, binding a moniker can be a complicated process, since it may need to launch servers, open files, etc. This may involve binding to other objects, and the binding components of a generic composite to the right of certain components will require the same other objects. In order to avoid loading the object, releasing it, then having it loaded again later, the method BindToObject can use the bind context passed through the pbc parameter to defer releasing objects until the binding process overall is complete. The bind context is described in detail in the section entitled "Details of the Moniker Related Interfaces".

Binding to a moniker a second time typically returns the same running object as binding the first time, rather than reloading it again from storage. This functionality is supported with a running object table. The running object table is a lookup table keyed by a moniker whose values are pointers to the corresponding now-running object. As objects become running, they register themselves in this table. Implementations of the method BindToObject uses this table to determine if the object to which they point is already running. More precisely, if the passed pmkToLeft parameter is NULL (and this is not an error; that is, the moniker does not require something to its left), then the moniker fully reduces itself, then looks itself up in the running object table, and returns the pointer to the object found there. The running object table is described in detail in the section entitled "Details of the Moniker Related Interfaces".

The following table describes the parameters of the method BindToObject:

| Argument | Type | Description |
| --- | --- | --- |
| pbc | IBindCtx* | the bind context to be used for this binding operation. |
| pmkToLeft | IMoniker* | the moniker of the object to the left of this moniker. |
| iidResult | IID | the requested interface by which the caller wishes to connect to the object. |
| ppvResult | void** | on successful return, a pointer to the instantiated object is placed here, unless BINDFLAGS_JUSTTESTEXISTENCE was specified in the binding options, in which case NULL may be returned instead. |
| return value | HRESULT | S_OK, MK_E_NOOBJECT, STG_E_ACCESSDENIED, MK_E_EXCEEDEDDEADLINE, MK_E_CONNECTMANUALLY, MK_E_INTERMEDIATEINTERFACENOTSUPPORTED. E_OUTOFMEMORY, E_NOINTERFACE |

Figure 11:
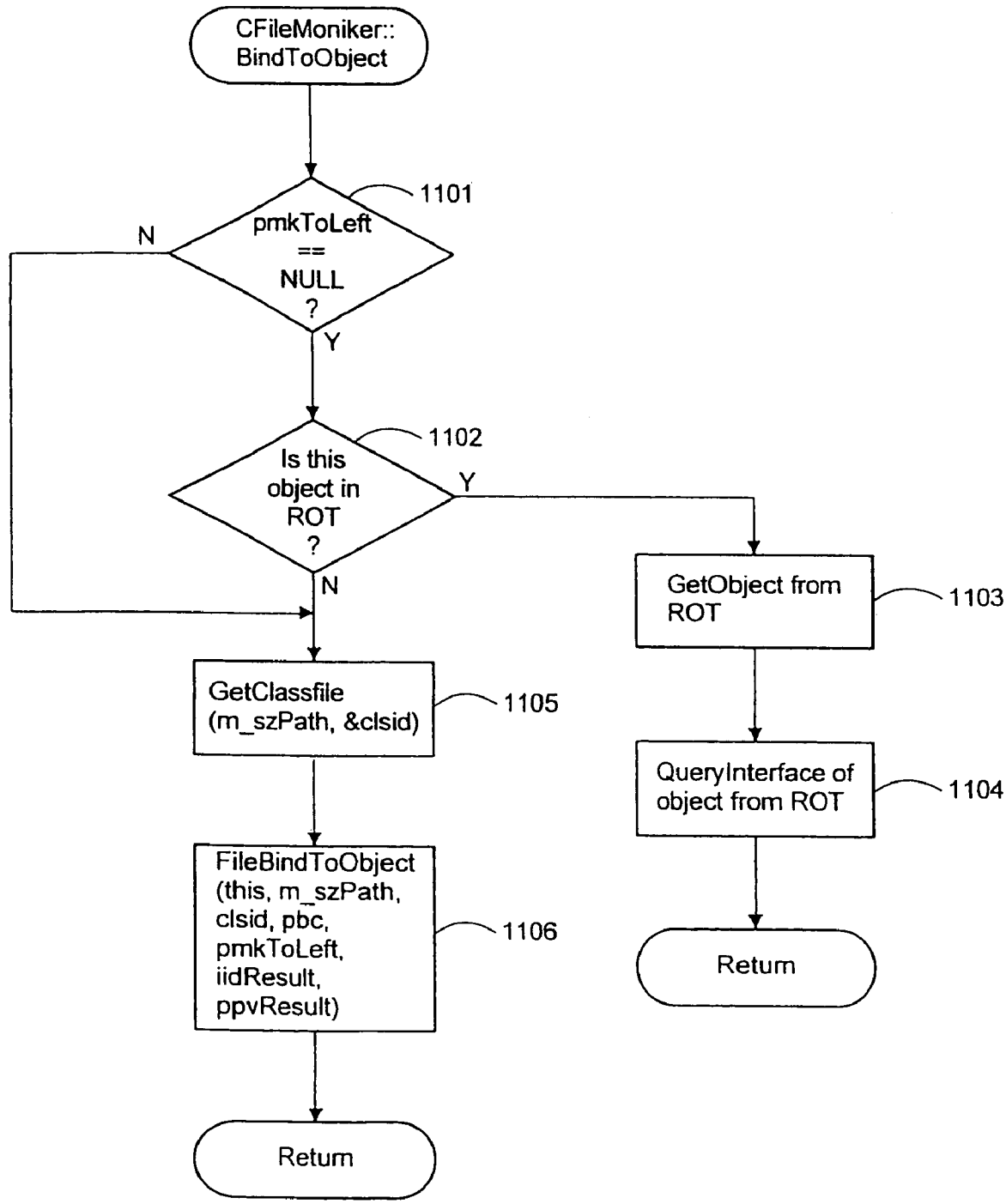
FIG. 11 is a flow diagram of the method BindToObject of the class CFileMoniker.

FIG. 11 is a flow diagram of the method BindToObject of the class CFileMoniker. This method determines the class identifier of the file, determines the server for that file, launches the server (if necessary), and requests the server to open and bind to the file. In step 1101, if a moniker to the left of this moniker is specified, then the method continues at step 1105, else the method continues at step 1102. In steps 1102 through 1104, the method determines whether the object identified by the moniker to the left is in the running object table. If the object to the left is in the running object table, then the requested interface (iidResult) is retrieved from that object and returned. In step 1102, if the object to the left is in the running object table, then the method continues at step 1103, else the method continues at step 1105. In step 1103, the method retrieves a pointer to the object to the left from the running object table. In step 1104, the method retrieves the requested interface from the object to the left by invoking the method QueryInterface of the object to the left and then returns. In step 1105, the method retrieves the class identifier corresponding to the path (m_szPath) of this moniker. The class identifier is preferably retrieved from a persistent global registry that maps file name suffixes to class identifiers. In step 1106, the method invokes the function FileBindToObject to bind to the file and returns the requested interface. The method then returns.

Figure 12:
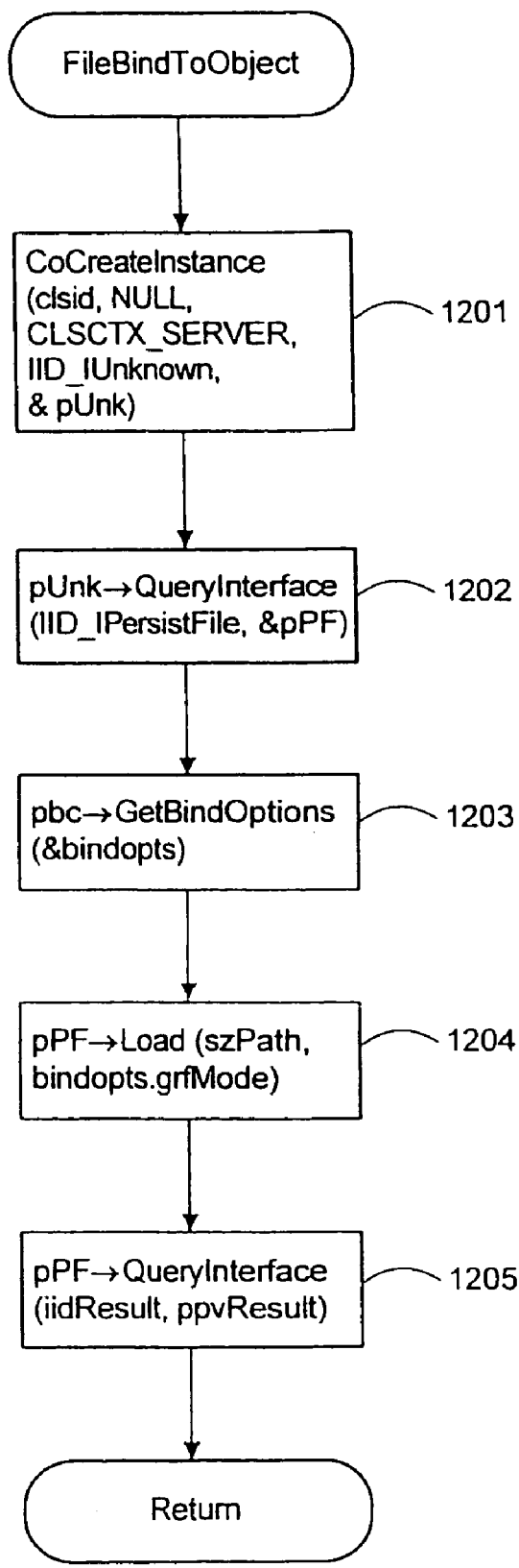
FIG. 12 is a flow diagram of the function FileBindToObject.

FIG. 12 is a flow diagram of the function FileBindToObject. This function is passed a class identifier and a requested interface. This function instantiates an object of the passed class identifier and returns a pointer to the requested interface. In step 1201, the function creates an instance of an object of the passed class identifier and retrieves the IUnknown interface. In step 1202, the function retrieves the IPersistFile interface from the instantiated object. The IPersistFile interface provides methods to load and save files and is described in detail in the section entitled "Details of the Moniker Related Interfaces". In step 1203, the function initializes binding options, which are described in detail in the section entitled "Details of the Moniker Related Interfaces". In step 1204, the function invokes the method Load of the IPersistFile interface to load the data for the created object. In step 1205, the function retrieves the requested interface from the created object and returns.

Figure 13:
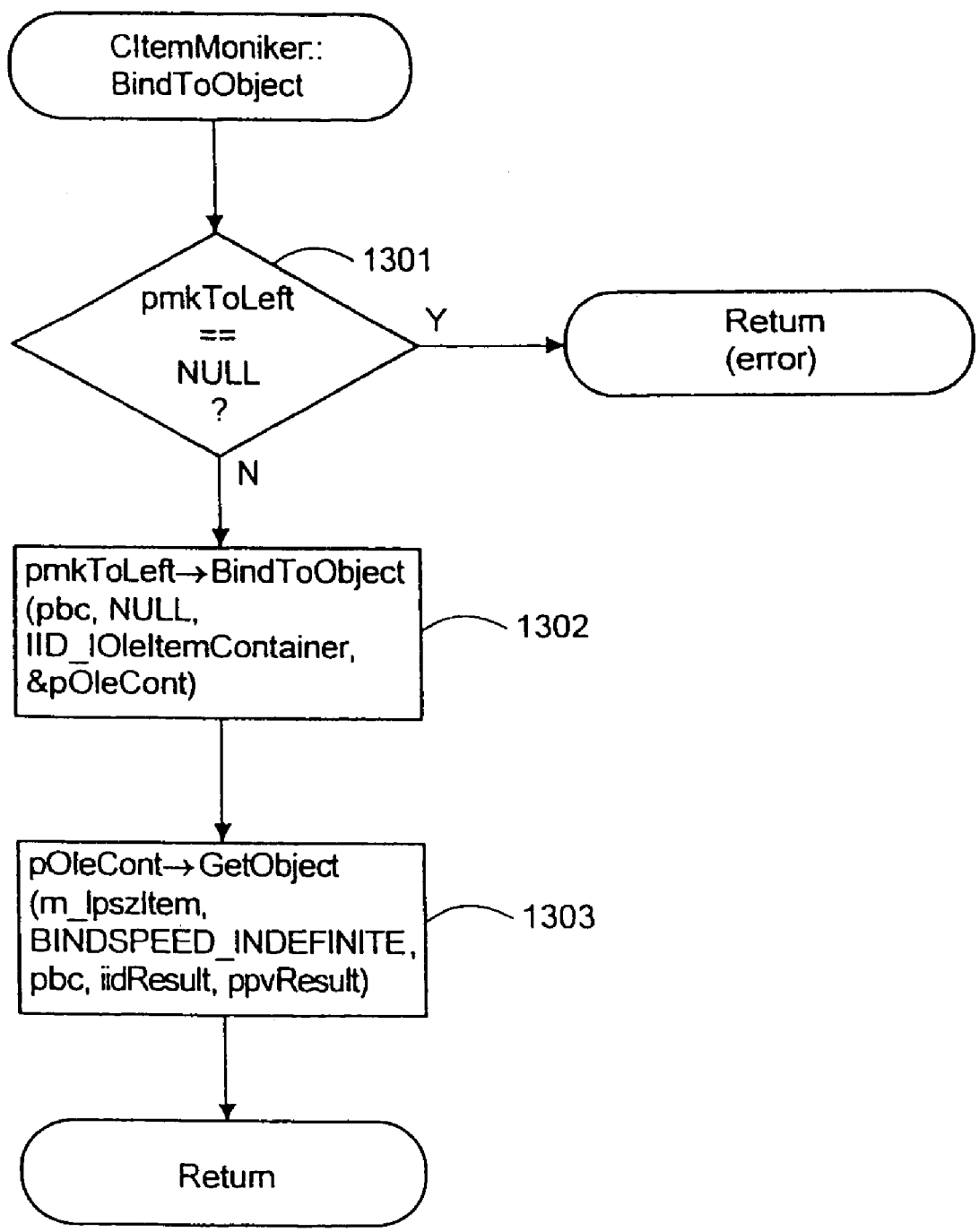
FIG. 13 is a flow diagram of the method BindToObject of the class CItemMoniker.

FIG. 13 is a flow diagram of the method BindToObject of the class CItemMoniker. In step 1301, if no moniker to the left of this moniker is specified, then the method returns an error, else the method continues at 1302. An item moniker identifies a containee object and requires a moniker to a container object to its left. In step 1302, the method invokes the method BindToObject of the moniker of the object to the left. The method requests the IOIeItemContainer interface from the object to the left. In step 1303, the method invokes the method GetObject of the IOIeItemContainer interface and passes the item name (m_lpszItem) and the requested interface. The method then returns with the interface retrieved by the method GetObject.

Figure 14:
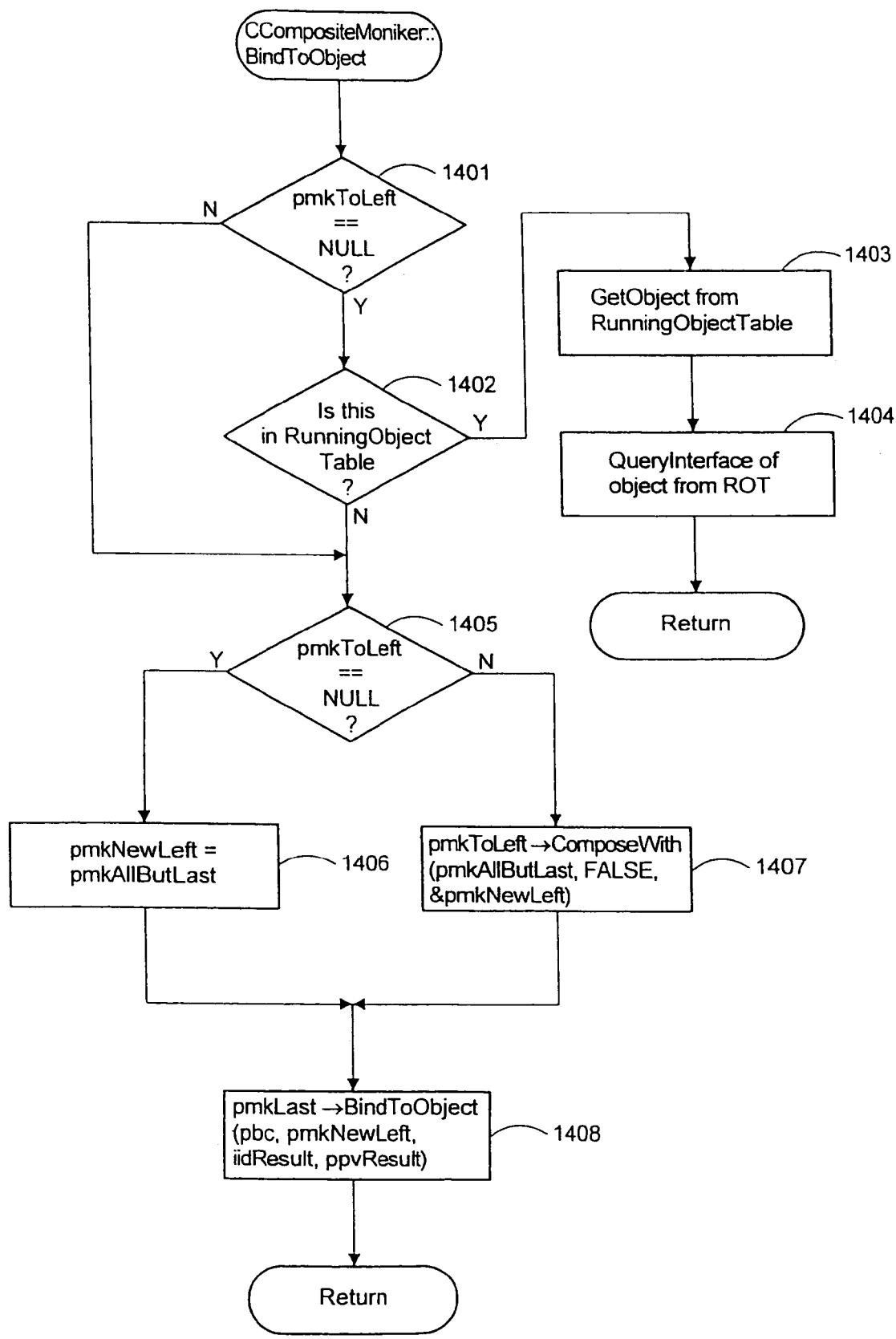
FIG. 14 is a flow diagram of the method BindToObject of the class CCompositeMoniker.

FIG. 14 is a flow diagram of the method BindToObject of the class CCompositeMoniker. The method binds to a generic composite moniker in a right-to-left manner. Conceptually, a generic composite moniker forwards the bind request to its last component moniker informing the last component moniker of the moniker to its left in the composite. The last component moniker, if it needs to, recursively binds to the object to its left. In step 1401, if no moniker to the left of this moniker is specified, the method continues at step 1402, else the method continues at step 1405. In step 1402, if this moniker is in the running object table, then the method continues at step 1403, else the method continues at step 1405. In step 1403, the method retrieves a pointer to the object from the running object table. In step 1404, the method retrieves the requested interface of the object by invoking the method QueryInterface of the object and returns. In steps 1405 through 1408, the method invokes the method BindToObject of the last component moniker of this moniker passing a moniker comprising the prefix component monikers as the moniker to the left. In step 1405, if no monikers to the left of this moniker is specified, then the method continues at step 1406, else the method continues at step 1407. In step 1406, the method creates a new left moniker that contains all but the last component moniker of this moniker. The method then invokes the method BindToObject of the last component moniker of this moniker passing it the newly-created left moniker and the requested interface in step 1408 and returns. In step 1407, the method composes the moniker to the left with all but the last component moniker of this moniker by invoking the method ComposeWith of the moniker to the left. The method then invokes the method BindToObject of the last component moniker of this moniker passing it the newly-created composed moniker and the identifier of the requested interface in step 1408 and returns.

Figure 15B:
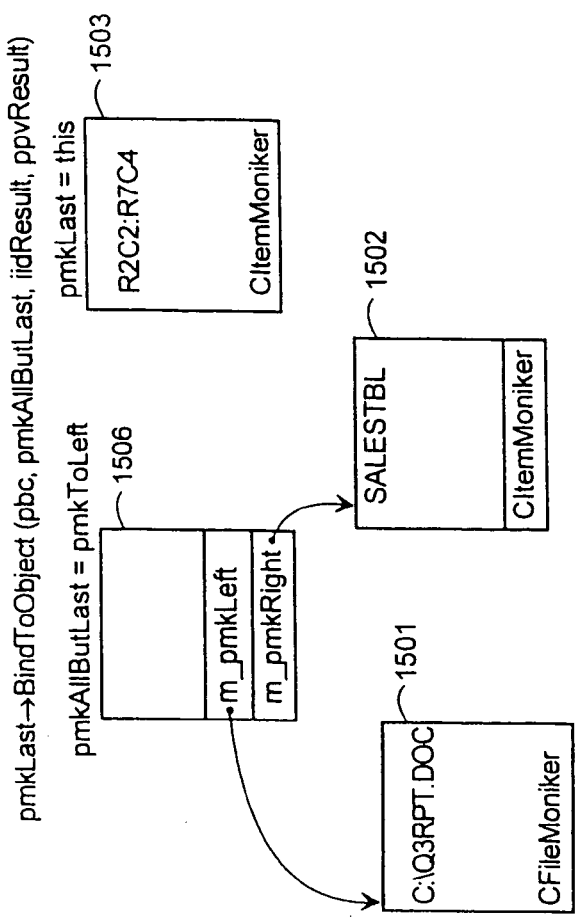
FIGS. 15A through 15F are block diagrams illustrating the binding to an object identified by a generic composite moniker.
Figure 15A:
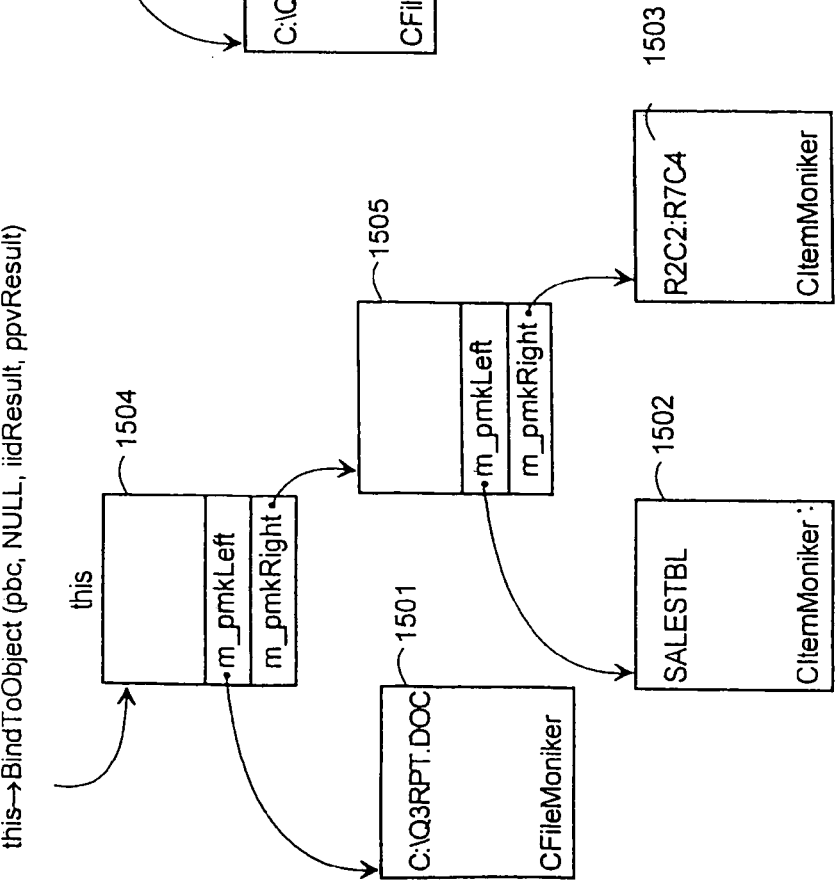
Figure 15F:
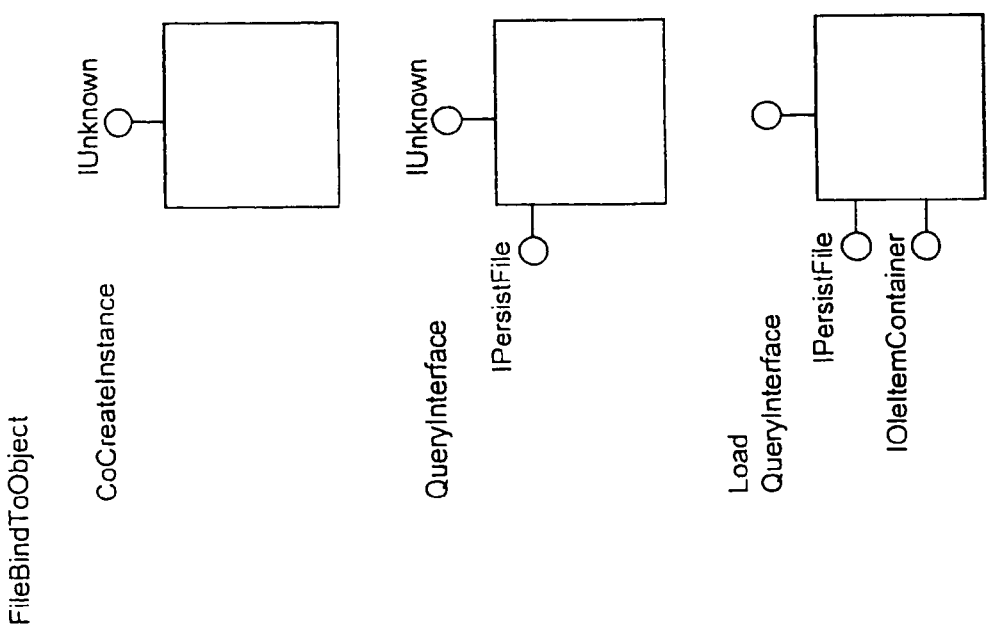
Figure 15G:
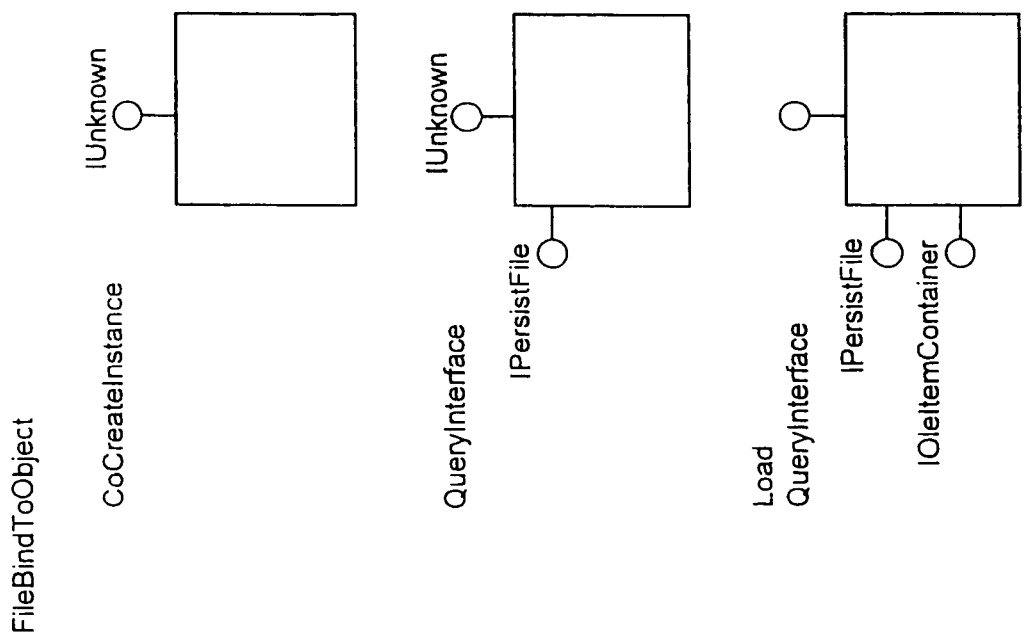

FIGS. 15A through 15F are block diagrams illustrating the binding to an object identified by a generic composite moniker. FIG. 15A illustrates the generic composite moniker that is to be bound. The generic composite moniker comprises components 1501, 1502, and 1503. The component monikers 1501, 1502, and 1503 represent a reference to an object identified by "C:\Q3RPT.DOC\SALESTBLRL\R2C2:R7C4". The component moniker 1501 is the first component moniker of the generic composite moniker, and the component moniker 1503 is the last component moniker of the generic composite moniker. The component monikers 1502 and 1503 are all but the first component monikers of the generic composite moniker, and the component monikers 1501 and 1502 are all but the last component monikers of the generic composite moniker. These component monikers are composed using generic composite monikers 1504 and 1505. To bind to the object identified by the generic composite moniker 1504, the method BindToObject is invoked indicating that there is no moniker to the left and indicating the identifier of a requested interface. Since moniker 1504 is a generic composite moniker, the method represented by the flow diagram of FIG. 14 is executed. Since there is no moniker to the left and since for this example the generic composite moniker 1504 is not in the running object table, the method continues at step 1406. In step 1406, the method creates the generic composite moniker 1506 that contains all but the last component moniker of the generic composite moniker 1504. In step 1408, the method invokes the method BindToObject of the last component moniker 1503 passing the generic composite moniker 1506 as the moniker to the left and the identifier of the requested interface. Since the component moniker 1503 is an item moniker, the method represented by the flow diagram of FIG. 13 is executed. Since a moniker to the left is specified, step 1302 is executed. In step 1302, the method invokes the method BindToObject of the moniker to the left (generic composite moniker 1506) passing no moniker to the left and requesting the IOIeItemContainer interface. Since the generic composite moniker 1506 is a generic composite moniker, the method represented by the flow diagram of FIG. 14 is executed. Since no moniker to the left is specified, the method continues at step 1406. In step 1406, the method sets the new left moniker to the moniker 1501. In step 1408, the method invokes the method BindToObject of the item moniker 1502 passing the new left moniker 1501 and requesting the passed interface, which is the interface to the IOIeItemContainer. Since the item moniker 1502 is an item moniker, the method represented by the flow diagram of FIG. 13 is executed. Since there is a moniker to the left is specified, step 1302 is executed. In step 1302, the method invokes the method BindToObject of the moniker to the left (file moniker 1501). Since the file moniker 1501 is a file moniker, the method represented by the flow diagram of FIG. 11 is executed. Since no moniker to the left is specified, the method continues at step 1105. In steps 1105 and 1106, the method binds to the file object and returns the requested interface as shown in FIG. 15F. The invocation of the method BindToObject of the item moniker 1503 eventually in step 1303 invokes the method GetObject of the IOIeltemContainer interface returned in step 1302 to retrieve the requested interface.

IMoniker::ComposeWith

RESULT IMoniker::ComposeWith(pmkRight, fOnlyIfNotGeneric, ppmkComposite)

This method ComposeWith returns a new moniker which is a composite formed with this moniker on the left and the passed moniker (pmkRight) on the right. There are two kinds of composite monikers: those composite monikers that know nothing about their component monikers other than that they are monikers (a generic composite moniker), and those composite monikers that know more (a special composite moniker). For example, a file moniker containing a relative path may be composed on to the end of another file moniker. The resulting composite moniker could be a new file moniker containing the complete path. The new file moniker is a special composition. A special composition is useful for monikers that are capable of collapsing a path within a storage domain to a more efficient representation in a subsequent reduction.

Each moniker class may have a set of other kinds of special monikers that can be composed onto the end of it in a non-generic way; Each implementation of the method ComposeWith examines the passed moniker on the right (pmkRight) to see if it is such a special moniker for the implementation. If the specified moniker on the right is special, then the implementation does whatever is appropriate for that special case. If it is not, then the passed flag fOnlyIfNotGeneric controls what occurs. If flag fOnlyIfNotGeneric is true, then NULL is passed back through parameter ppmkComposite and the status MK_E_NEEDGENERIC returned; if fOnlyIfNotGeneric is false, then a generic composite moniker is created using the function CreateGenericComposite and returned.

If the specified moniker on the right (pmkRight) completely annihilates this moniker, the resulting composite is empty and the parameter ppmkComposite is set to NULL and the status S_OK returned.

Composition of monikers is an associative operation. That is, if A, B, and C are monikers, then (A∘B)∘C is always equal to

A∘(B∘C)

where ∘ represents the composition operation.

The following table describes the parameters of the method ComposeWith:

| Argument | Type | Description |
| --- | --- | --- |
| pmkRight | IMoniker* | the moniker to compose onto the end of the receiver. |
| fOnlyIfNotGeneric | BOOL | controls whether a composite moniker should be returned when the right moniker is not a special moniker for this moniker. |
| ppmkComposite | IMoniker* | on exit, the resulting composite moniker. Possibly NULL. |
| return value | HRESULT | S_OK, MK_E_NEEDGENERIC |

Figure 16:
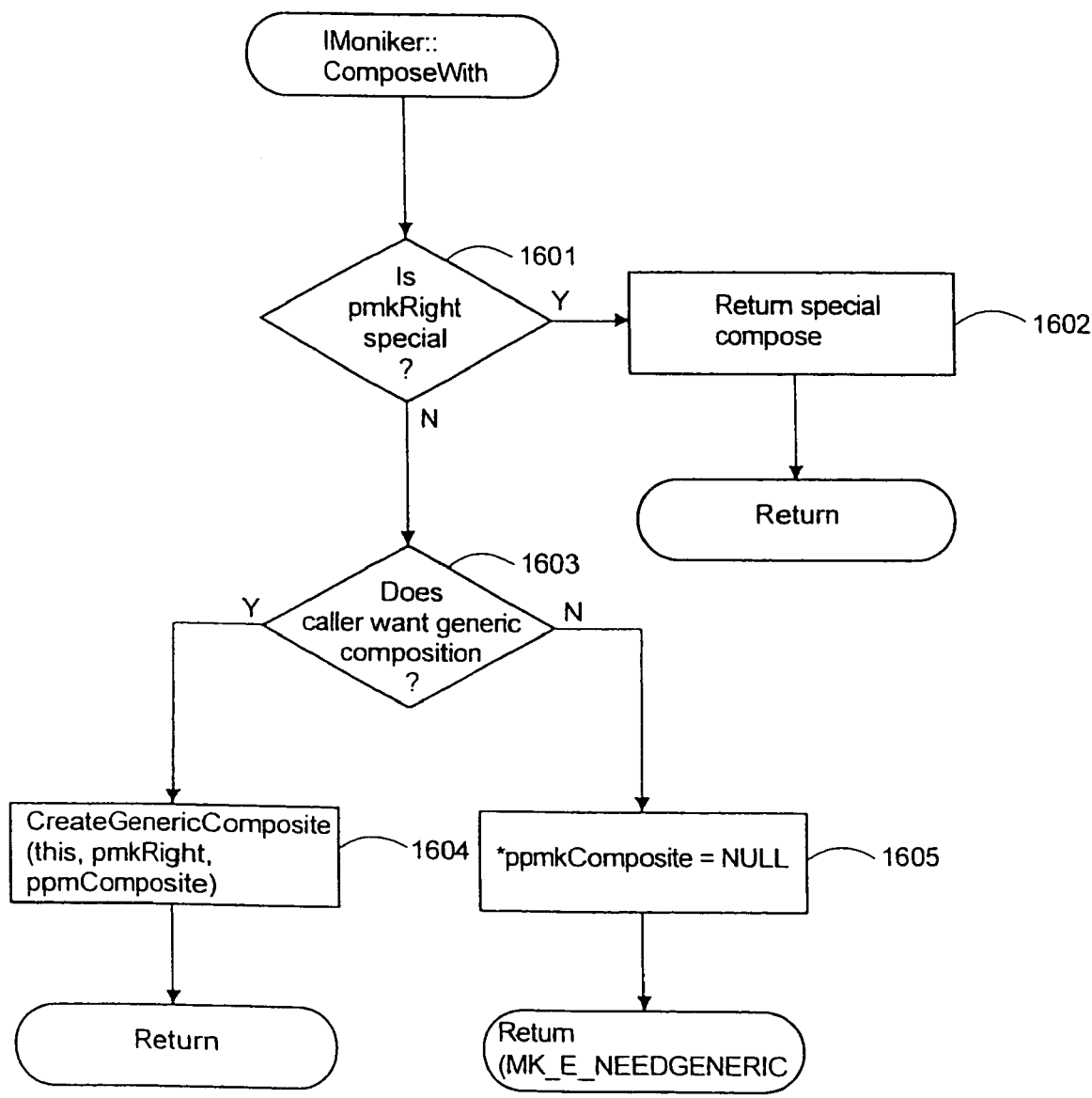
FIG. 16 is a flow diagram illustrating the overall behavior of implementations of the method ComposeWith.

FIG. 16 is a flow diagram illustrating the overall behavior of implementations of the method ComposeWith. In step 1601, if the moniker to the right (pmkRight) is special, then the method continues at step 1602, else the method continues at step 1603. In step 1602, the method performs a composition associated with the special moniker and returns. In step 1603, if the caller wants a generic composition when no special composition occurs (fOnlyIfNotGeneric==FALSE), then the method continues at step 1604, else the method continues at step 1605. In step 1604, the method creates a generic composite moniker by invoking the function CreateGenericMoniker and returns. In step 1605, the method returns an indication that composite moniker is NULL and sets the return flag to indicate that no special or generic composition occurred.

Figure 17:
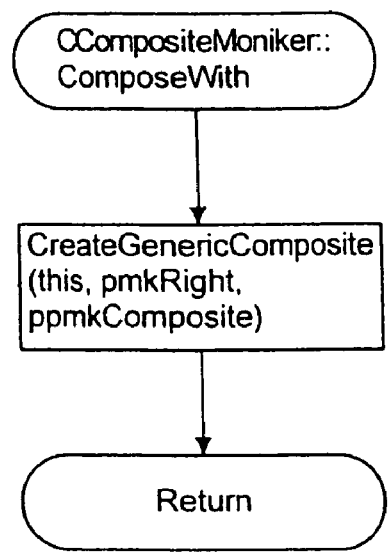
FIG. 17 is a flow diagram of the method ComposeWith of the class CCompositeMoniker.

FIG. 17 is a flow diagram of the method ComposeWith of the class CCompositeMoniker. The method invokes the function CreateGenericComposite (described below) and returns.

CODE TABLE 4A

```
CreateGenericComposite (pmkFirst, pmkRest, ppmkComposite)
{
Case1:
    pmkFirst- > ComposeWith (pmkRest, TRUE, ppmkComposite)
    if (no composition occurred)
        CCompositeMoniker::Create (pmkFirst, pmkRest,
          ppmkComposite)
Case2:
    pmkFirst- > ComposeWith (pmkFirstOfRest, TRUE, &pmk)
    if (no composition occurred)
        CCompositeMoniker::Create(pmkFirst, pmkRest,
          ppmkComposite)
    else
        if (pmk! = NULL)
            CreateGenericComposite (pmk,
              pmkAllButFirstOfRest, ppmkComposite)
        else
            *ppmkComposite = pmkAllButFirstOfRest
Case3:
    pmkLastOfFirst- > ComposeWith(pmkRest, TRUE, &pmk);
    if (no composition occurred)
        CCompositeMoniker::Create(pmkFirst, pmkRest,
          ppmkComposite)
    else
        if (pmk! = NULL)
            CreateGenericComposite (pmkAllButLastOfFirst,
              pmk, ppmkComposite)
        else
            *ppmkComposite = pmkAllButLastOfFirst
Case4:
    pmkLastOfFirst- > ComposeWith (pmkFirstOfRest, TRUE,
      &pmk)
    if (no composition occurred)
        CCompositeMoniker::Create(pmkFirst, pmkRest,
          ppmkComposite)
    else
        if (pmk! = NULL)
            CreateGenericComposite
              (pmkAllButLastOfFirst, pmk, &pmk2)
            CreateGenericComposite (pmk2,
              pmkAllButFirstOfRest, ppmkComposite)
        else
            CreateGenericComposite
              (pmkAllButLastOfFirst,
              pmkAllButFirstOfRest, ppmkComposite)
}
```

CreateGenericComposite

HRESULT CreateGenericComposite(pmkFirst, pmkRest, ppmkComposite)

The function CreateGenericComposite allocates and returns a new generic composite moniker. The parameters pmkFirst and pmkRest point to the first and trailing monikers that are to comprise the generic composite monikers, respectively. Either pmkFirst or pmkRest may be a generic composite moniker, or another kind of moniker. The following table describes the parameters of the function CreateGenericComposite:

| Argument | Type | Description |
|---|---|---|
| pmkFirst | IMoniker* | the first moniker in the new composite. |
| pmkRest | IMoniker* | the trailing (rest) moniker in the new composite. |
| ppmkComposite | IMoniker* | a pointer to the new composite. |
| return value | HRESULT | S_OK, E_OUTOFMEMORY |

Code Table 4A contains C++ pseudocode for the function CreateGenericComposite. The function handles four specific cases. The first case occurs when neither the first moniker (pmkFirst) nor the rest moniker (pmkRest) are generic composite monikers. The second case occurs when the first moniker is not a generic composite moniker, but the rest moniker is a generic composite moniker. The third case occurs when the first moniker is a generic composite moniker, but the rest moniker is not a generic composite moniker. The fourth case occurs when both the first moniker and the rest moniker are generic composite monikers.

Figure 18:
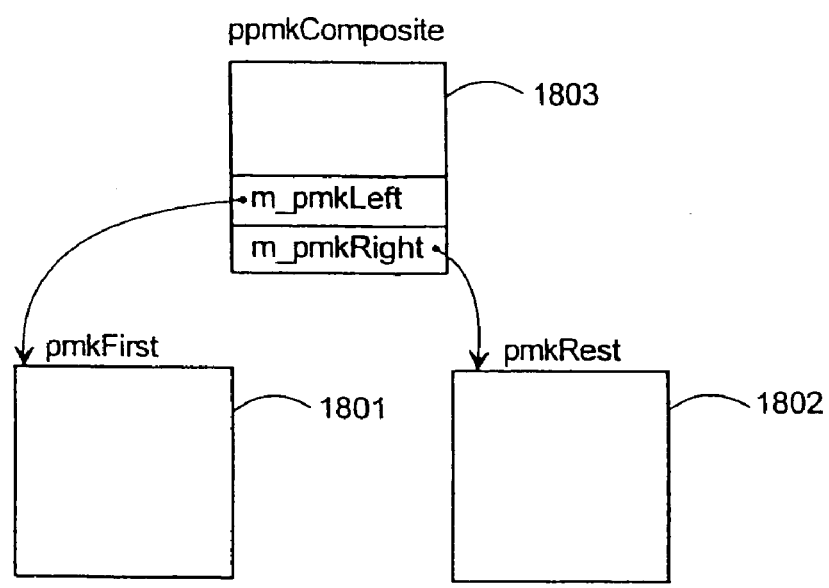
Figure 21A:
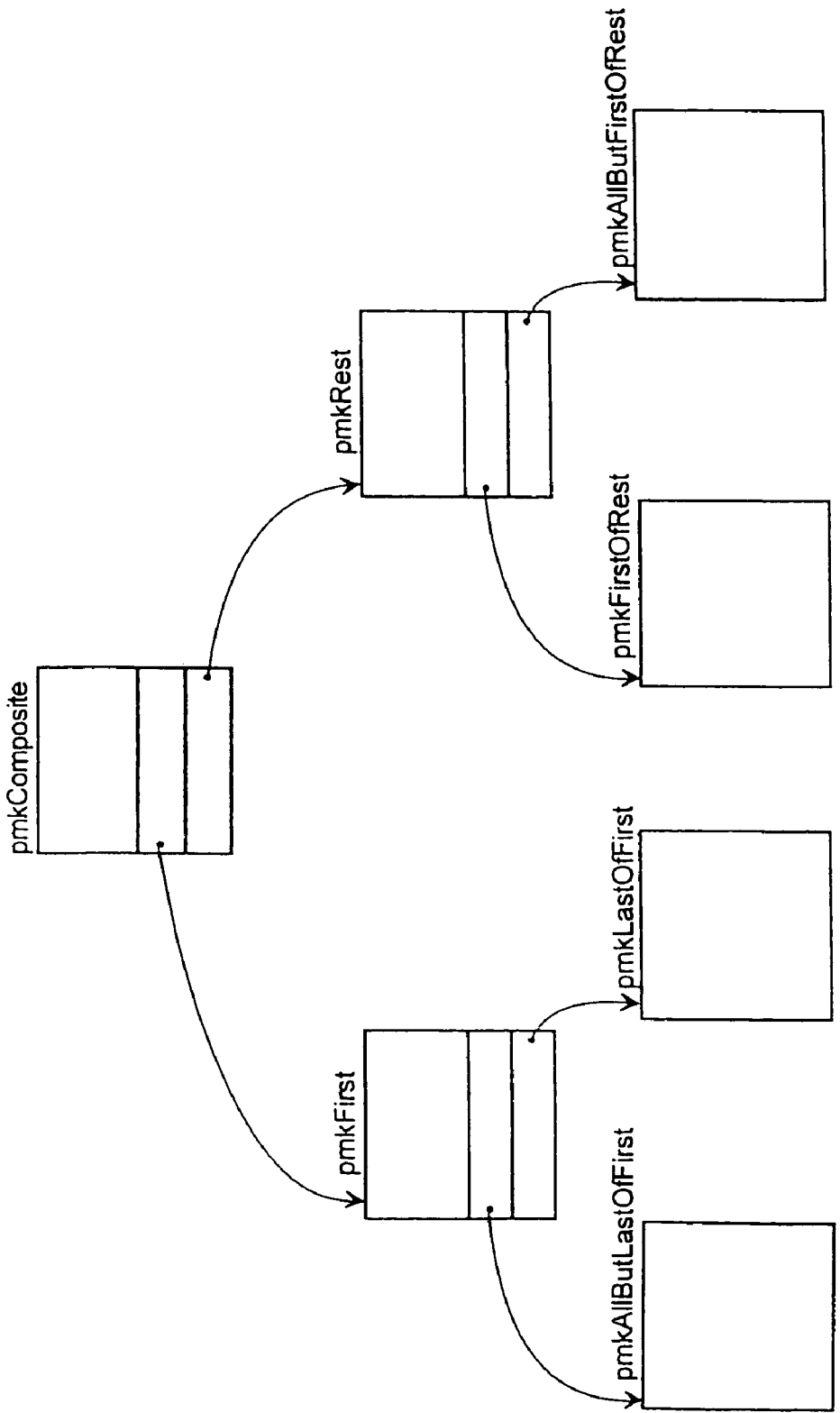
Figure 21C:
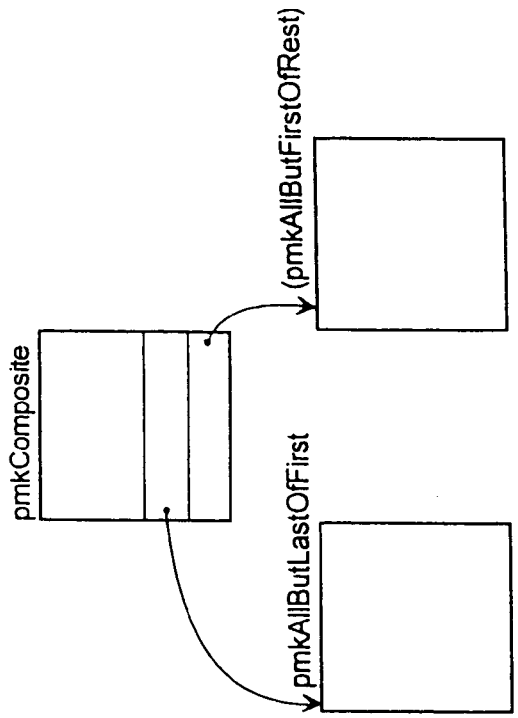
Figure 21B:
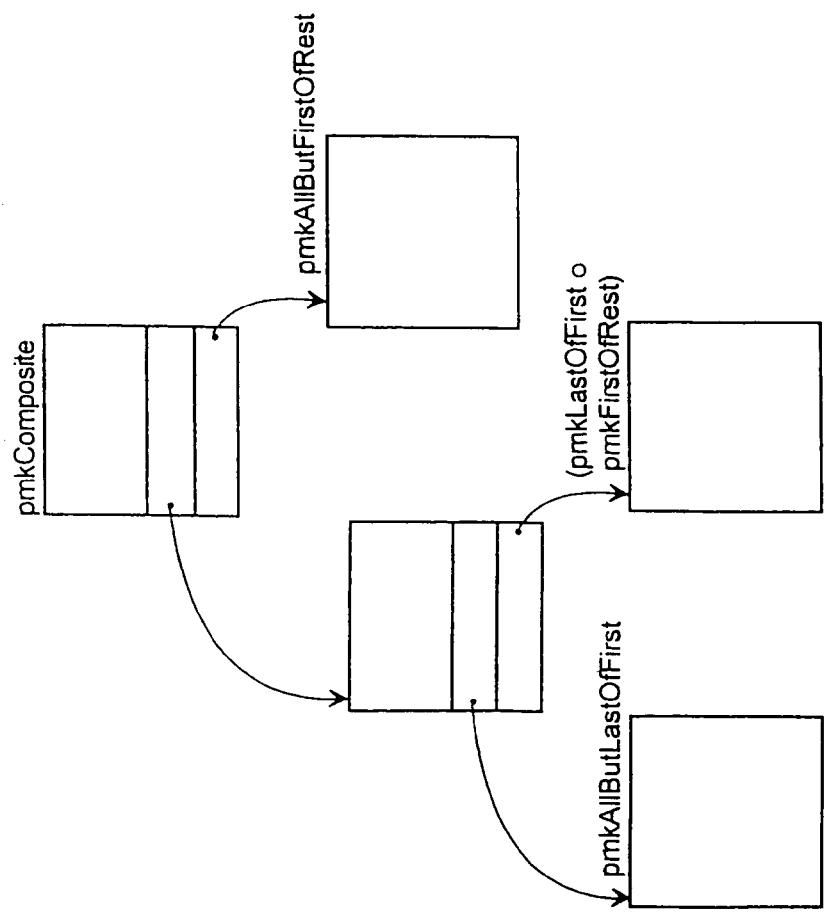

In the first case, the function CreateGenericComposite invokes the method ComposeWith of the first moniker passing the rest moniker and specifying that a composition should occur only if not generic. If the rest moniker is not a special moniker for the first moniker, then no composition occurs and the function creates a composite moniker by invoking the method Create of the class CCompositeMoniker passing the first moniker and the rest moniker. The method Create of the class CCompositeMoniker creates a generic composite moniker that points to the specified monikers and returns a pointer to the created moniker. FIG. 18 illustrates the resulting generic composite moniker 1803 of the first case when the rest moniker 1802 is not a special moniker of the first moniker 1801. In the second case, the function CreateGenericComposite invokes the method ComposeWith of the first moniker passing the first component moniker of the rest moniker. If the first component moniker of the rest moniker is not a special moniker for the first moniker, then no composition occurs and the method creates a composite moniker by invoking the method Create of the class CCompositeMoniker passing the first moniker and the rest moniker. FIG. 19A illustrates a representative resulting generic composite moniker 1905 when the first component moniker 1903 of the rest moniker 1902 is not a special moniker of the first moniker 1901. If, however, a composition of the first moniker and the first component of the rest moniker occurs and a moniker is returned, then the function recursively calls the function CreateGenericComposite to compose the moniker returned with all but the first component moniker of the rest moniker. FIG. 19B illustrates the resulting generic composite moniker 1907 that contains the composite moniker 1906, which is the composition of the first moniker and the first component moniker of the rest moniker, and contains the moniker 1904, which includes all but the first component moniker of the rest moniker. If the composition of the first moniker and the first component moniker of the rest moniker resulted in an annihilation of the monikers (pmk==NULL), then the function returns a pointer to a moniker formed by all but the first component moniker of the rest moniker as illustrated in FIG. 19C. In the third case, the function CreateGenericComposite invokes the method ComposeWith of the last component moniker of the first moniker passing the rest moniker. If the rest moniker is not a special moniker for the last component moniker of the first moniker, then no composition occurs and the function creates a composite moniker by invoking the method Create of the class CCompositeMoniker passing the first moniker and the rest moniker as illustrated by the representative generic composite moniker in FIG. 20A. If, however, a composition occurs, and a moniker is returned, then the method recursively invokes the function CreateGenericComposite passing all but the last component moniker of the first component moniker and the returned moniker as indicated in FIG. 20B. If, however, the composition of the first moniker with the first component moniker of the rest moniker resulted in an annihilation of the monikers, then the function returns a moniker comprising all but the last component moniker of the first moniker as the composite moniker as illustrated by FIG. 20C. In the fourth case, the function CreateGenericComposite invokes the method ComposeWith of the last component moniker of the first moniker passing the first component moniker of the rest moniker. If the first component moniker of the rest moniker is not a special moniker for the last component moniker of the first moniker, then no composition occurs and the function invokes the method Create of the class CCompositeMoniker passing the first moniker and the rest moniker resulting in the sample generic composite moniker of FIG. 21A. If, however, a composition does occur without annihilation, then the function recursively invokes the function CreateGenericComposite passing the composed moniker and all but the last component moniker of the first moniker. The function then recursively invokes the function CreateGenericComposite passing the resulting composite moniker and all but the first component moniker of the rest moniker resulting in the representative composite moniker of FIG. 21B. If the composition results in annihilation of the last component moniker of the first moniker and the first component moniker of the rest moniker, then the function recursively invokes the function CreateGenericComposite passing all but the last component moniker of the first moniker and all but the first component moniker of the rest moniker resulting in the representative generic composite moniker of FIG. 21C.

IMoniker::Reduce

HRESULT IMoniker::Reduce(pbc, dwReduceHowFar, ppmkToLeft, ppmkReduced)

The method Reduce requests a moniker to re-write itself into another equivalent moniker. This method returns a new moniker that will bind to the same object, but does so in a more efficient way. This capability has several uses:

It enables the construction of user-defined macros or aliases as new kinds of moniker classes. When reduced, the moniker to which the macro evaluates is returned.

It enables the construction of a kind of moniker which tracks data as it moves about. When reduced, the moniker of the data in its current location is returned.

On certain file systems which support an ID-based method of accessing files that is independent of file names, a file moniker could be reduced to a moniker which contains one of these IDs.

Figure 22:
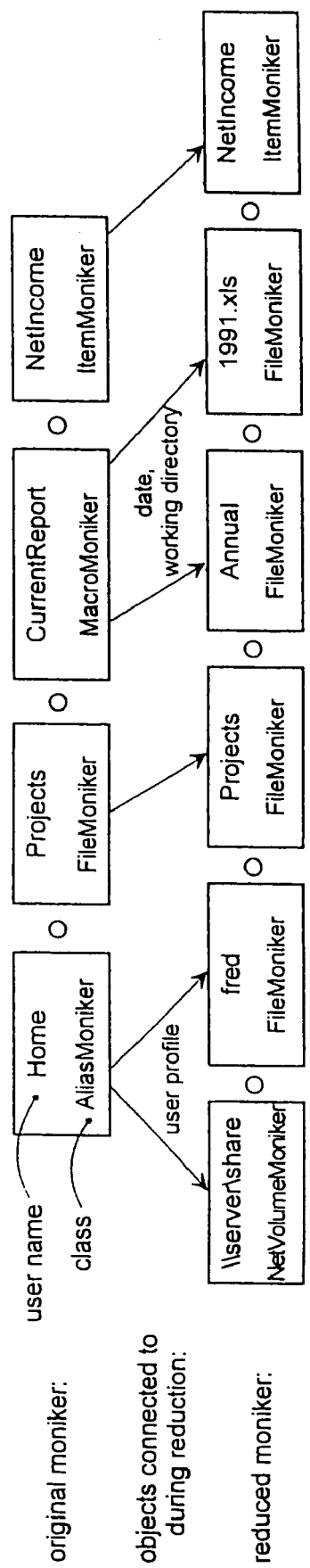
FIG. 22 is a block diagram illustrating moniker reduction.

FIG. 22 shows an example of moniker reduction. This example illustrates the reduction of a moniker which names the net income entry for this year's report in the "Projects" directory of the current user's home directory. (Note that the particular classes of monikers used here are for illustrative purposes only.) Several monikers in this example are reduced to something completely different, and some bind to something during their reduction, but some do not. For example, to reduce the alias "Home", the reduction must access the information that "Home" was an alias for "\\server\share\fred" Monikers may reduce to themselves, when they, cannot be rewritten any further. A moniker which reduces to itself indicates this by returning itself through parameter ppmkReduced and the returning status code MK_S REDUCED_TO- _SELF. A moniker which reduces to nothing returns NULL in parameter ppmkReduced and the status code S_OK. If a moniker does not reduce to itself, then this method does not reduce this moniker in-place; instead, it returns a new moniker.

The reduction of a moniker which is a composite of other monikers repeatedly reduces the component monikers of which it is composed until they all reduce to themselves, and then returns the composite of the reduced components. The parameter dwReduceHowFar controls the stopping point of the reduction process. It controls to what extent the reduction should be carried out. It has the following values.

```
typedef enum tagMKRREDUCE {
    MKRREDUCE_ONE        = 3 < < 16,
    MKRREDUCE_TOUSER     = 2 < < 16,
    MKRREDUCE_THROUGUSER = 1 < < 16,
    MKRREDUCE_ALL        = 0
} MKRREDUCE;
```

These values have the following semantics.

| Value | Description |
| --- | --- |
| MKRREDUCE_ONE | Perform only one step of reduction on this moniker. In general, the caller will have to have specific knowledge as to the particular kind of moniker in question in order to be able to usefully take advantage of this option. |
| MKRREDUCE_TOUSER | Reduce this moniker to the first point where it first is of the form where it represents something that the user conceptualizes as being the identity of a persistent object. For example, a file name would qualify, but a macro or an alias would not. If no such point exists, then this option should be treated as MKRREDUCE_ALL. |
| MKRREDUCE_THROUGUSER | Reduce this moniker to the point where any further reduction would reduce it to a form which the user does not conceptualize as being the identity of a persistent object. Often, this is the same stage as MKRREDUCE_TOUSER. |
| MKRREDUCE_ALL | Reduce the entire moniker, then, if needed reduce it again and again to the point where it reduces to simply itself. |

The following table describes the parameters of the method Reduce:

| Argument | Type | Description |
| --- | --- | --- |
| pbc | IBindCtx* | The bind context to use in this operation. |
| dwReduceHowFar | DWORD | Indicates to what decree this moniker should be reduced. |
| ppmkToLeft | IMoniker** | On entry, the moniker which is the prefix of this one in the composite in which it is found. On exit, the pointer is either NULL or non-NULL. Non-NULL indicates that what was previously thought of as the prefix should be disregarded and the moniker returned through ppmkToLeft considered the prefix in its place. NULL indicates that the prefix should not be so replaced. Thus, most monikers will NULL out this parameter before returning. |
| ppmkReduced | IMoniker** | On exit, the reduced form of this moniker. Possibly NULL. |
| return value | HRESULT | S_OK, MK_S_REDUCED_TO_SELF, MK_E_EXCEEDEDDEADLINE. |

Figure 23:
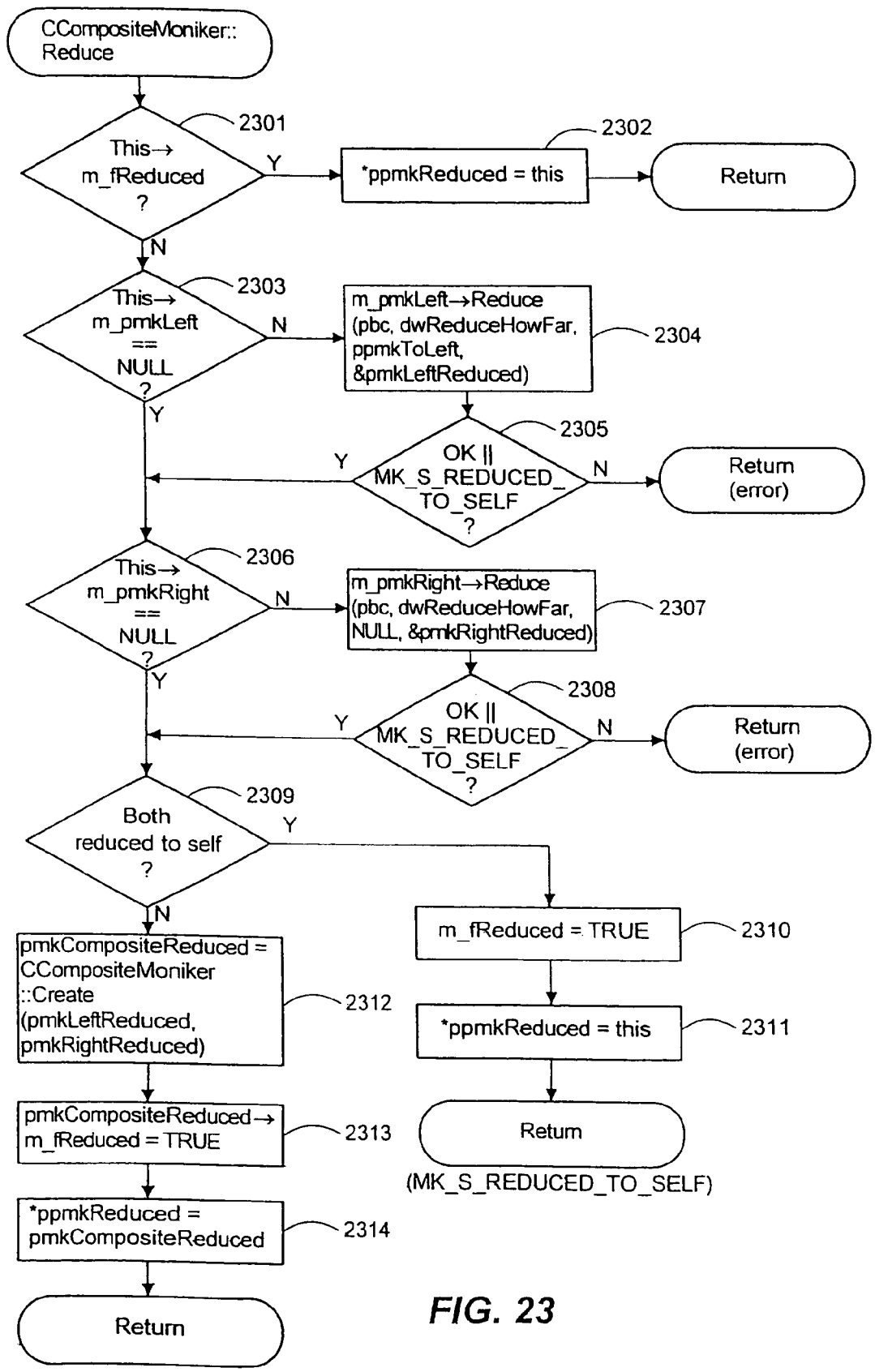
FIG. 23 is a flow diagram of the method Reduce of the class CCompositeMoniker.

FIG. 23 is a flow diagram of the method Reduce of the class CCompositeMoniker. The method reduces each of the component monikers in a left-to-right manner and creates a composite of the result. If any of the component monikers do not reduce to themselves (and thus, the generic composite moniker overall does not reduce to itself), then the process of reduction is repeated. In an alternate embodiment, the method tracks component monikers that reduce to themselves and suppresses their re-reduction. In step 2361, if this moniker is already reduced as indicated by the data member m_freduced, then the method continues at step 2302, else the method continues at step 2303. In step 2302, the method sets the pointer to the reduced moniker to point to this moniker and returns indicating that the moniker reduced to itself. In step 2303, if the left moniker is NULL, then the method continues at step 2306, else the method continues at step 2304. In step 2304, the method invokes the method Reduce of the left moniker passing the moniker to the left of this moniker and returning a left reduced moniker (pmkLeftReduced). In step 2305, if no error occurred or the left moniker reduced to itself, then the method continues at step 2306, else the method returns an error. If this moniker has no right moniker (m_pmkRight), then the method continues at step 2309, else the method continues at step 2307. In step 2307, the method invokes the method Reduce of the right moniker passing an indicator of a NULL moniker to the left and returning a right reduced moniker (pmkRightReduced). In step 2308, if no error occurred or the right moniker reduced to itself, then the method continues at step 2309, else the method returns an error. In step 2309, if both the left and right monikers reduced to themselves, then the method continues at step 2310, else the method continues at step 2312. In step 2310, the method sets the state of this moniker to reduced (m_fReduced). In step 2311, the method sets the pointer to the reduced moniker to point to this moniker and the method returns with an indication that this moniker reduced to itself. In step 2312, the method invokes the method Create of the class CCompositeMoniker passing the left reduced moniker and the right reduced moniker and returning the result as a composite reduced moniker (pmkCompositeReduced). In step 2313, the method sets the state of the composite reduced moniker to reduced (m_fReduced). In step 2314, the method sets the pointer to the reduced moniker to point to the composite reduced moniker and returns.

Figure 24:
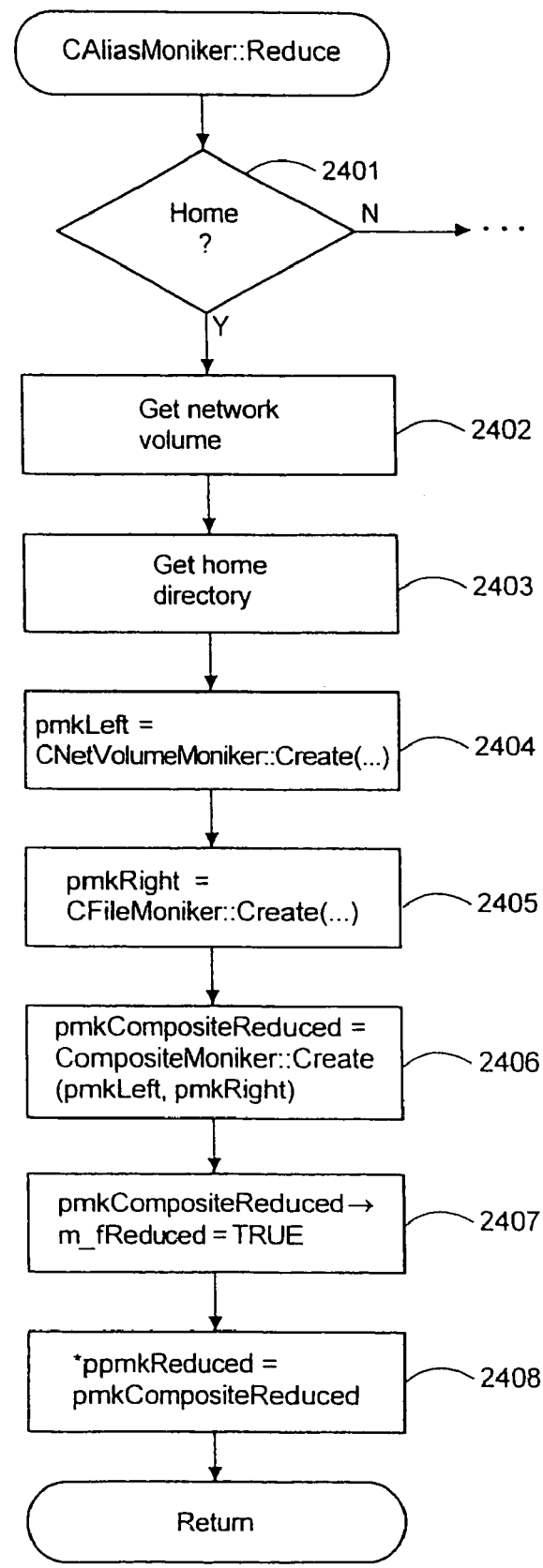
FIG. 24 is a flow diagram of the method Reduce of the sample class CAliasMoniker.

FIG. 24 is a flow diagram of the method Reduce of the sample class CAliasMoniker. The reduction of an alias moniker is illustrated in FIG. 22. In step 2401, if the alias moniker indicates the home directory, then the method continues at step 2402, else the method tests for other types of alias indicated by the ellipsis. In step 2402, the method retrieves the network volume associated with the user. In step 2403, the method retrieves the home directory for the user. In step 2404, the method creates a net volume moniker passing it the name of the network volume. In step 2405, the method creates a file moniker passing it the name of the user's home directory. In step 2406, the method creates a generic composite moniker passing it the net volume moniker and the file moniker. In step 2407, the method sets the generic composite moniker to indicate that it is reduced. In step 2408, the method sets the pointer to the reduced moniker to the composite moniker (pmkCompositeReduced) and returns.

CODE TABLE 5

```
{       A = CreateMoniker (cFileMoniker,
            "c:\reports\expenses\weekly")
        B = CreateMoniker (cFileMoniker,
            getcurrentusername)
        C = CreateMoniker (cFileMoniker, dayofweek
            (getcurrentdate-oneday))
        Result = A∘B∘C
}
```

CODE TABLE 6

```
{       A = CreateMoniker (cFileMoniker, "c:\taxes")
        Prompt "Enter year:", year
        B = CreateMoniker (cFileMoniker, year)
        C = CreateMoniker (cFileMoniker, "\1040.XLS")
        D = CreateMoniker (cItemMoniker, "R1C1:R10C10")
        Result A∘B∘C∘D
}
```

In a preferred embodiment, a macro moniker allows for arbitrary moniker creation. A macro moniker contains a macro script that controls the reduction of a macro moniker to another moniker. During reduction, the script is parsed and processed by the method Reduce. One skilled in the art would appreciate that parsing and processing macro scripts are well known. The result of the processing is another moniker that is returned as the reduced moniker. For example, Code Table 5 contains a script that directs the macro moniker to reduce to a moniker referencing the directory "c:\reports\expenses\weekly\user\dayofweek", where user is the current user name (e.g., "Smith") and dayofweek is the day of week of yesterday (e.g., "Thursday"). The macro moniker with the script of Code Table 5 may reduce to a file moniker with a path name of "c:\reports\expenses\weekly\smith\thursday". The macro moniker may contain a pointer to the reduced moniker. The method BindToObject of a macro moniker would typically invoke the method Reduce and then invoke the method BindToObject of the reduced moniker. Code Table 6 contains a macro script that directs the macro moniker to reduce to a moniker and in the process prompts the user for a portion of the path.

CODE TABLE 7

```
{ SELECT FIRST printer.name
    FROM CampusPrinter
        WHERE (printerType = = PostScript OR
            printerType = = PCL)
        AND
        printerLocation
            INCLUDES "Building 1"
        ORDER BY printQueueLength
}
```

In a preferred embodiment, a query moniker allows for arbitrary reduction to a moniker identified by a query. A query moniker contains a query that controls the reduction. The query is evaluated to produce a file moniker that satisfies the query. For example, Code Table 7 contains a query (in a structured query language) that may reduce to the file moniker with path name "\\printserver10\printer2". The query evaluates to a list of printers that can accommodate either PostScript or PCL documents and that is in a certain building. The list is sorted by the length of the print queue, and the printer with the shortest print queue is selected.

IMoniker::IsEqual

HRESULT IMoniker::IsEqual(pmkOtherMoniker)

This method determines whether this moniker and the specified other moniker (pmkOtherMoniker) reference the same object. This method is used in a preferred implementation of a running object table. The following table describes the parameters of the method IsEqual:

| Argument | Type | Description |
|---|---|---|
| pmkOtherMoniker | IMoniker* | the other moniker with whom this moniker is compared. |
| return value | HRESULT | S_OK, S_FALSE |

Figure 25:
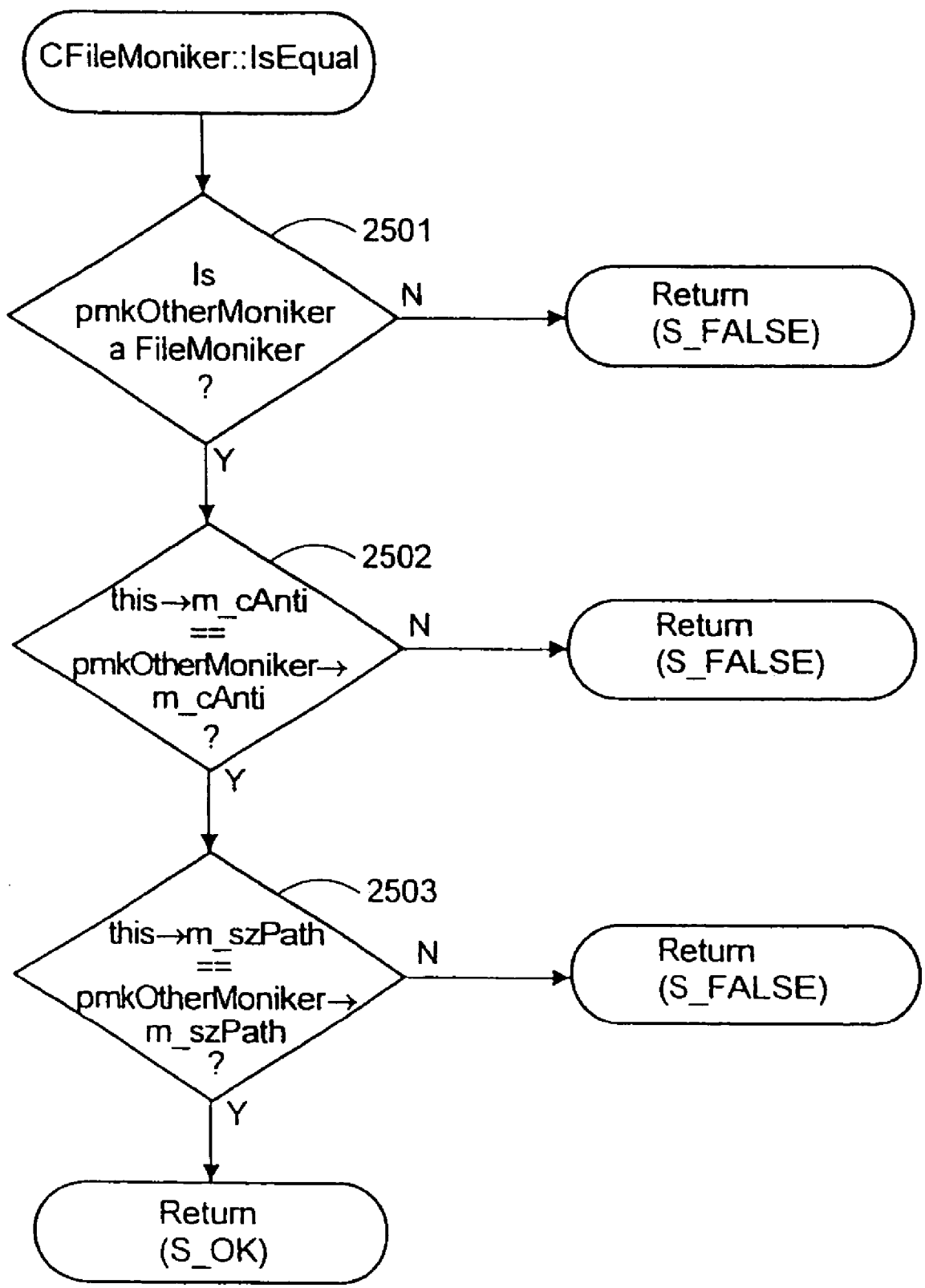
FIG. 25 is a flow diagram of the method IsEqual of the class CFileMoniker.

FIG. 25 is a flow diagram of the method IsEqual of the class CFileMoniker. In step 2501, if the other moniker (pmkOtherMoniker) is a file moniker, then the method continues at step 2502, else the monikers are not equal and the method returns a false. In step 2502, if the count of anti-monikers for this moniker (m_cAnti) is equal to the count of anti-monikers for the other moniker, then the method continues at step 2503, else the monikers are not equal and the method returns a false. In step 2503, if the path for this moniker (m_lpszPath) is equal to the path for the other moniker, then the method returns indicating that the monikers are equal, else the method returns indicating that the monikers are not equal.

Figure 26:
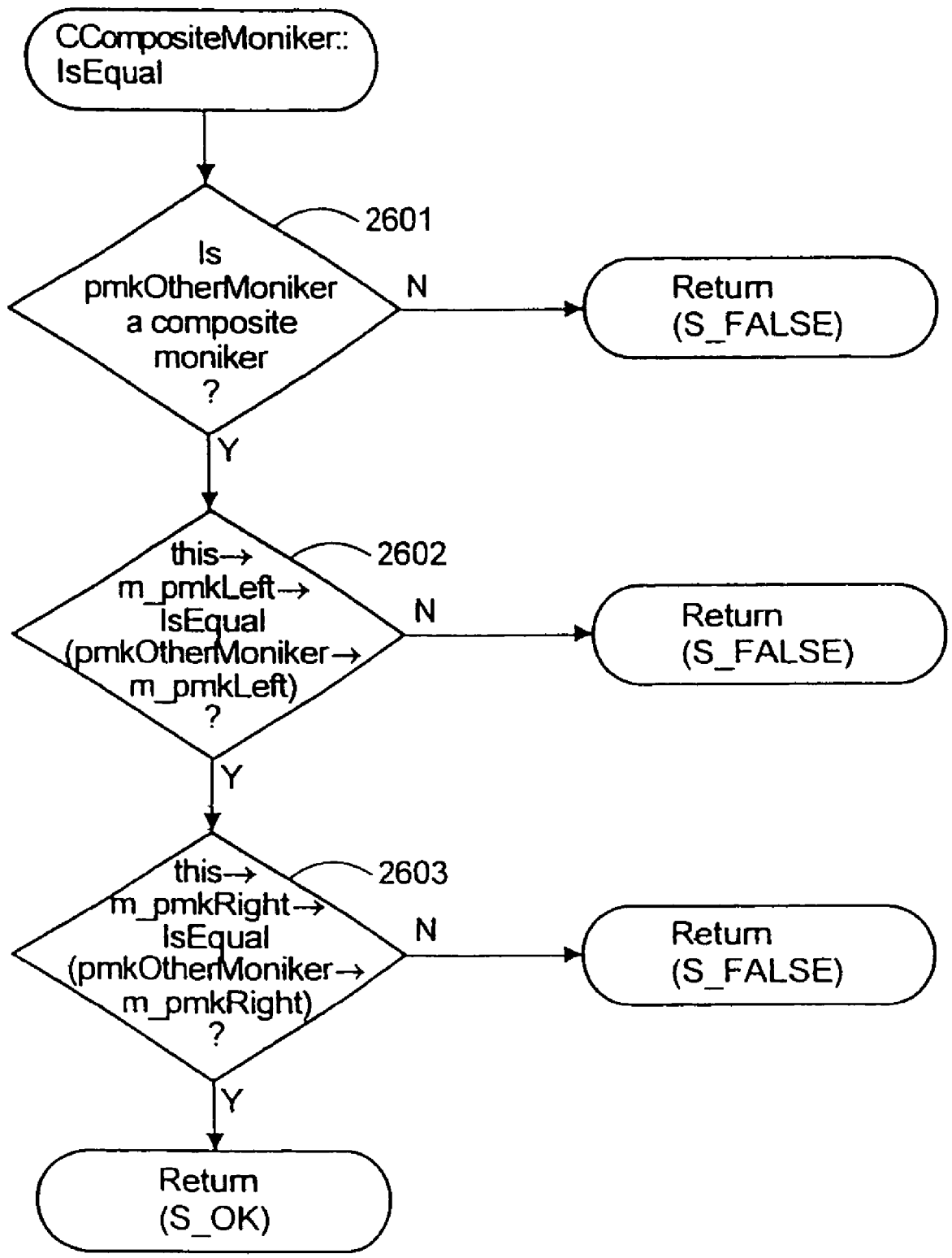
FIG. 26 is a flow diagram of the method IsEqual of the class CCompositeMoniker.

FIG. 26 is a flow diagram of the method IsEqual of the class CCompositeMoniker. In step 2601, if the other moniker is a composite moniker, then the method continues at step 2602, the method returns indicating that the monikers are not equal. In step 2602, if the left moniker of this moniker (m_pmkLeft) is equal to the left moniker of the other moniker, then the method continues at step 2603, else the method returns an indication that the monikers are not equal. In step 2603, if the right moniker of this moniker (m_pmkRight) is equal to the right moniker of the other moniker, then the method returns an indication that the monikers are equal, else the method returns an indication that the monikers are not equal. In an alternate embodiment of the method IsEqual, the method checks each component moniker of this moniker and the other moniker to determine if the monikers are equal.

IMoniker::Hash

HRESULT IMoniker::Hash(pdwHash)

This method returns a 32-bit integer associated with this moniker. This integer is used for maintaining tables of monikers: the moniker can be hashed to determine a hash bucket in the table, then compared with the method IsEqual against all the monikers presently in that hash bucket. Two monikers that compare as equal have the same hash value. The following table describes the parameters of the method Hash:

| Argument | Type | Description |
| --- | --- | --- |
| pdwHash | DWORD * | the place in which to put the returned hash value. |
| return value | HRESULT | S_OK |

Figure 27:
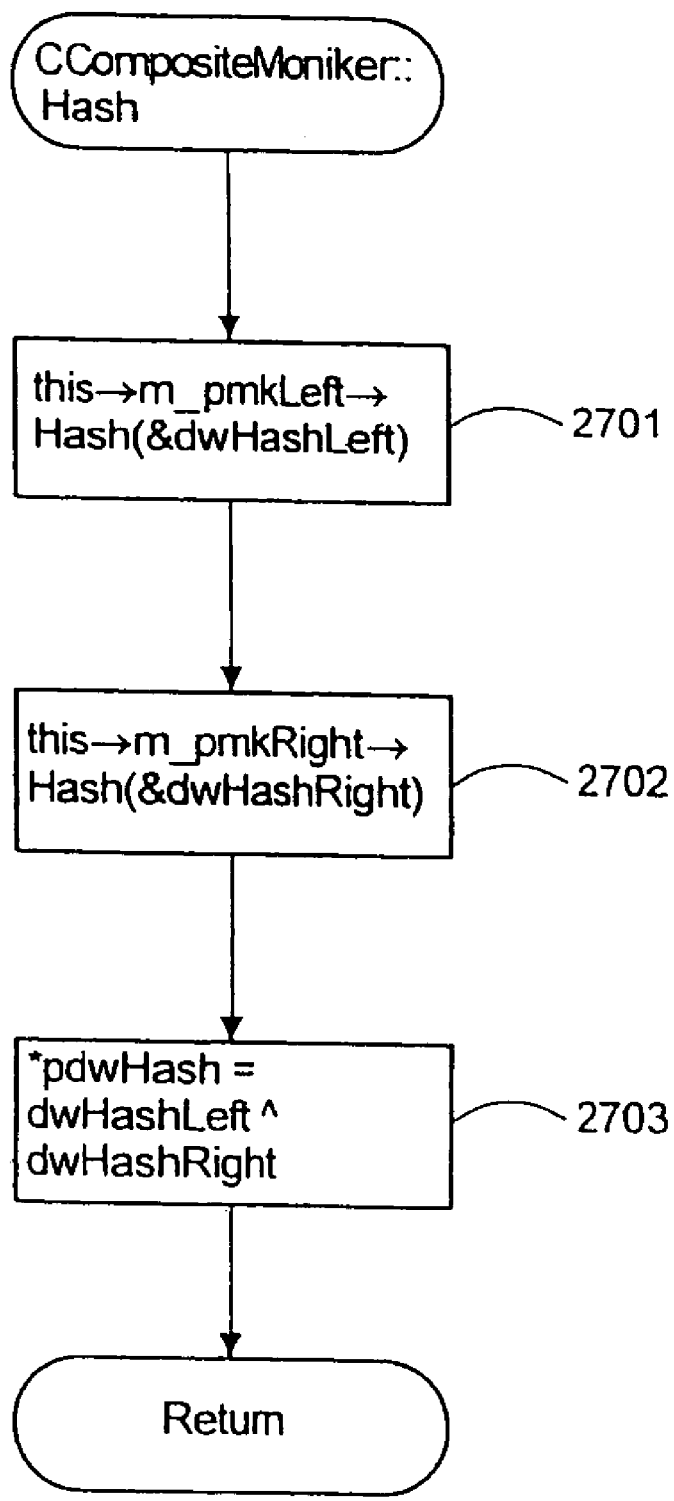
FIG. 27 is a flow diagram of the method Hash of the class CCompositeMoniker.

FIG. 27 is a flow diagram of the method Hash of the class CCompositeMoniker. In step 2701, the method invokes the method Hash of the left moniker. In step 2702, the method invokes the method hash of the right component moniker. In step 2703, the method generates the exclusive—or of the left hash value and the right hash value and returns that as the hash value of the method. The method Hash of the class CItemMoniker performs a hash function on the item name and returns the value.

IMoniker::Inverse

HRESULT IMoniker::Inverse(ppmk)

The method Inverse returns a moniker that when composed onto the end of this moniker or one of similar structure annihilates it; that is, composes to NULL. The method Inverse is an abstract generalization of the ".." operation in traditional file systems. For example, a file moniker that represents the path "a\b\c\d" has as its inverse a moniker containing the path "..\..\..\..", since "a\b\c\d" composed with "..\..\..\.." yields nothing. The inverse of a moniker does not annihilate just that particular moniker, but all monikers with a similar structure. Thus, the inverse of a generic composite moniker is the reverse composite of the inverse of its component monikers. Certain classes of monikers may have trivial inverses. If a moniker adds one more component moniker to an existing structure, its inverse is a moniker that removes the last component of the existing structure. A moniker that when composed onto the end of a moniker removes the last component is referred to as an anti moniker. One skilled in the art would appreciate that not all monikers have inverses. The inverse of an anti moniker, for example, does not exist. The following table describes the parameters of the method Inverse.

| Argument | Type | Description |
| --- | --- | --- |
| ppmk | IMoniker** | the place to return the inverse moniker. |
| return value | HRESULT | S_OK, MK_E_NOINVERSE. |

An anti moniker is a moniker that when composed onto the end of a generic composite moniker removes the last component moniker. Composing an anti moniker onto the end of another kind of moniker preferably annihilates the other moniker. The class CAntiMoniker contains a data member that is a count of the number of anti monikers (m_cAnti). Whenever an anti moniker is composed with another anti moniker, the resulting composition is an anti moniker with its count equal to the sum of the counts of the composed anti monikers.

Figure 28A:
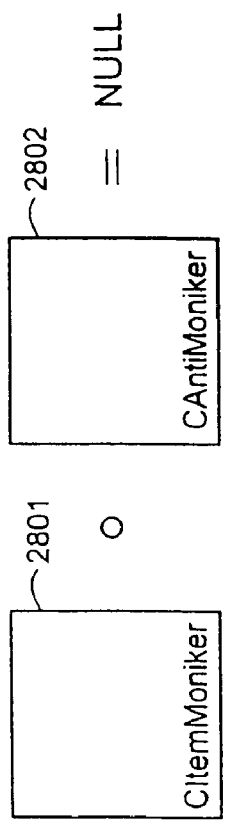
FIGS. 28A, 28B, and 28C are block diagrams illustrating composition with inverse monikers.
Figure 28B:
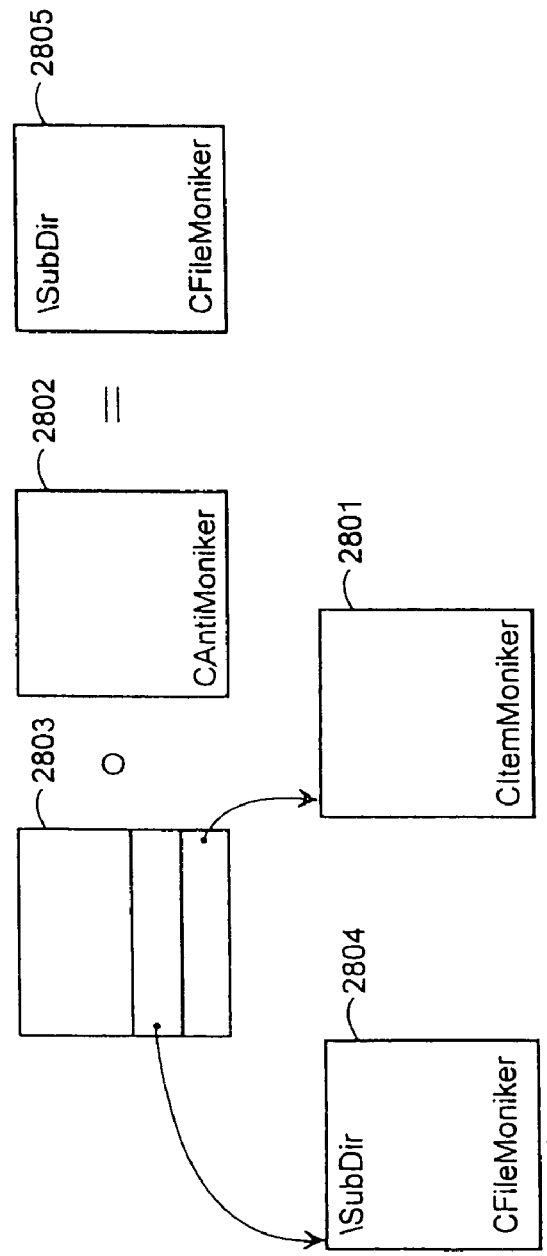
Figure 28C:
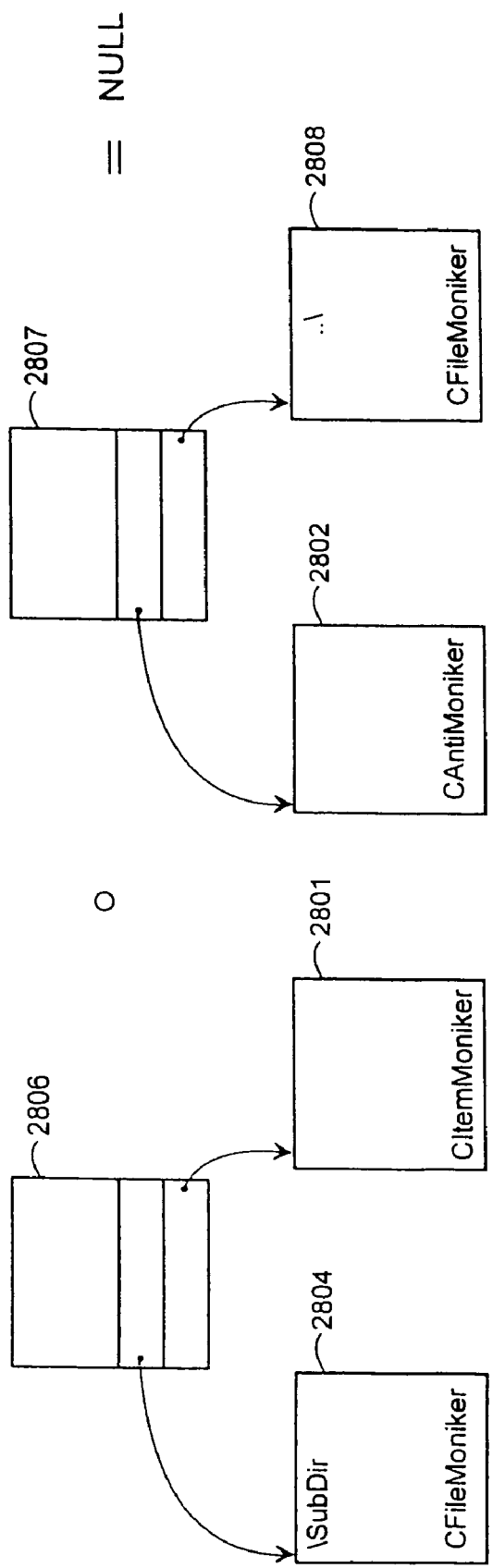

FIGS. 28A, 28B, and 28C are block diagrams illustrating composition with inverse monikers. In FIG. 28A, an item moniker 2801 is composed with anti moniker 2802 which results in annihilation of the monikers. In FIG. 28B, the generic composite moniker 2803 which comprises component moniker 2804 and 2801 is composed with anti moniker 2802. Since anti moniker 2802 is the inverse of item moniker 2801, the item moniker 2801 and the anti moniker 2802 is annihilated. The result of the composition is file moniker 2805. In FIG. 28C, generic composite moniker 2806 is composed with generic composite moniker 2807 resulting in annihilation of generic composition monikers 2806 and 2807. Generic composite moniker 2806 comprises file moniker 2804 and item moniker 2801. Generic composite moniker 2807 comprises anti moniker 2802 and file moniker 2808. The anti moniker 2802 is the inverse of item moniker 2801, and file moniker 2808 is the inverse of file moniker 2804.

Figure 29:
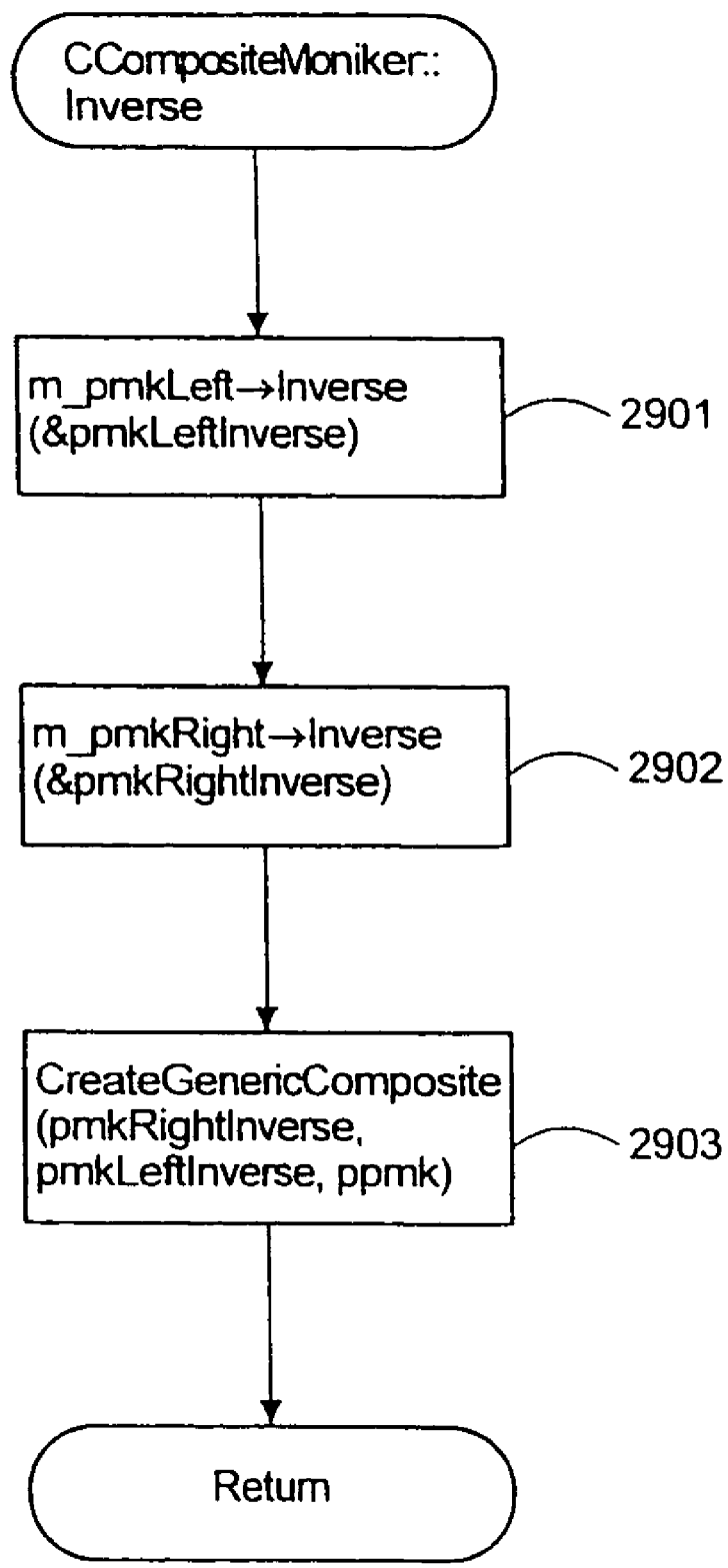
FIG. 29 is a flow diagram of the method Inverse of the class CCompositeMoniker.

FIG. 29 is a flow diagram of the method Inverse of the class CCompositeMoniker. In step 2901, the method invokes the method Inverse of the left moniker of this moniker to retrieve its inverse moniker. In step 2902, the method invokes the method Inverse of the right moniker of this moniker to retrieve its inverse moniker. In step 2903, the method invokes the function CreateGenericComposite passing it the right inverse and the left inverse and returns. The left inverse moniker is composed onto the end of the right inverse moniker so that during composition the right moniker will compose with the right inverse and the left moniker will compose with the left inverse moniker resulting in annihilation.

Figure 30:
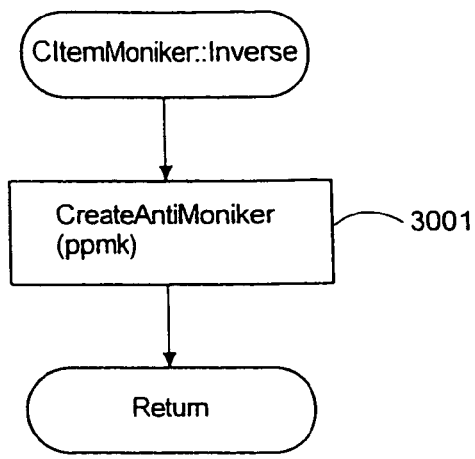
FIG. 30 is a flow diagram of the method Inverse of the class CItemMoniker.

FIG. 30 is a flow diagram of the method Inverse of the class CItemMoniker. Since the inverse of an item moniker is an anti moniker, the method creates an instance of an anti moniker and returns it.

Figure 31:
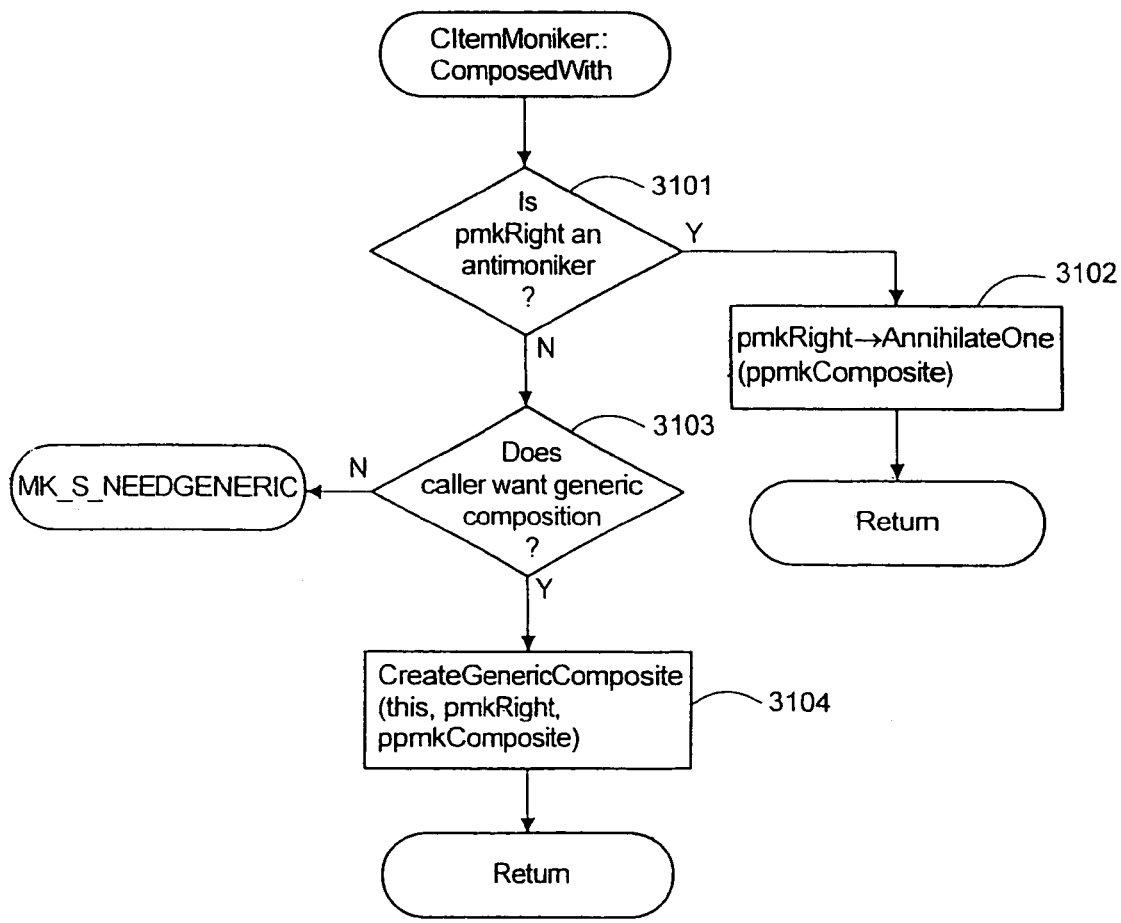
FIG. 31 is a flow diagram of the method ComposeWith of the class CItemMoniker.

FIG. 31 is a flow diagram of the method ComposeWith of the class CItemMoniker. This method illustrates the annihilation of monikers. In step 3101, if the moniker on the right to be composed with is an anti moniker, then the method continues at step 3102, else the method continues at step 3103. In step 3102, the method invokes the method AnnihilateOne of the anti moniker and returns the result as the composite moniker. Consequently, an item moniker that is composed with an anti moniker with a count greater than one results in an anti moniker. In step 3103, if the caller wants a generic composition returned (fOnlyIfNotGeneric==FALSE), then the method continues at step 3104, else the method returns an indicator that a generic composite moniker is needed. In step 3104, the method invokes the function CreateGenericComposite passing this moniker and the right moniker and returns with the composite moniker.

Figure 32:
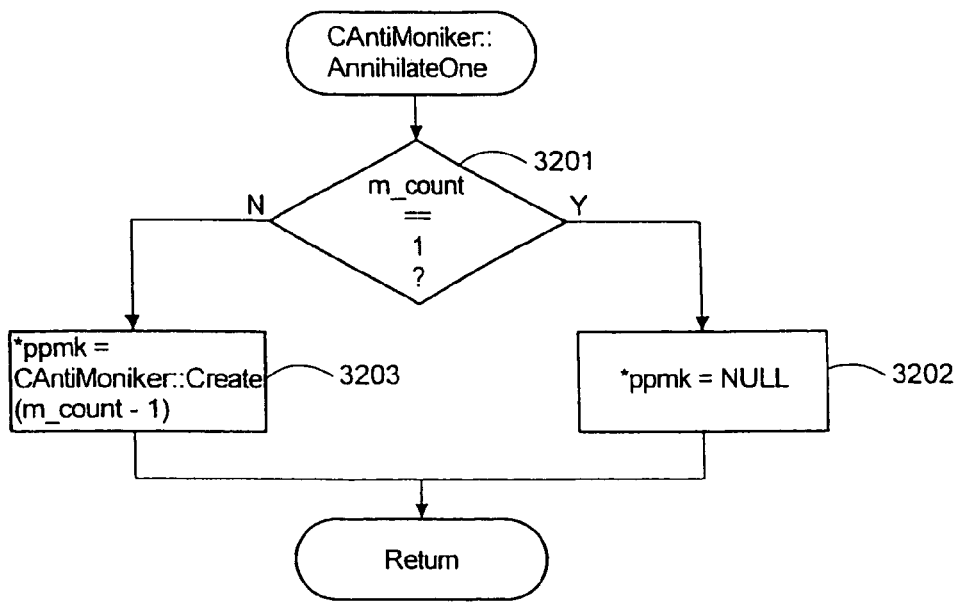
FIG. 32 is a flow diagram of the method AnnihilateOne of the class CAntiMoniker.

FIG. 32 is a flow diagram of the method AnnihilateOne of the class CAntiMoniker. This method annihilates one of the counts of this moniker. In step 3201, if the count of the anti moniker is equal to one, then the method continues at step 3202, else the method continues at step 3203. In step 3202, the method sets the moniker to return to NULL and returns. In step 3203, the method creates a new anti moniker and sets its count to the count of this moniker minus one and returns that newly-created moniker.

Figure 33:
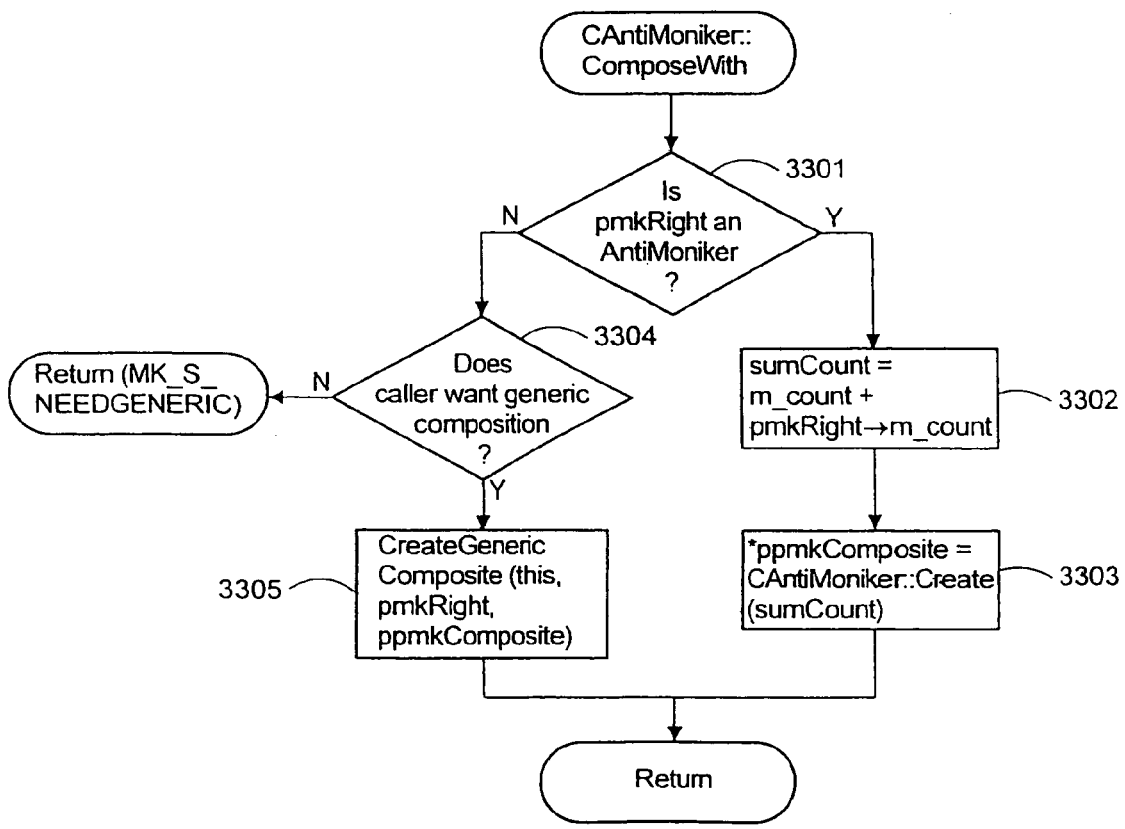
FIG. 33 is a flow diagram of the method ComposeWith of the class CAntiMoniker.

FIG. 33 is a flow diagram of the method ComposeWith of the class CAntiMoniker. In step 3301, if the right moniker (pmkRight) is an anti moniker, then the method continues at step 3302, else the method continues at step 3304. In step 3302, the method calculates the sum of the count of this moniker and the count of the right moniker. In step 3303, the method creates an anti moniker and sets its count to the sum and returns it as the composite moniker. In step 3304, if the caller wants a generic composition, then the method continues at step 3305, else the method returns an indication that a generic composition is needed. In step 3305, the method invokes a function CreateGenericComposite passing it this moniker and the right moniker and returns the composite.

IMoniker::CommonPrefixWith

HRESULT IMoniker::CommonPrefixWith(pmkOther, ppmkPrefix)

This method determines the longest common prefix that this moniker shares with the other moniker (pmkOther). The following table describes the parameters of the method CommonPrefixWith.

| Argument | Type | Description |
| --- | --- | --- |
| pmkOther | IMoniker* | the moniker with whom the common prefix is to be determined. |
| ppmkPrefix | IMoniker* | the place to return the common prefix moniker. NULL is returned only in the case that the common prefix does not exist. |
| return value | HRESULT | MK_S_ME, indicating that this moniker is the common prefix. MK_S_HIM, indicating that the other moniker (pmkOther) is the common prefix. MK_S_US, indicating that the two monikers are equal. S_OK, indicating that the common prefix exists but is neither this moniker nor the other moniker. MK_S_NOPREFIX indicating that no common prefix exists. |

Figure 34:
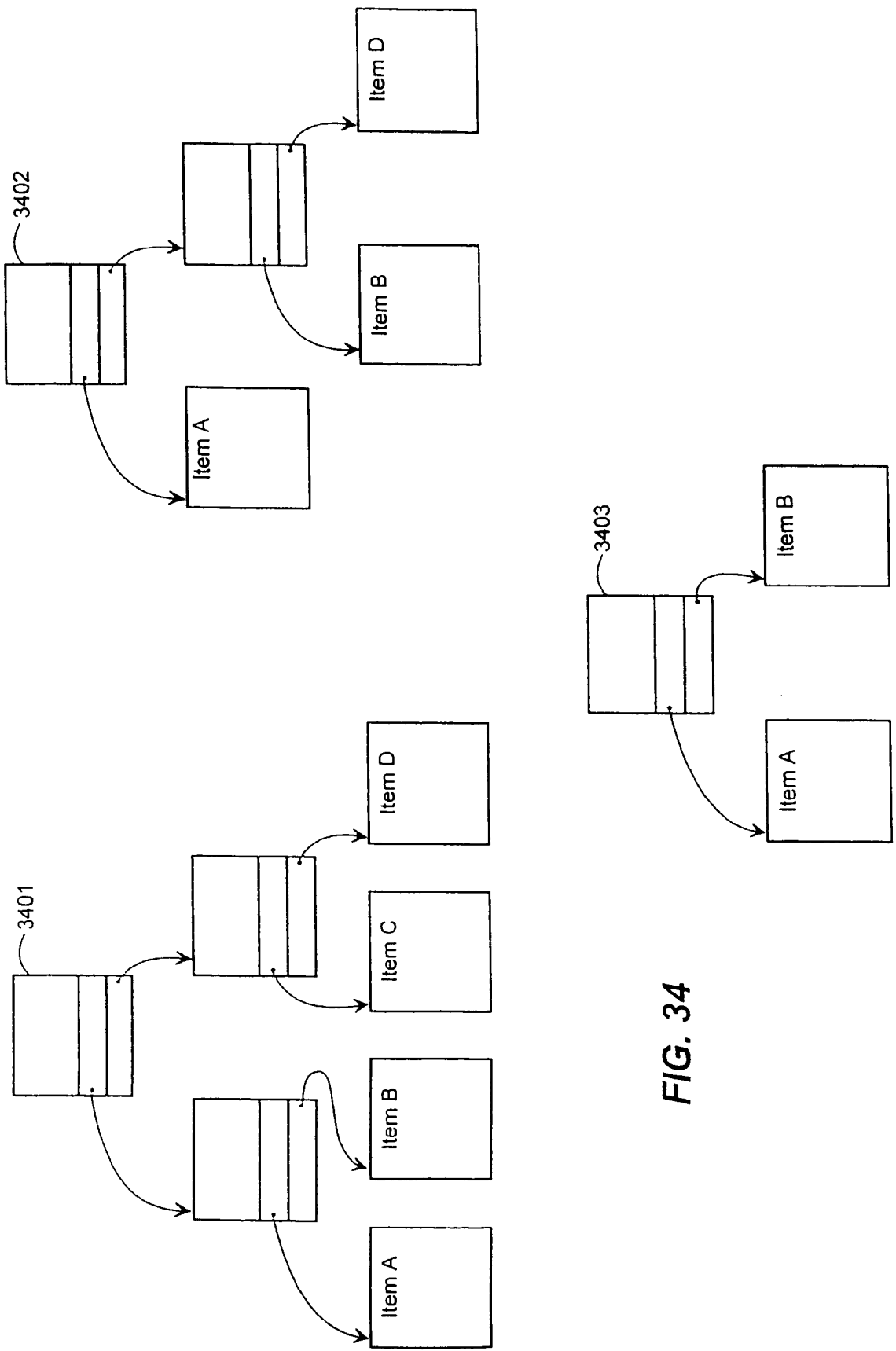
FIG. 34 is a block diagram illustrating a common prefix of generic composite monikers.

FIG. 34 is a block diagram illustrating a common prefix of generic composite monikers. The generic composite moniker 3401 and 3402 represent generic composite monikers for whom a common prefix is to be determined. Generic composite moniker 3401 includes component item monikers A, B, C, and D. Generic composite moniker 3402 comprises component item monikers A, B, and D. The resulting moniker is a generic composite moniker 3403 with a component moniker for Item A and a component moniker for Item B. The common prefix of (A∘B∘C∘D) and (A∘B∘D) is (A∘B).

Figure 35:
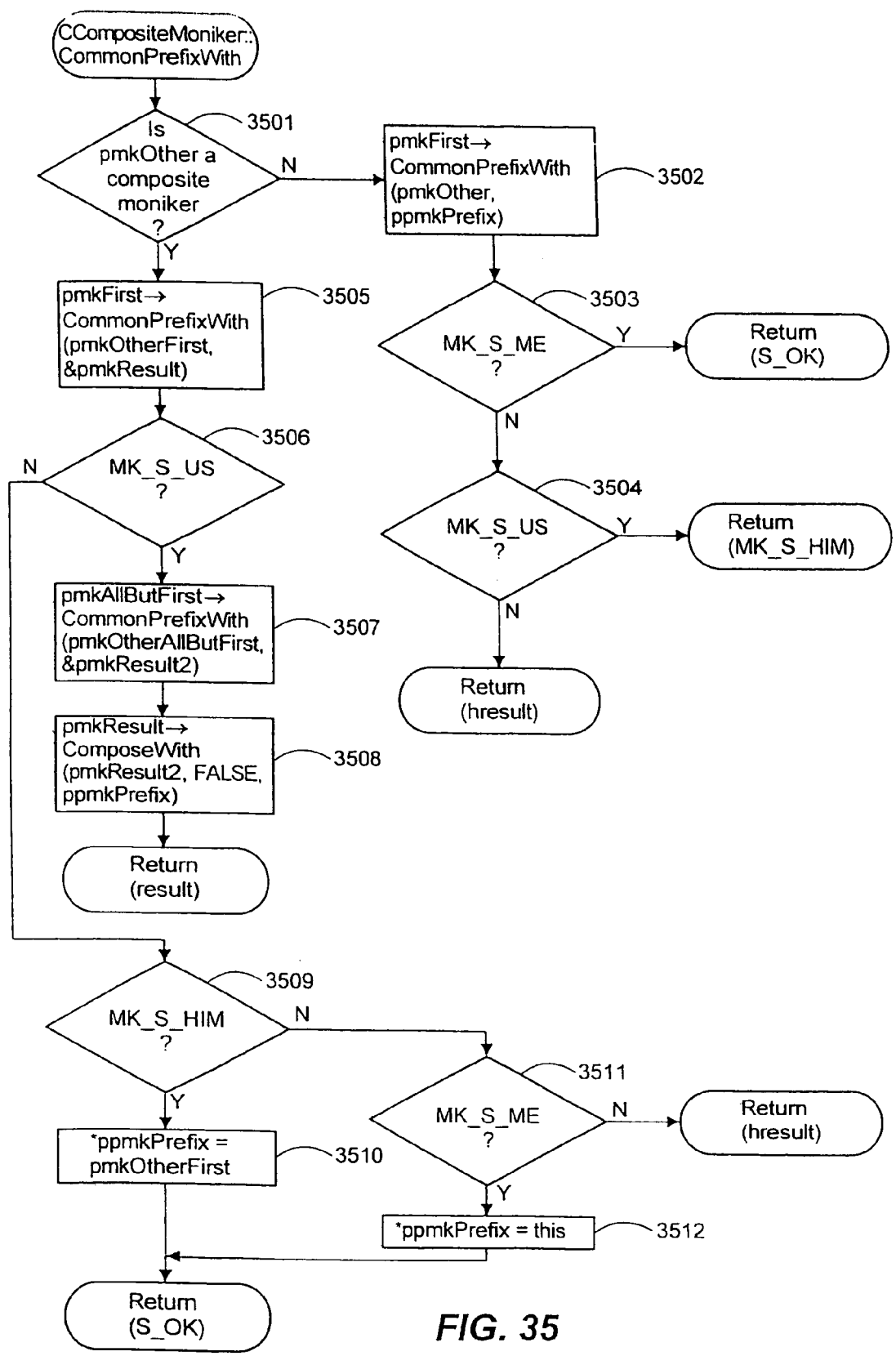
FIG. 35 is a flow diagram of the method CommonPrefixWith of the class CCompositeMoniker.

FIG. 35 is a flow diagram of the method CommonPrefixWith of the class CCompositeMoniker. In step 3501, if the other moniker (pmkOther) is a generic composite moniker, then the method continues at step 3505, else the method continues at step 3502. In step 3502, the method invokes the method CommonPrefixWith of the first component moniker of this moniker passing the other moniker and returning the common prefix. In step 3503, if the first component moniker of this component moniker is a common prefix with the other moniker, then the method returns an indication that a common prefix exists but neither this moniker nor the other moniker is the common prefix, else the method continues at step 3504. In step 3504, if the method returns an indication that the first component moniker of this moniker and the other moniker are common prefixes, then the method returns an indication that the other moniker is a common prefix of this moniker, else the method returns with the indication returned in step 3502. In step 3505, the method invokes the method CommonPrefixWith for the first component moniker of this moniker passing the first component moniker of the other moniker and returning the result. If the first component moniker of this moniker and the first component moniker of the other moniker are common prefixes of each other, then the method continues at step 3507, else the method continues at step 3509. In step 3507, the method invokes the method CommonPrefixWith for a moniker comprising all but the first component moniker of this moniker and passing it all but the first component moniker of the other moniker. This recursively invokes the method CommonPrefixWith to determine the extent of the common prefix. In step 3508, the method composes the result of step 3505 and step 3507 and returns. In step 3509, if the first component moniker of the other moniker is a prefix of the first component moniker of this moniker, then the method continues at step 3510, else the method continues at step 3511. In step 3510, the method indicates that the prefix is the first component moniker of the other moniker and returns. In step 3511, if the first component moniker of this moniker is the prefix of the first component moniker of the other moniker, then the method continues at step 3512, else the method returns the result that was returned in step 3505. In step 3511, the method sets the prefix to return to this moniker and returns.

Figure 36:
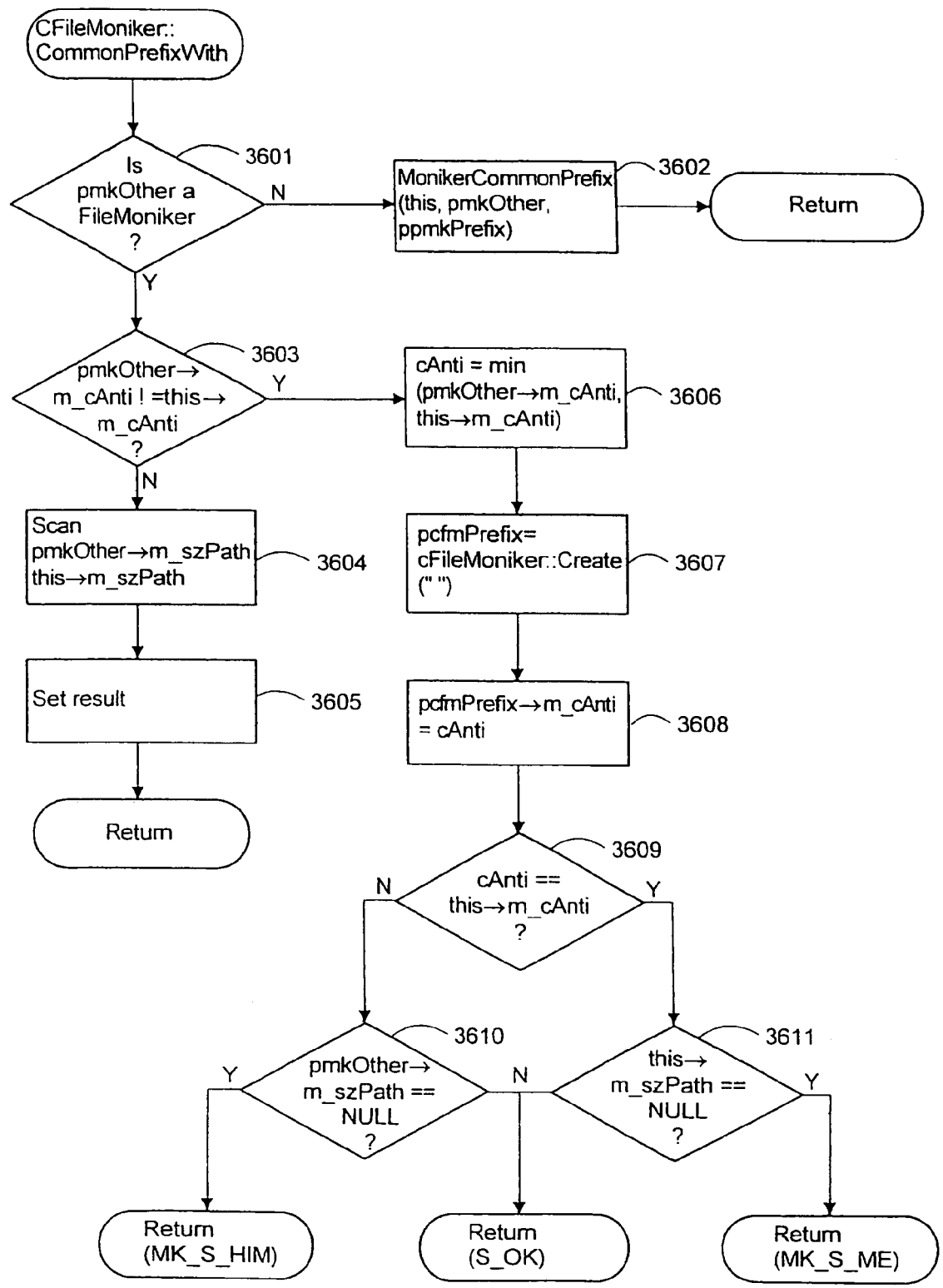
FIG. 36 is a flow diagram of the method CommonPrefixWith of the class CFileMoniker.

FIG. 36 is a flow diagram of the method CommonPrefixWith of the class CFileMoniker. The method scans the path names of this moniker and the other moniker to determine the common prefix. The count of anti monikers is assumed to precede the path names. In step 3601, if the other moniker (pmkOther) is a file moniker, then the method continues at step 3603, else the method continues at step 3602. In step 3602, the method invokes the function MonikerCommonPrefix (described below) and returns. In step 3603, if the count of anti monikers for this moniker (m_cAnti) is not equal to the count of anti monikers for the other moniker, then the method continues at step 3606, else the method continues at step 3604. In step 3604, the method scans the file path of the other moniker (m_lpszPath) and the file path of this moniker to determine the common prefix. In step 3605, the method sets the result and returns. In step 3606, the method determines the minimum of the anti moniker count of this moniker and the anti moniker count of the other moniker. In step 3607, the method creates a file moniker as the prefix moniker to return. In step 3608, the method sets the count of the anti monikers of the prefix to the minimum count of anti monikers. In step 3609 if the minimum count of anti monikers is in this moniker, then the method continues at step 3611, else the method continues at step 3610. In step 3610, if the path of the other moniker is NULL, then the method returns an indication that the other moniker is a common prefix, else the method returns an indication that neither moniker is the common prefix. In step 3611, if the path of this moniker is NULL, then the method returns indicating that this moniker is a common prefix, else the method returns indicating that neither moniker is the common prefix.

Figure 37:
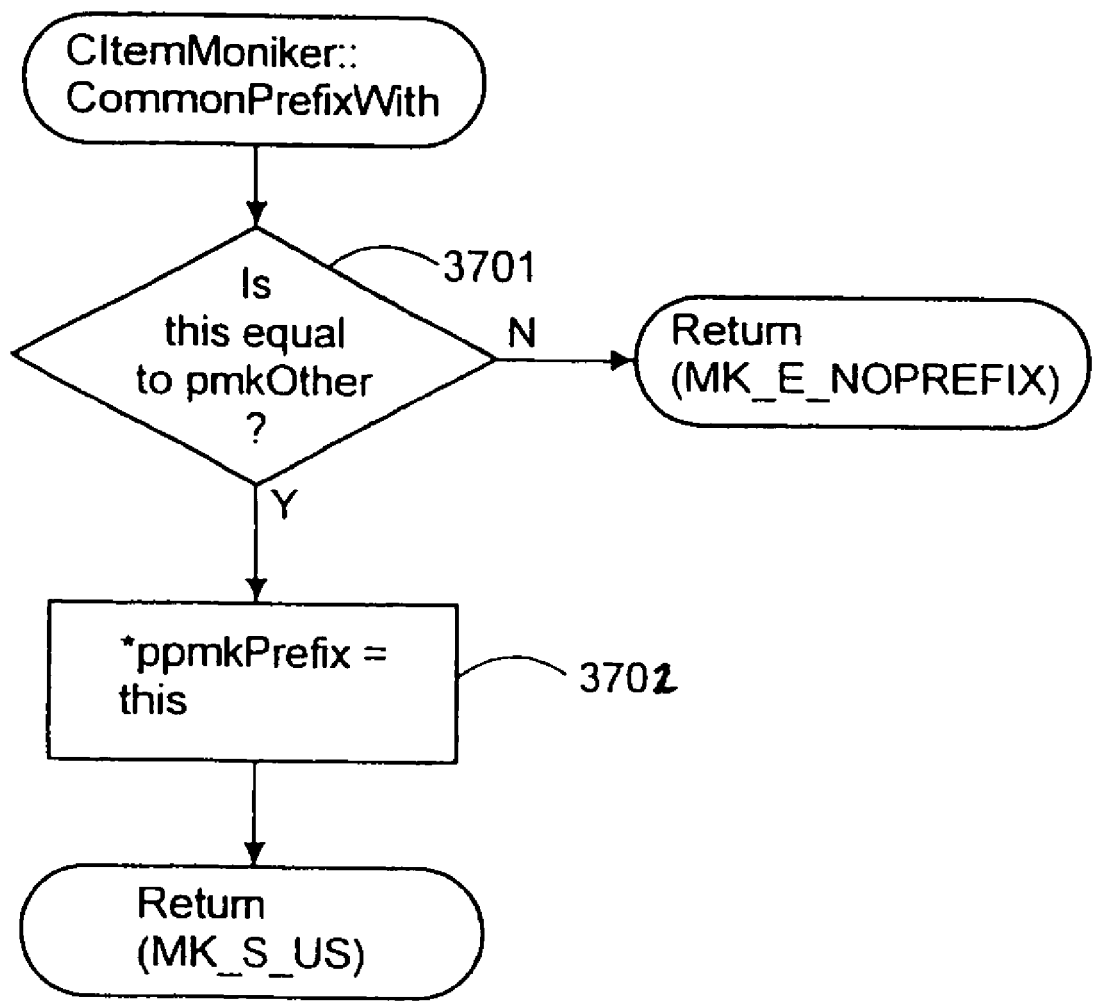
FIG. 37 is a flow diagram of the method CommonPrefixWith of the class CItemMoniker.

FIG. 37 is a flow diagram of the method CommonPrefixWith of the class CItemMoniker. In step 3701, if this moniker is equal to the other moniker, then the method continues at step 3702, else the method returns an indication that there is no prefix in common. In step 3702, the method sets the prefix moniker equal to this moniker and returns an indication that both monikers are common prefixes.

Figure 38:
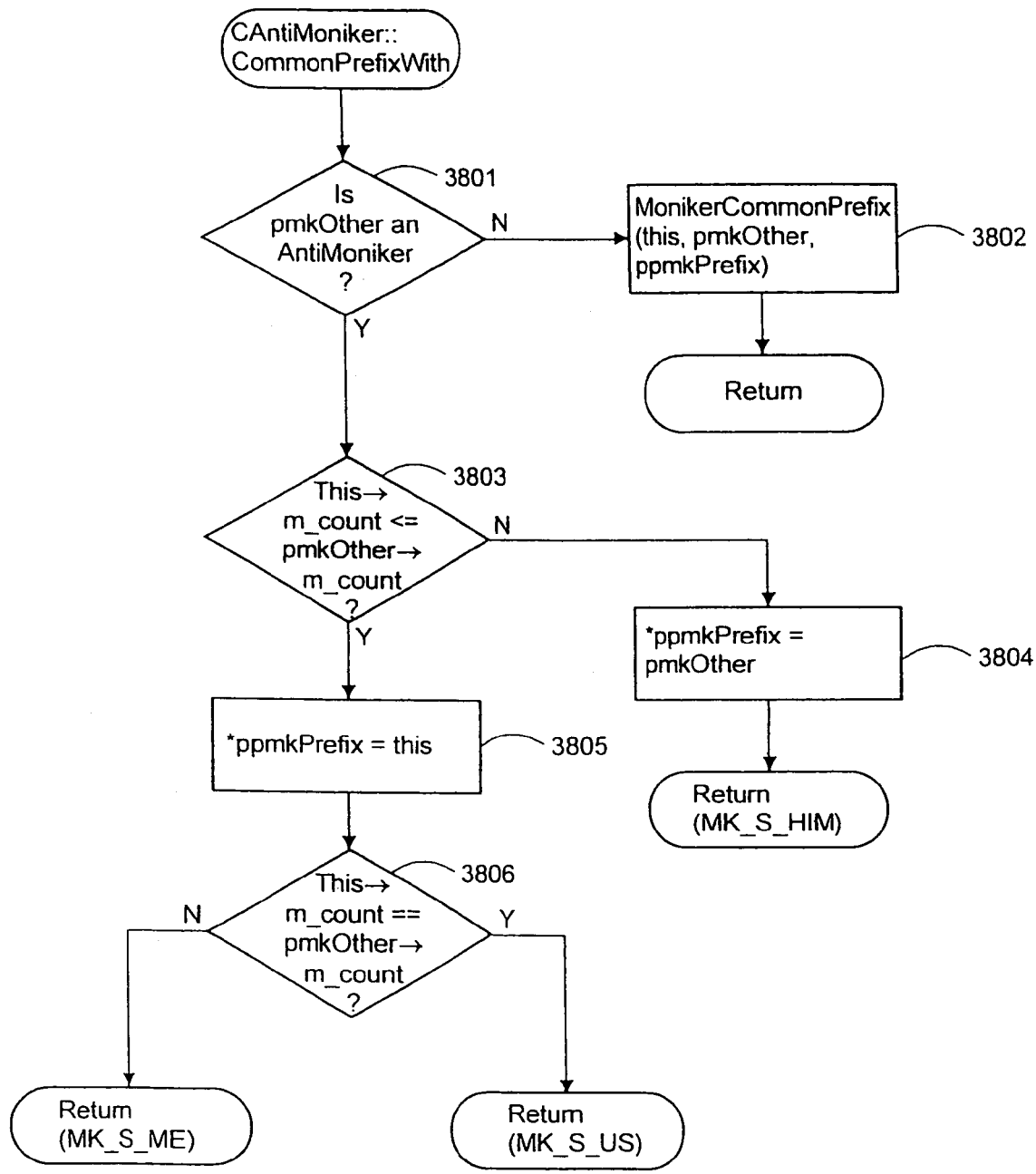
FIG. 38 is a flow diagram of the method CommonPrefixWith of the class CAntiMoniker.

FIG. 38 is a flow diagram of the method CommonPrefixWith of the class CAntiMoniker. In step 3801, if the other moniker is an anti moniker, then the method continues at step 3803, else the method continues at step 3802. In step 3802, the method invokes the function MonikerCommonPrefix and returns. If the count of this moniker is less than or equal to the count of the other moniker, then the method continues at step 3805, else the method continues at step 3804. In step 3804, the method sets the prefix moniker to point to the other moniker and returns an indication that the other moniker is the common prefix. In step 3805, the method sets the prefix moniker equal to this moniker. In step 3806, if the count of this moniker is equal to the count of the other moniker, then the method returns an indication that both monikers are common prefixes, else the method returns an indication that this moniker is a common prefix.

MonikerCommonPrefixWith

HRESULT MonikerCommonPrefixWith(pmkThis, pmkOther, ppmkPrefix)

This function is invoked by implementations of the method CommonPrefixWith. This function handles the situation when the implementation does not recognize the type of the other moniker. The following table describes the parameters of the function MonikerCommonPrefixWith:

| Argument | Type | Description |
| --- | --- | --- |
| pmkThis | IMoniker * | one moniker for the computation of the common prefix. |
| pmkOther | IMoniker * | the other moniker for the computation of the common prefix. |
| ppmkPrefix | IMoniker ** | pointer to the common prefix. |
| return value | HRESULT | S_OK, MK_S_HIM, MK_S_ME, MK_S_US, MK_S_NOPREFIX |

Figure 39:
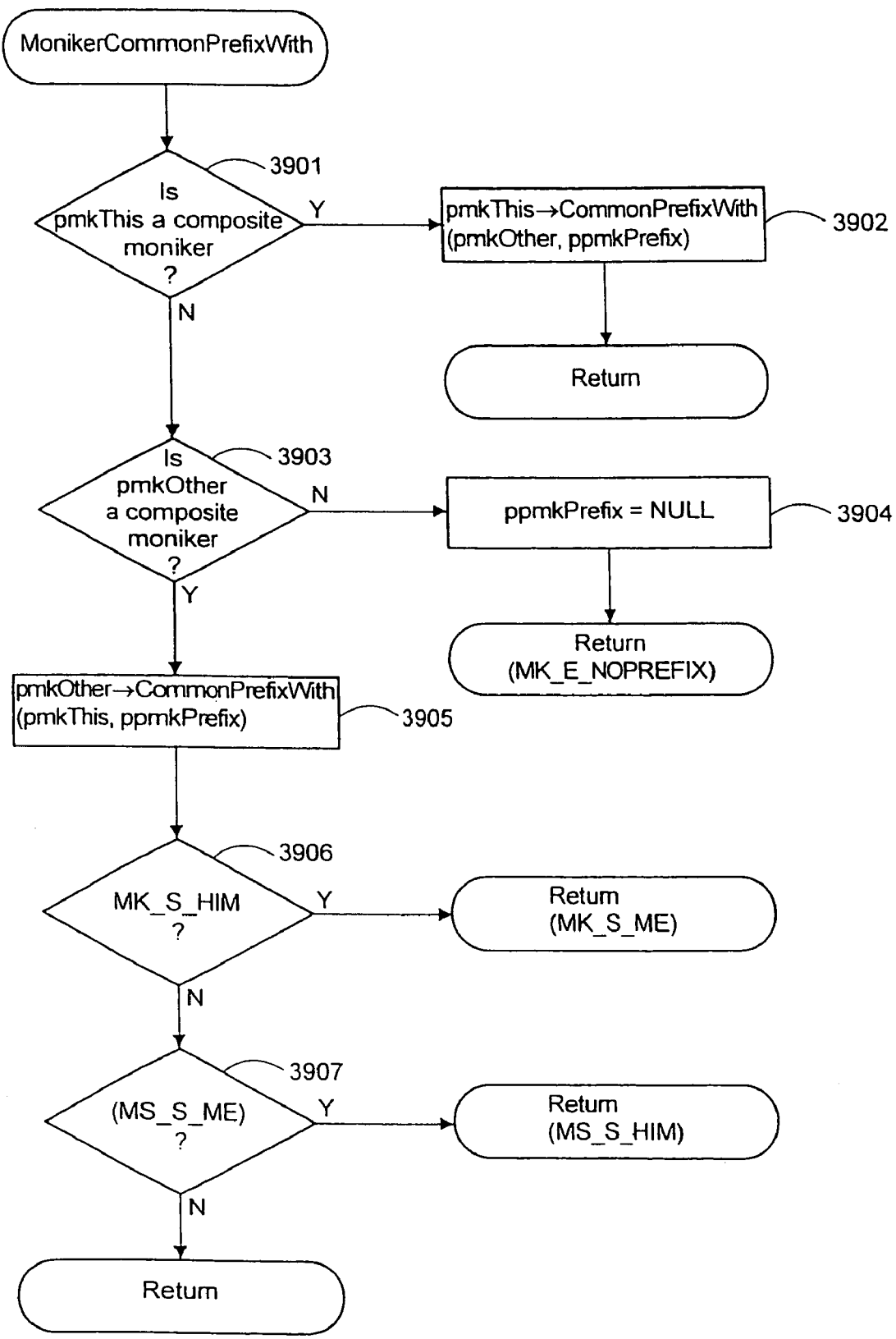
FIG. 39 is a flow diagram of the function MonikerCommonPrefixWith.

FIG. 39 is a flow diagram of the function MonikerCommonPrefixWith. In step 3901, if this moniker (pmkThis) is a generic composite moniker, then the method continues at step 3902, else the method continues at step 3903. In step 3902, the method invokes the method CommonPrefixWith of this moniker passing it the other moniker (pmkOther) and returns. In step 3903, if the other moniker is a generic composite, then the method continues at step 3905, else the method continues at step 3904. In step 3904, if neither moniker is a generic composite moniker, then the method sets the prefix to NULL and returns an indication that there is no prefix in common. In step 3905, the method invokes the method CommonPrefixWith of the other moniker passing this moniker. In step 3906, if this moniker is the common prefix, then the method returns with an indication, else the method continues at step 3907. In step 3907, if the other Moniker is the common prefix, then the method returns with an indication, else the method returns with the indication returned in 3905.

IMoniker::RelativePathTo

HRESULT IMoniker::RelativePathTo(pmkOther, ppmkRelPath)

This method returns as a moniker that, when composed onto the end of this moniker or one with a similar structure, yields the other moniker (pmkOther). Implementations of this method preferably determine the longest prefix that this moniker and the other moniker have in common. This method separates this moniker and the other into two parts, say $(P, T_{this})$ and $(P, T_{other})$ respectively, where P is the common prefix. $T_{this}$ and $T_{other}$ represent the trailing components. The relative path result is then $T^{-1}_{this} \circ T_{other}$, where $T^{-1}$ indicates the inverse. Thus, $(P, T_{this}) \circ (T^{-1}_{this} \circ T_{other}) = (P, T_{other})$.

| Argument | Type | Description |
| --- | --- | --- |
| pmkOther | IMoniker* | the other moniker to which a relative path should be taken. |
| ppmkRelPath | IMoniker* | May not be NULL. The place at which the relative path is returned. |
| return value | HRESULT | MK_S_HIM, indicating that the only form of relative path is in fact just the other moniker (pmkOther). S_OK, indicating that a non-trivial relative path exists. |

Figure 40:
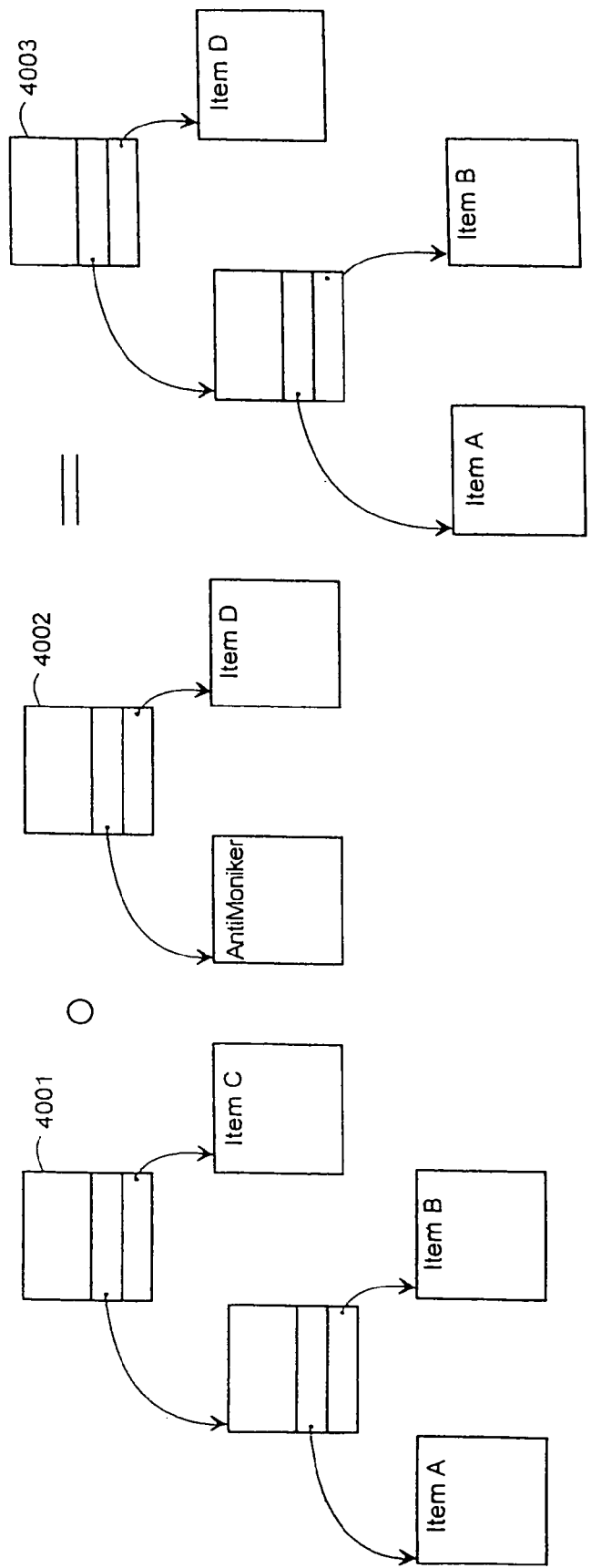
FIG. 40 is a block diagram illustrating a relative path to moniker.

FIG. 40 is a block diagram illustrating a relative path to moniker. When generic composite moniker 4001 is composed with relative path to moniker 4002, the result is generic composite moniker 4003. During composition, the component moniker Item C of generic composite moniker 4001 and the anti moniker of generic composite moniker 4002 annihilate. The generic composite moniker 4002 is the relative path to moniker to go from the composite generic moniker 4001 to 4003. More precisely, the relative path to moniker is the inverse of the portion that is not the common prefix of generic composite monikers 4001 and 4003 composed with the portion of generic composite moniker 4003 that is not the common prefix.

Figure 41A:
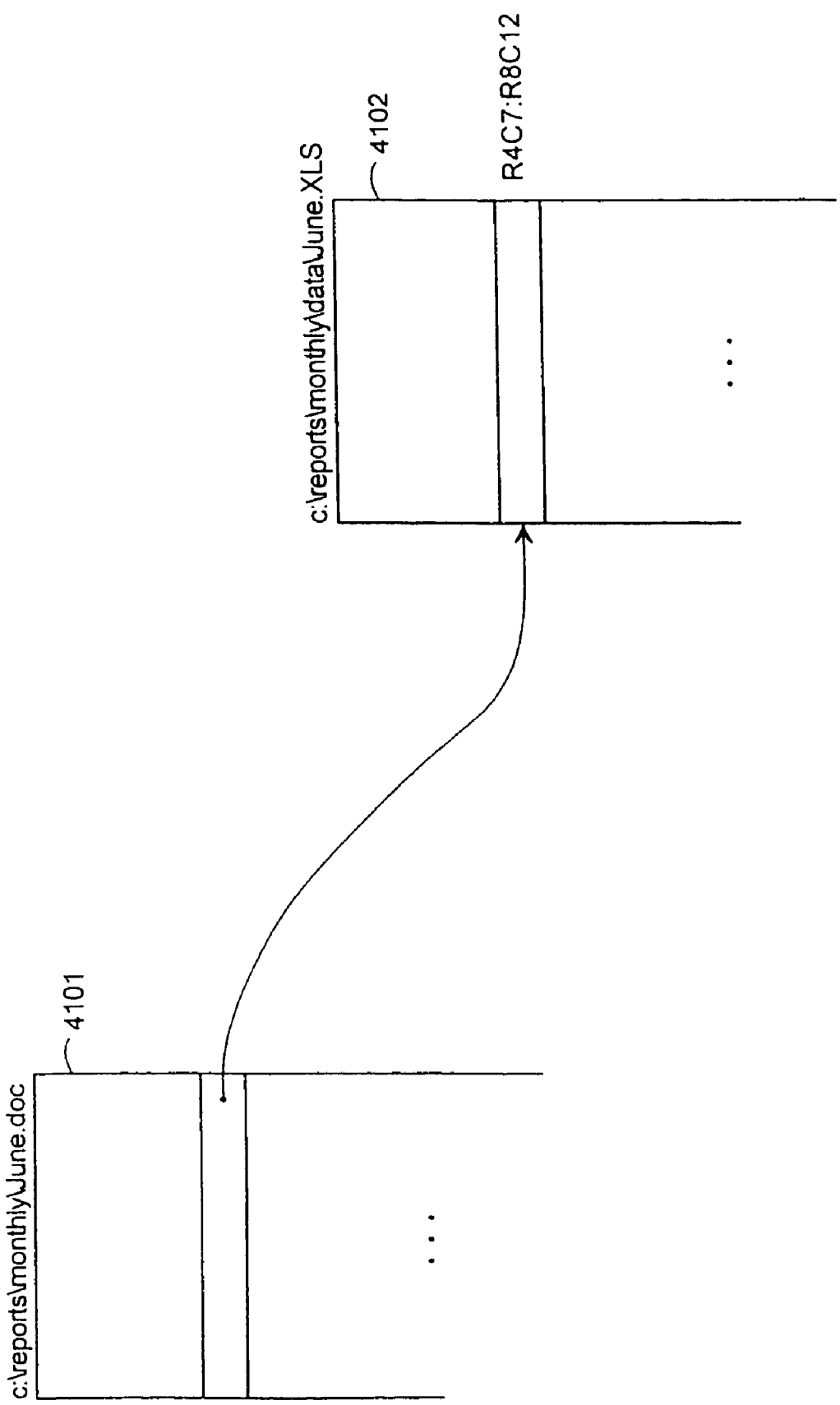
FIGS. 41A and 41B are block diagrams illustrating a usage of the method RelativePathTo.
Figure 41B:
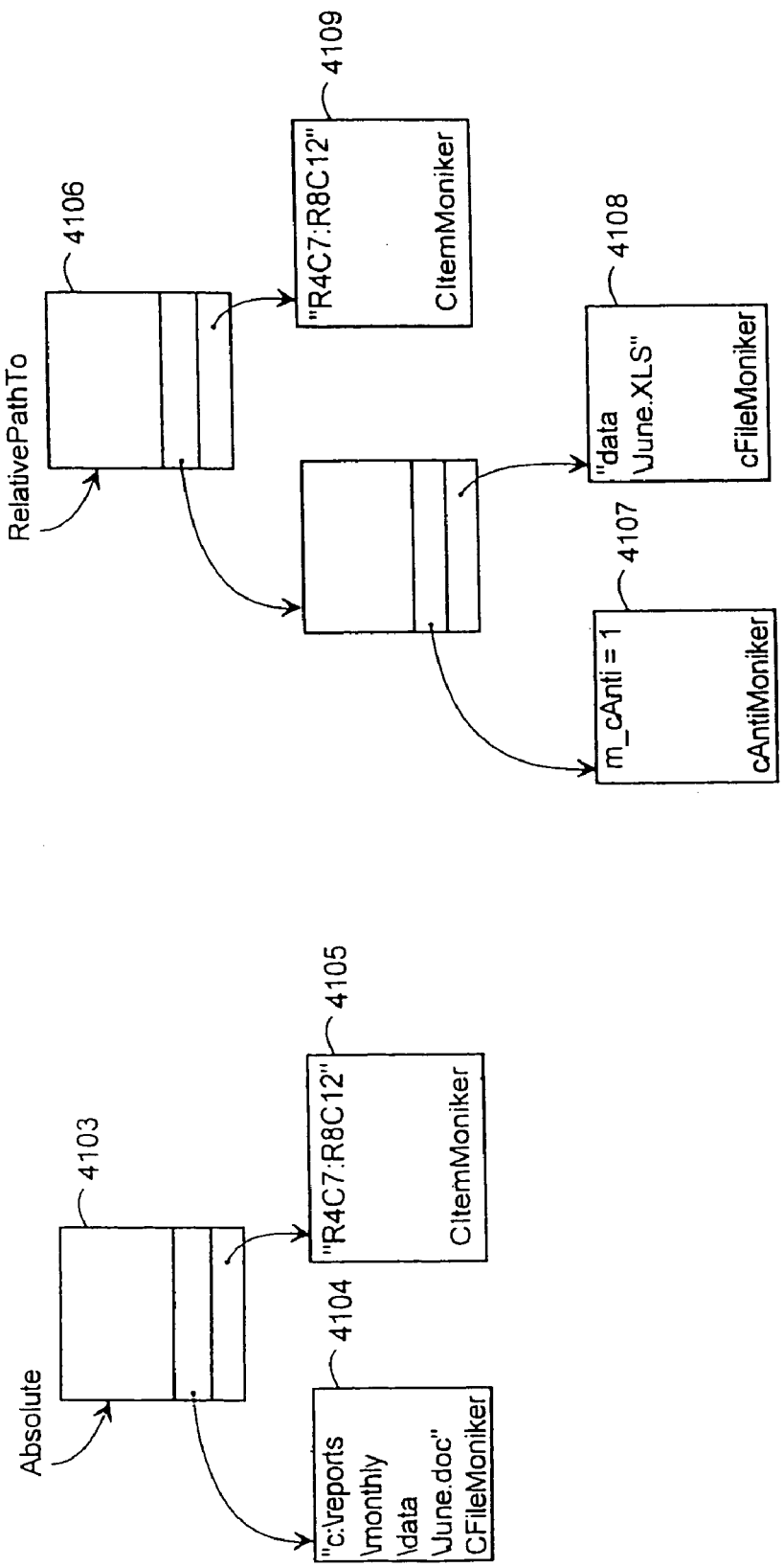

FIGS. 41A and 41B are block diagrams illustrating a usage of the method RelativePathTo. The document 4101 has a path name of "c:\reports\monthly\june.doc". The document 4101 contains a link to a range within the spreadsheet document 4102. The spreadsheet document has the path "c:\reports\monthly\data\june.xls"The range is identified by "R4C7:R8C12". The document 4101 preferably stores a moniker indicating the absolute path name of the range and the relative path name of the range. In this way, when the document 4101 is moved to a new directory with a similar structure, the correct range can be retrieved from that directory structure using the relative path. FIG. 41B illustrates a generic composite moniker 4103 describing the absolute path to the spreadsheet range. The generic composite moniker 4103 includes a file moniker 4104 with the absolute path name of the spreadsheet file and an item moniker 4105 which describes the spreadsheet range. The relative path to moniker is generic composite moniker 4106. Generic composite moniker 4106 includes anti moniker 4107 and file moniker 4108, and item moniker 4109. The generic composite moniker 4106 is the relative path to moniker for the absolute path name of the document 4101. When the moniker for the absolute path name of the document 4101 is composed with the generic composite moniker 4106, the result is the proper composite moniker needed to access the spreadsheet file.

Figure 42A:
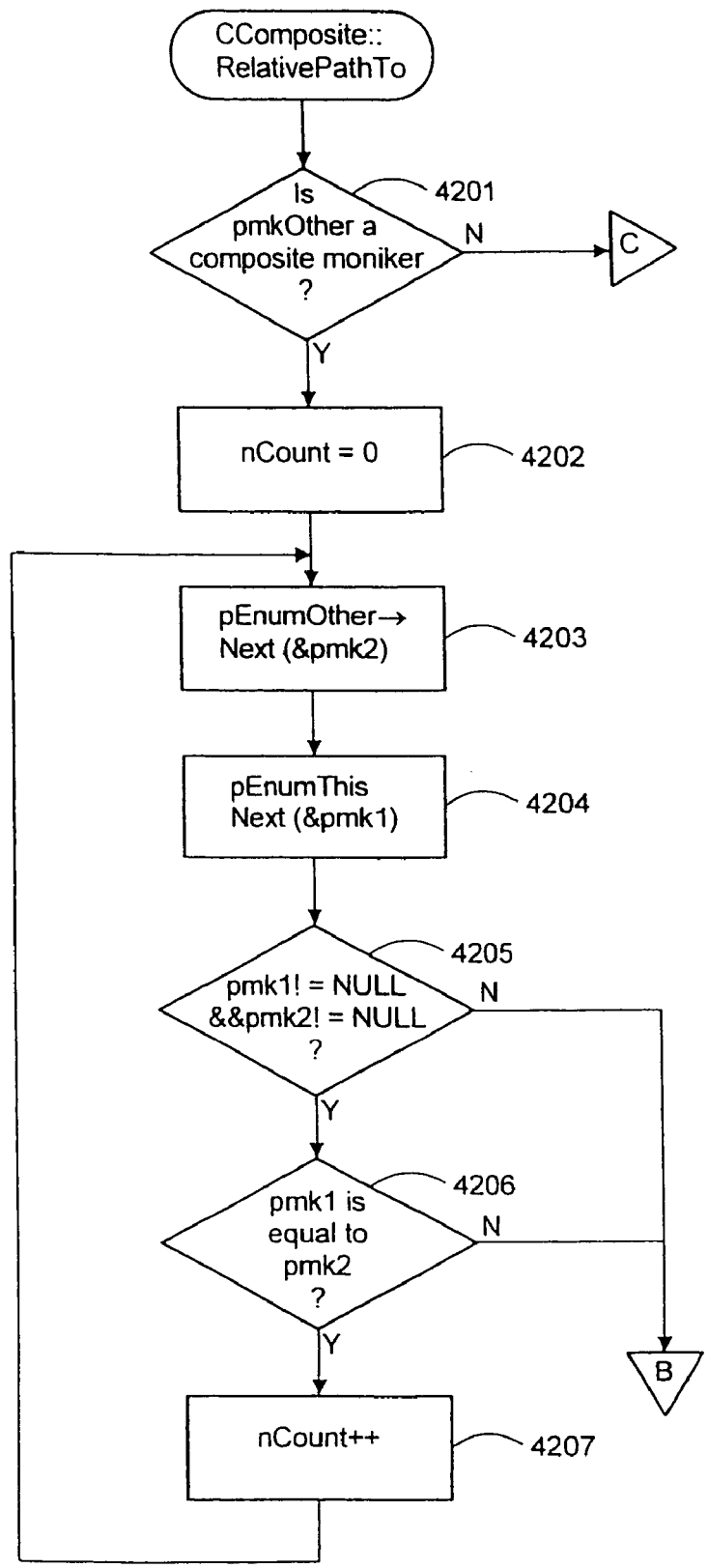
FIGS. 42A, 42B, and 42C comprise a flow diagram of the method RelativePathTo of the class CCompositeMoniker.
Figure 42B:
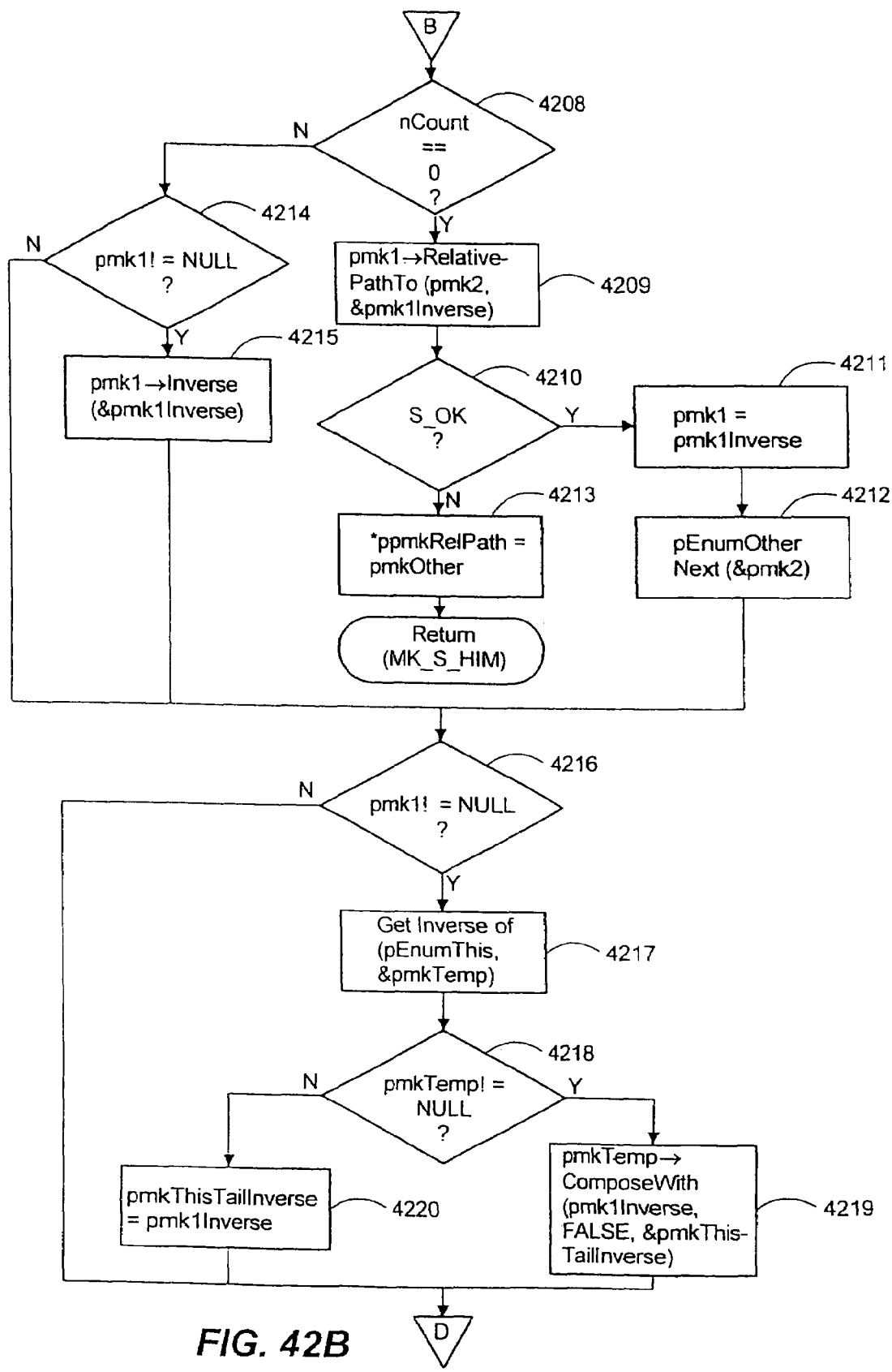
Figure 42C:
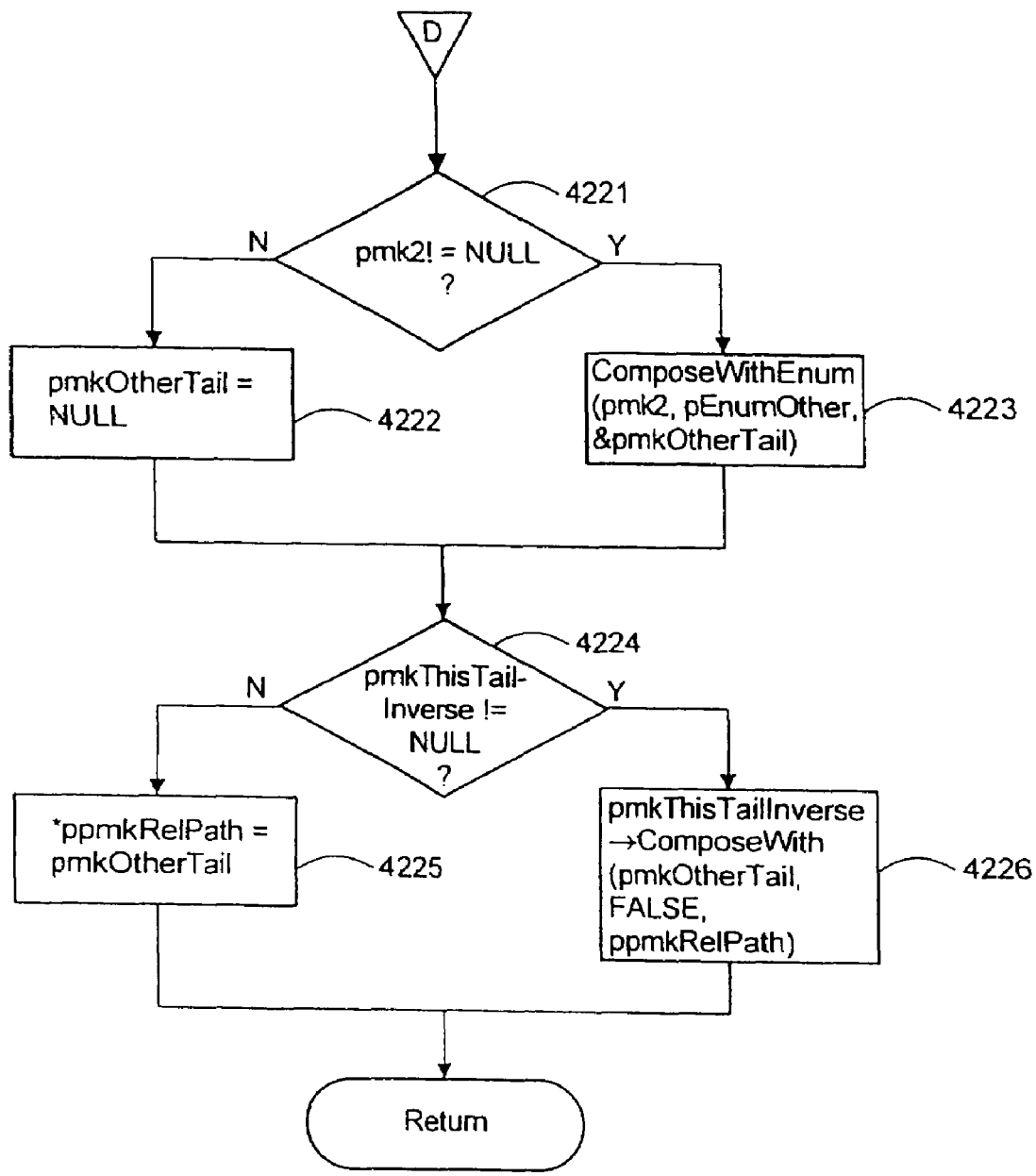
Figure 42D:
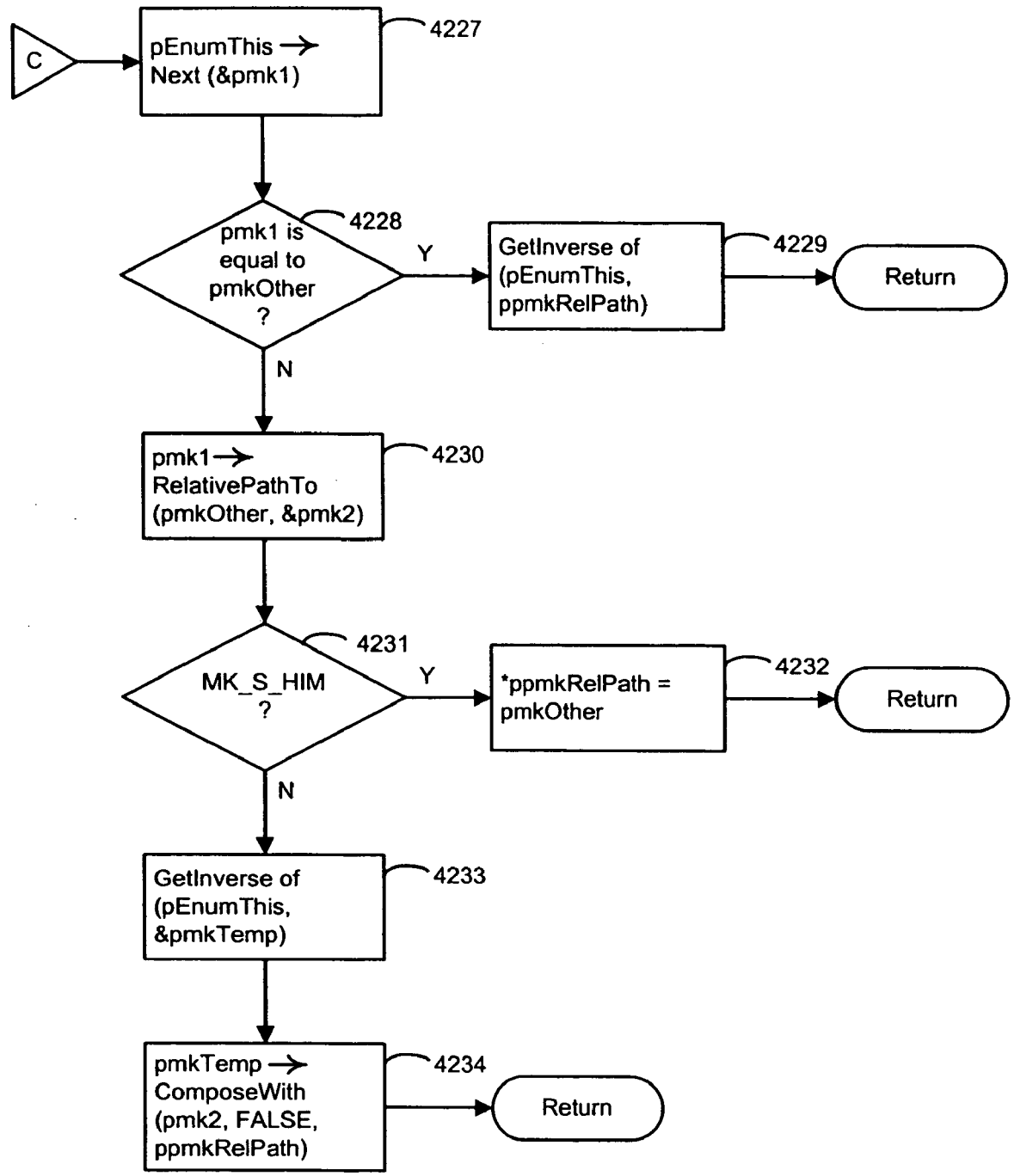

FIGS. 42A, 42B, and 42C comprise a flow diagram of the method RelativePathTo of the class CCompositeMoniker. In step 4201, if the other moniker (pmkOther) is a generic composite moniker, then the method continues at step 4202, else the method continues at step 4227. In step 4202 through 4207, the method loops determining the common prefix of this moniker and the other moniker. In step 4202, the method sets a variable nCount equal to 0. The variable nCount keeps track of the number of component monikers in the common prefix. In step 4203, the method selects the next component moniker of the other moniker, starting with the first. The enumeration of generic composite monikers is described below. In step 4204, the method selects the next component moniker of this moniker, starting with the first. In step 4205, if a component moniker of the other moniker and a component moniker of this moniker are selected, then the method continues at step 4206, else the method continues at step 4208. In step 4206, if the selected component monikers are equal, then the method continues at step 4207, else the method continues at step 4208. In step 4207, the method increments the variable nCount and loops to step 4203 to select the next component monikers. In step 4208, if the variable nCount equals 0, then this moniker and the other moniker have no common prefix and the method continues at step 4209, else the method continues at step 4214. In step 4209, the method invokes the method RelativePathTo of the first component moniker of this moniker passing it the first component moniker of the other moniker and indicating to return the result as the inverse of the first component of this moniker. In step 4210, if the invocation of the method RelativePathTo in step 4209 indicates that a non-trivial relative path exists, then the method continues at step 4211, else the method continues at step 4213. In step 4211, the method indicates that the first component moniker of this moniker is equal to the result of step 4209. In step 4212, the method selects the next component moniker of the other moniker and continues at step 4216. In step 4213, the method sets the relative path to point to the other moniker and returns an indication that the relative path is the other moniker. In step 4214, if not all the component monikers of the this moniker have been selected, then the method continues at step 4215, else the method continues at step 4216. In step 4215, the method determines the inverse of the selected-component moniker of this moniker and continues at step 4216. In step 4216, if the selected component moniker of this moniker is not equal to NULL, then the method continues at step 4217, else the method continues at step 4221. In step 4217, the method determines the inverse of the component monikers of this moniker that have not been selected. In step 4218, if the inverse is not NULL, then the method continues at step 4219, else the method continues at step 4220. In step 4219, the method invokes the method ComposeWith of the inverse passing it the inverse of the last selected component moniker of this moniker to create an inverse for the tale portion of this moniker and the method continues at step 4221. In step 4220, the method sets the inverse of the tale portion of this moniker equal to the inverse of the last selected component moniker of this moniker and continues at step 4221. In step 4221, if the selected component moniker of the other moniker is not equal to NULL, then the method continues at step 4223, else the method continues at 4222. In step 4222, the method sets the tale of the other moniker equal to NULL and continues at step 4224. In step 4223, the method composes the selected component moniker of the other moniker with tale of the other moniker and continues at step 4224. In step 4224, if the inverse of the tale of this moniker is not equal to NULL, then the method continues at step 4226, else the method continues at step 4225. In step 4225, the method sets the relative path to the tale of the other moniker and returns. In step 4226, the method composes with the inverse of the tale of this moniker with the tale of the other moniker and returns that as a relative path. In step 4227, the method selects the next component moniker of this moniker. In step 4228, if the selected component moniker of this moniker is equal to the other moniker, then the method continues at step 4229, else the method continues at step 4230. In step 4229, the method gets the inverse of this moniker and returns it as the relative moniker. In step 4230, the method invokes a method RelativePathTo of the selected component moniker of this moniker passing it the other moniker. In step 4232, if the method invoked in step 4230 indicates that the other moniker is the relative path to moniker, then the method continues at step 4232, else the method continues at step 4233. In step 4232, the method sets the relative path to moniker to point to the other moniker and returns. In step 4233, the method gets the inverse of the tale of this moniker. In step 4234, the method composes with the inverse of the tale of this moniker with the relative path to moniker returned in step 4230 and returns.

MonikerRelativePathTo

HRESULT MonikerRelativePathTo(pmkSrc, pmk;Dest, ppmkRelPath, reserved)

This function is invoked by implementations of the method RelativePathTo. This method handles the situation when the implementation does not recognize the type of the other moniker.

| Argument | Type | Description |
| --- | --- | --- |
| pmkSrc | IMoniker * | the starting moniker for the computation of the relative path. |
| pmkDest | IMoniker * | the moniker to which a relative path should be taken. |
| ppmkRelPath | IMoniker ** | May not be NULL. The place at which the moniker of pmkDest relative to pmkSrc is to be returned. |
| reserved | BOOL | must be non-zero |
| return value | HRESULT | S_OK, MK_S_HIM |

Figure 43:
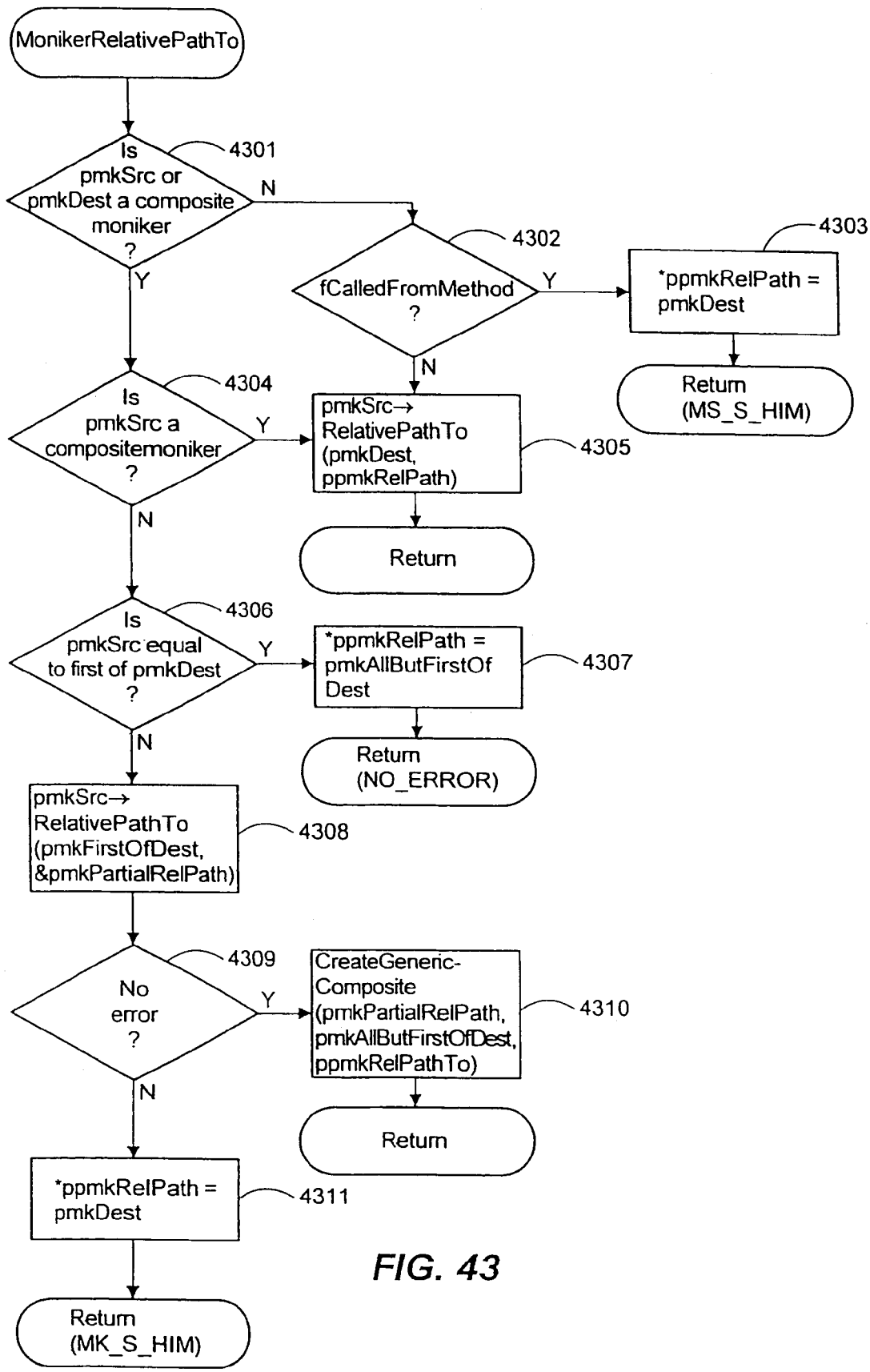
FIG. 43 is a flow diagram of the function MonikerRelativePathTo.

FIG. 43 is a flow diagram of the function MonikerRelativePathTo. In step 4301 if the source moniker or the destination moniker is a generic composite moniker, then the method continues at step 4304, else the method continues at step 4302. In step 4302, if the parameter fCalledFromMethod is true, then the method continues at step 4303, else the method continues at step 4305. In step 4303, the method sets the relative path to the destination moniker and returns an indication moniker that the destination moniker is the relative path to. In step 4304, if the source moniker is a generic composite moniker, then the method continues at step 4305, else the method continues at step 4306. In step 4305, the method invokes the method RelativePathTo of the source moniker passing the destination moniker and returns the relative path from that invocation. In step 4306, if the source moniker is equal to the first component moniker of the destination moniker, then the method continues at step 4307, else the method continues at step 4308. In step 4307, the method sets the relative path to moniker equal to a moniker comprising all but the first component moniker of the destination moniker and returns. In step 4308, the method invokes the method RelativePathTo of the source moniker passing the first component moniker of the destination moniker. In step 4309, if no error is returned, then the method continues at step 4310, else the method continues at step 4311. In step 4310, the method invokes the function CreateGenericComposite passing the relative path to moniker returned in step 4308 and a moniker comprising all but the first component moniker of the destination moniker and returns. In step 4311, the method sets the relative path to moniker equal to the destination moniker and returns an indication that the destination moniker a relative path to moniker.

IMoniker::Enum

HRESULT IMoniker::Enum(fForward, ppenmMoniker)

This method returns an interface that permits the enumeration of the component monikers of which this moniker is logically a composite. For a generic composite moniker, this enumerates the components of which the composite is composed. For other monikers, the semantics of the components of which it is a composite are implementation-defined. For example, enumerating the components of a file moniker returns each portion of the internally stored path name, even though they are not stored internally as actual separate monikers. Monikers that have no discernible internal structure return NULL instead of an enumerator.

The IEnumMoniker interface is an enumerator that supports the enumeration of items which are monikers.

```
interface IEnumMoniker : IUnknown {
    virtual     HRESULT     Next(ULONG celt, IMoniker* rgelt[ ],
                                ULONG* pceltFetched) = 0;
    virtual     HRESULT     Skip(ULONG celt) = 0;
    virtual     HRESULT     Reset( ) = 0:
    virtual     HRESULT     Clone(IEnumMoniker** ppenm) = 0;
};
```

The following table describes the parameters of the method Enum:

| Argument | Type | Description |
| --- | --- | --- |
| fForward | BOOL | If true, then the enumeration should be done in the normal order. If false, then the order should be the reverse of the order enumerated by the normal order. |
| ppenmMoniker | IEnumMoniker** | On exit, the returned enumerator. May be NULL, signifying that there is nothing to enumerate. |
| return value | HRESULT | S_OK. |

CODE TABLE 8

```
class CCompositeMonikerEnum: IEnum
    { CCompositeMoniker FAR * m_pcm;
        BOOL m_fForward;
        se m_pBase;
        se m_pTop;
        LPMONIKER m_pNext;
    }
```

Figure 44:
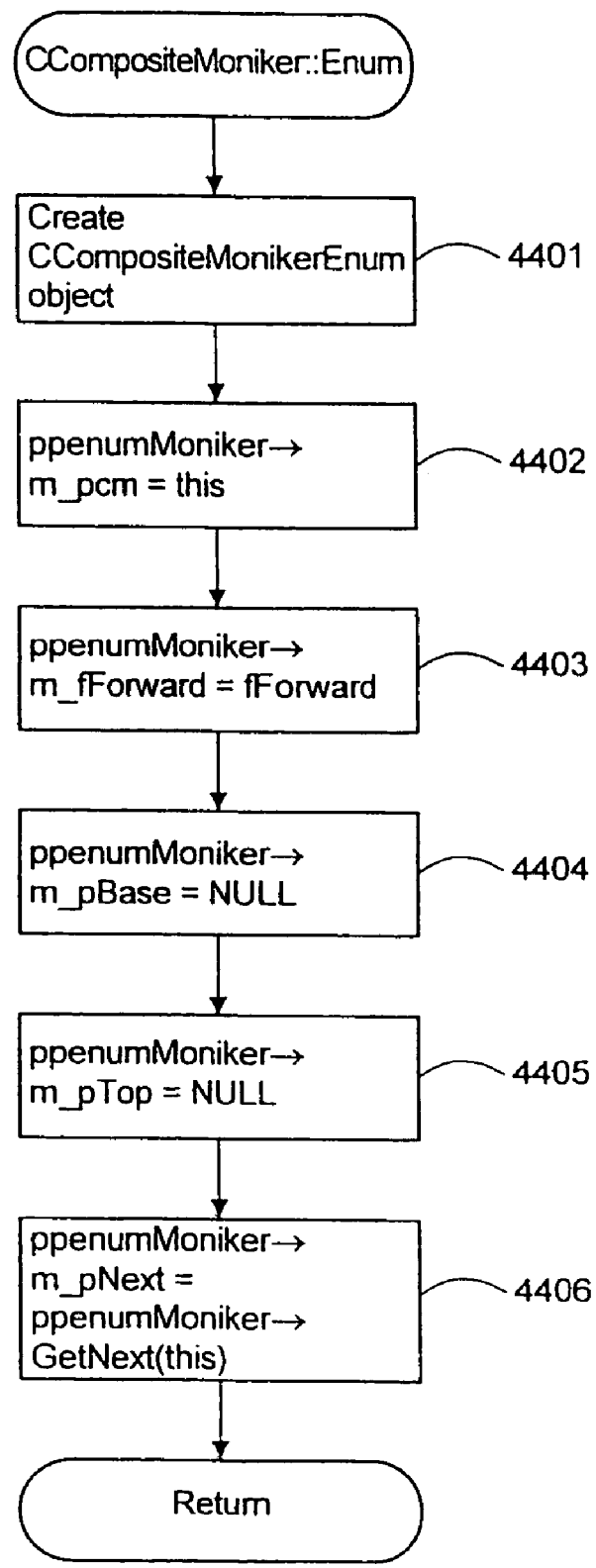
FIG. 44 is a flow diagram of the method Enum of the class CCompositeMoniker.

FIG. 44 is a flow diagram of the method Enum of the class CCompositeMoniker. In step 4401, the method instantiates an enumerator object of type CCompositeMonikerEnum for this composite object. Code Table 44 illustrates the data members of a class definition for the enumerator. The object contains a pointer to the moniker being enumerated (m_pCM), a flag indicating whether the enumeration is in the forward direction (m_fForward), pointers indicating the base and the top of a stack (m_pBase, m_pTop), and a pointer to the next component moniker to be returned (m_pNext). In steps 4402 through 4406, the method initializes the data members of the instantiated object. In step 4406, the method invokes the method GetNext passing this moniker and sets data member m_pNext to the result.

Figure 45:
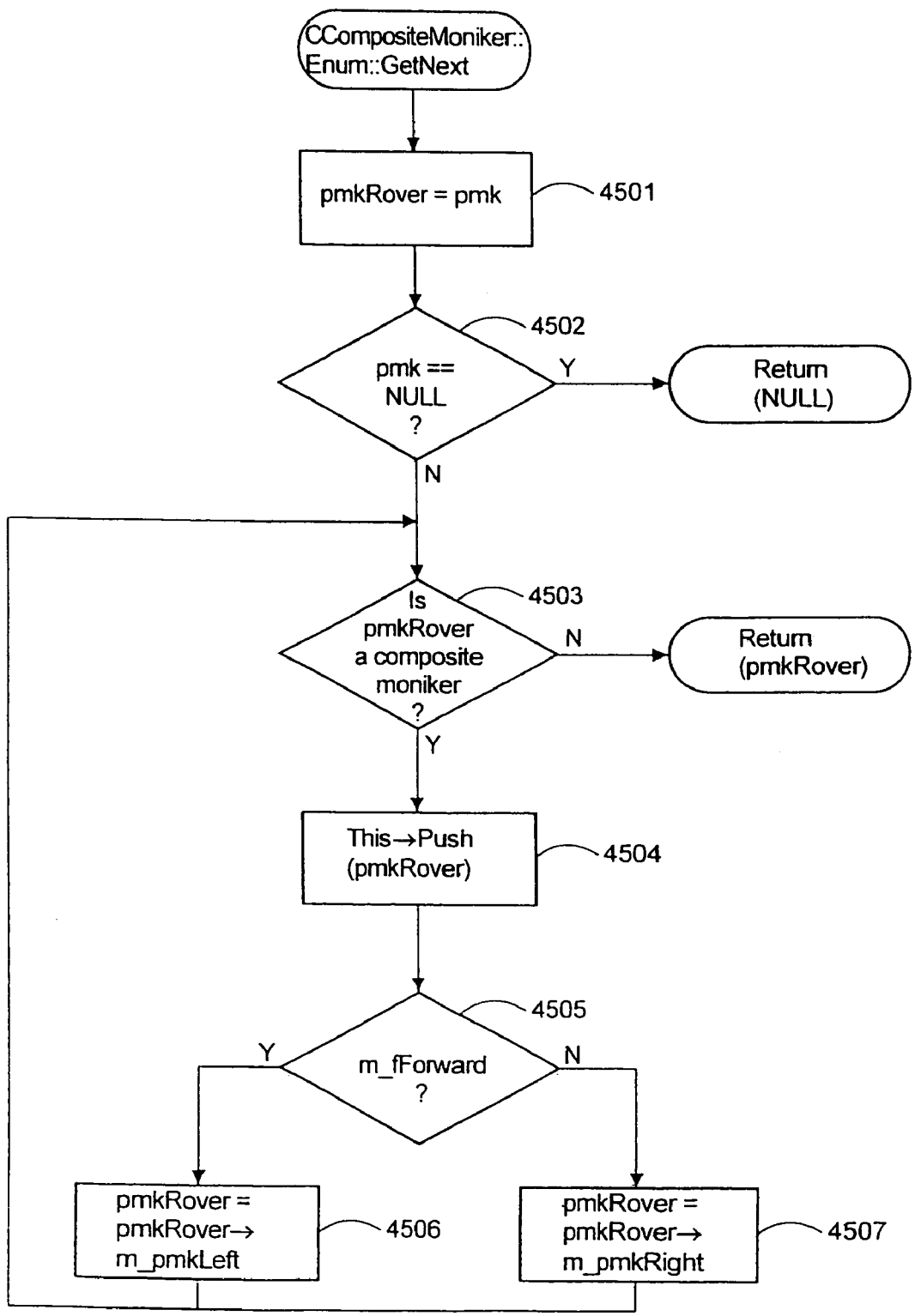
FIG. 45 is a flow diagram of the method GetNext of the class CCompositeMonikerEnum.

FIG. 45 is a flow diagram of the private method GetNext of the class CCompositeMonikerEnum. The enumeration of a composite moniker is a left-to-right, depth-first traversal of the tree formed by the composite moniker. The enumerator maintains a stack to track the traversal of the tree. In step 4501, the method sets a pointer to a rover (pmkRover) equal to the passed moniker. The rover pointer is used to traverse the tree. In step 4502, if the passed moniker is NULL, then the method returns NULL, else the method continues at step 4503. In step 4503, if the moniker pointed to by the rover is a generic composite moniker, then the method continues at step 4504, else a component moniker is located and the method returns the moniker pointed to by the rover. In step 4504, the method invokes the method Push to push the generic composite moniker indicated by the rover onto the stack. In step 4505, if the enumeration is being performed in the forward direction, the method continues at step 4506, else the method continues at step 4507. In step 4506, the method sets the rover to point to the left moniker of the moniker pointed to by the rover and loops to step 4503. In step 4507, the method sets the rover to point to the right moniker of the moniker pointed to by the rover and loops to step 4503.

Figure 46:
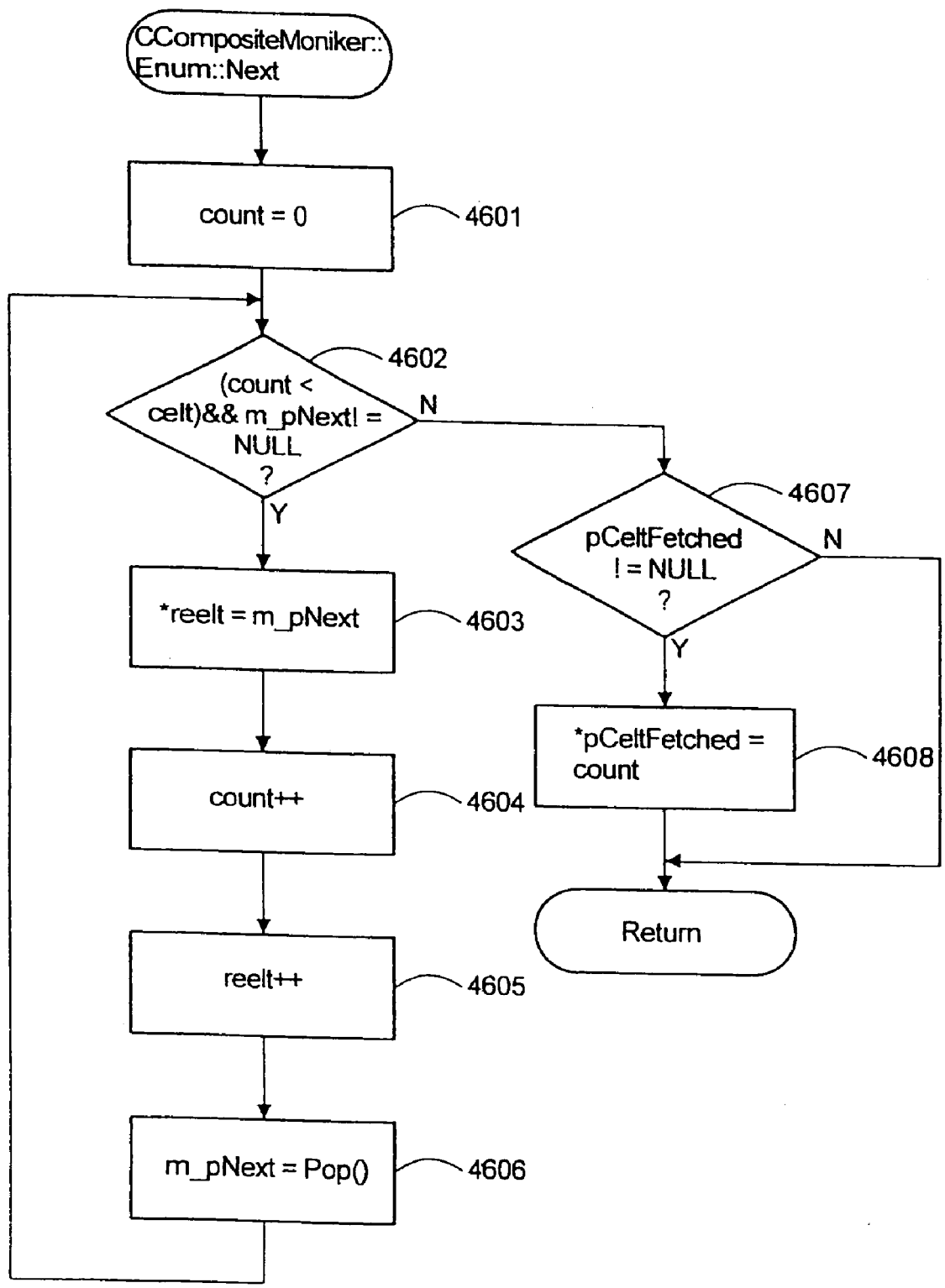
FIG. 46 is a flow diagram of the method Next of the class CCompositeMonikerEnum.

FIG. 46 is a flow diagram of the method Next of the class CCompositeMonikerEnum. Each time this method is invoked it returns the next component moniker of the composite moniker. The method Next returns an array of component monikers up to a maximum number specified as a parameter. In step 4601, the method initializes a count variable to 0. In step 4602, if the count is less than the requested count of component monikers and not all the component monikers have been returned, then the method continues at step 4603, else the method continues at 4607. In step 4603, the method stores the next component moniker in the return array. In steps 4604 and 4605, the method increments the count and index into the return array. In step 4606, the method sets the next component moniker to point to the moniker returned by the method Pop and loops to step 4602. In step 4607, if a pointer to the count of fetched elements is not equal to NULL, then the method sets the pointer equal to the count in step 4608. The method then returns.

The methods Push and Pop of the class CCompositeMonikerEnum implement a stack. The method Push pushes the passed generic composite moniker onto a stack. The method Pop removes a top generic composite moniker from the stack and invokes the method GetNext passing it the right moniker if a search is being performed in the forward direction and a left moniker if the search is being performed in the reverse direction. The method Pop returns the component moniker returned by the method GetNext.

Pointer Moniker Class

In a preferred embodiment, a pointer moniker is a class of moniker that wraps an existing pointer to an object in a moniker so that it may participate as a component moniker in the moniker binding process. A pointer is a reference into "active space," that is, memory of a process. A moniker typically is a reference into "passive space," that is, the representation of an object on disk. Pointer monikers provide a means by which a given use of a moniker can transparently reference either active or passive space.

In a preferred embodiment, the method BindToObject of a pointer moniker invokes the method QueryInterface of the pointed to object. The method BindToStorage returns MK_E_NOSTORAGE. The method Reduce reduces the moniker to itself. The method ComposeWith does a generic composition. The method Enum returns NULL. The method IsSystemMoniker returns MKSYS_NONE. The method IsEqual uses the identity test paradigm on pointers after first checking that the other moniker for the right class. The method Hash returns a constant. The method GetTimeOfLastChange returns MK_E_UNAVAILABLE. The method Inverse returns an anti moniker. The method RelativePathTo returns the other moniker. The method GetDisplayName returns NULL. The method ParseDisplayName binds to the punk pointer using IParseDisplayName interface. Pointer monikers do not serialize; that is, the Save of the IPersistStream interface returns an error.

CreatePointerMoniker

HRESULT CreatePointerMoniker(punk, ppmk)

This function wraps a pointer in a pointer moniker so that it can be presented to interfaces that require monikers for generality, but specific uses of which can usefully deal with a moniker which cannot be saved to backing store. The following table describes the parameters of the method CreatePointerMoniker.

| Argument | Type | Description |
|---|---|---|
| punk | IUnknown* | the pointer that we are wrapping up in a moniker. |
| ppmk | IMoniker** | the returned Pointer Moniker. |
| return value | HRESULT | S_OK, E_OUTOFMEMORY |

Figure 47:
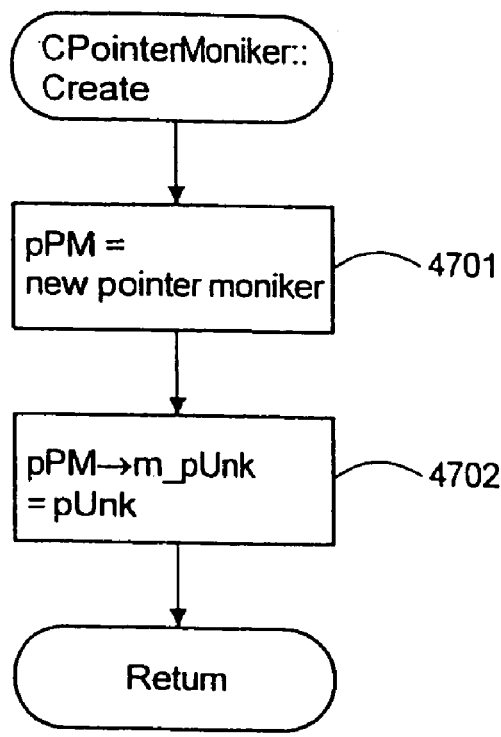
FIG. 47 is a flow diagram of the method Create of the class CPointerMoniker.

FIG. 47 is a flow diagram of the method Create of the class CPointerMoniker. In step 4701, the method instantiates a new pointer moniker. In step 4702, the method sets a data member (m Punk) the new pointer moniker to point to the passed object and returns.

Figure 48:
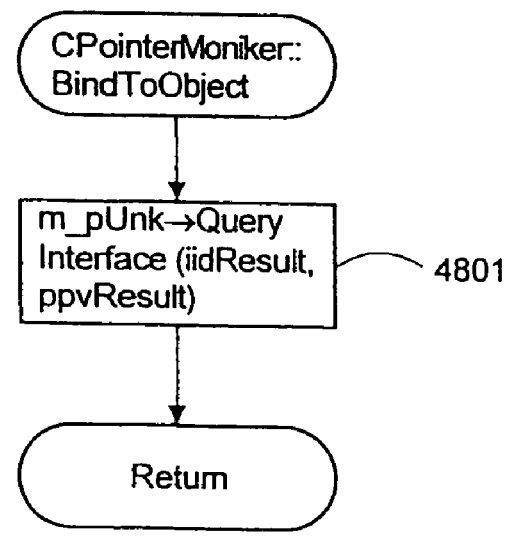
FIG. 48 is a flow diagram of the method BindToObject of the class CPointerMoniker.

FIG. 48 is a flow diagram of the method BindToObject of the class CPointerMoniker. In step 4801, the method invokes the method QueryInterface of the pointed to object passing the identifier of the requested interface. The method then returns with the requested interface.

Figure 49:
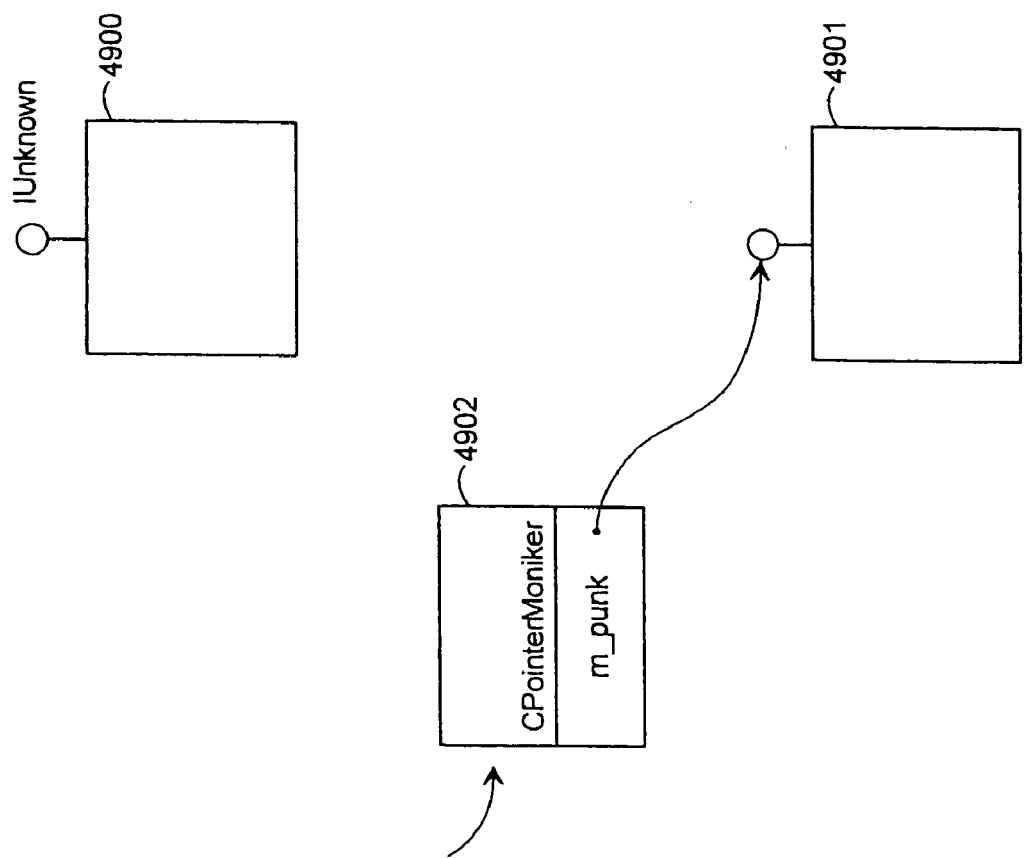
FIG. 49 is a block diagram illustrating a pointer moniker.

FIG. 49 is a diagram illustrating a pointer moniker. Object 4901 is wrapped in pointer moniker 4902. Pointer moniker 4902 contains a pointer to the object 4901.

Details of the Moniker Related Interfaces 1.0 Additional IMonikerMethods

IMoniker::IsRunning

HRESULT   IMoniker::IsRunning(pbc,   pmkToLeft, pmkNewlyRunning)

Answer as to whether this moniker is in fact running. As usual, the Running Object Table in whose context this question is to be answered is obtained by this moniker from the Bind context. pmkToLeft is the moniker to the left of this object in the generic composite in which it is found, if any.

If non-NULL, pmkNewlyRunning is the moniker which has most recently been added to the Running Object Table; the implementation of IsRunning( ) can assume that without this object in the R.O.T., that IsRunning( ) would have reported that it was not running; thus, the only way that it can now be running is if this newly running moniker is in fact itself! This allows for some $n^2$-to-n reductions in algorithms that use monikers. (If the moniker implementation chose to ignore pmkNewlyRunning, no harm would come: this moniker is in fact in the R.O.T.)

Implementations of this method in various kinds of moniker classes are roughly as follows:

Generic Composite Moniker

```
if (pmkToLeft != NULL)
    return (pmkToLeft->ComposeWith(this))-> IsRunning(pbc, NULL,
pmkNewlyRunning);
if(pmkNewlyRunning != NULL) {
    if (pmkNewlyRunning-> IsEqual(this) == NOERROR)
        return NOERROR;
    }
else if (pRunningObjectTable -> IsRunning(this) == NOERROR)
        return NOERROR;
// otherwise, forward it on to my last element.
return this->Last( )->IsRunning(pbc, this->AllButLast( ),
pmkNewlyRunning)
```

Any moniker whose class does not do any wildcard matching

```
if(pmkToLeft == NULL) {
    if(pmkNewlyRunning != NULL)
        return pmkNewlyRunning -> IsEqual(this);
    else
        return pRunningObjectTable -> IsRunning(this);
    }
else
    return ResultFromScode(S_FALSE);//If I was running, then Generic
        Composite would have caught it.
```

A moniker class which has a wild card entry which always matches any instance of the moniker class: if the wild card is present, then all instances of the moniker class to the right of the same other moniker (that is, with the same moniker to their left) are deemed to be running. Such a moniker class might be reasonably used, for example, to match all the addressable ranges in a given spreadsheet.

```
if(pmkToLeft == NULL){
    if (pmkNewlyRunning != NULL)
        return pmkNewlyRunning->IsEqual(this) == NOERROR
            || pmkNewlyRunning->IsEqual(my wild card moniker)==
                NOERROR;
    if (pRunningObjectTable -> IsRunning(this) ==
NOERROR)
        return NOERROR;
    return pRunningObjectTable -> IsRunning(my wild card moniker);
    }
else
    return pmkToLeft->ComposeWith(my wild card moniker) ->
        IsRunning (pbc, NULL, pmkNewlyRunning);
```

A moniker class which has a wild card entry which matches against some of the objects, but only the ones which are in fact actually currently running. We illustrate here specifically the behaviour of Item Monikers.

```
if (pmkToLeft == NULL) {
    if (pmkNewlyRunning != NULL) {
        if (pmkNewlyRunning->IsEqual(this) == NOERROR)
            return NOERROR;
        if (pmkNewlyRunning->IsEqual(my wild card moniker) !=
            NOERROR) return ResultFromScode(S_FALSE);
        goto TestBind;
        }
    }
if (pmkToLeft->ComposeWith(my wild card moniker)->IsRunning
        (pbc, NULL, pmkNewlyRunning) != NOERROR)
    return ResultFromScode(S_FALSE);
```

Test Bind:

\In general, connect to the container and ask whether the object is running. The use of \IOIeItemContainer here is Item Moniker-specific, but the theme is a general one.

IOIeItemContainer*pcont;

pmkToLeft->BindToObject(pbc, NULL, IID_IOIeItem-Container, &pcont);

return pcont-AsRunning(szItemString);

The arguments to this function are as follows:

| Argument | Type | Description |
| --- | --- | --- |
| pbc | IBindCtx* | the usual bind context |
| pmkToLeft | IMoniker* | the moniker to the left of this one in the composite in which it is found. |
| pmkNewlyRunning | IMoniker* | may be NULL. If non-NULL, then this is the moniker which has been most recently added to the R.O.T. In this case, IMoniker::IsRunning( ) implementations may assume that without this moniker in the R.O.T. that IsRunning( ) would return S_FALSE |
| return value | HRESULT | S_OK_FALSE |

IMoniker::GetTimeOfLastChange

HRESULT IMoniker::GetTimeOfLastChange(pbc, pmkToLeft, pfiletime)

Answer the earliest time after which the object pointed to by this moniker is known not to have changed.

The purpose of this function is to support the ability to determine whether a given OLE link object or OLE embedded object which contains links is up-to-date or not. This is usually done as user documents are opened; thus, in most cases it will be important that this operation is fast. Implementations should pay particular attention to the deadline parameter passed in the bind context.

If it is not the case that all the objects in a document are known to be up-to-date, the user will usually be prompted with a dialog as to whether they should be updated. If he says yes, then each of the objects which is not known to be up-to-date will be bound in order to retrieve a new presentation. The point germane to the present discussion is that GetTimeOfLastChange( ) is part of the mechanism of avoiding binding to objects unnecessarily. GetTimeOfLastChange( ) itself, therefore, should not bind to the object in order to obtain the most accurate answer. Rather, it should return the best available answer given objects that are already running. Many monikers denote an object contained in the object denoted by the moniker to their left. Implementations of GetTimeOfLastChange( ) in most of these monikers can take advantage of the fact they cannot have changed any later than the object in which they are contained. That is, these monikers can simply forward the call onto the moniker to their left.

The returned time of change is reported using a FILETIME. A FILETIME is a 64-bit value indicating a time in units of 100 nanoseconds, with an origin in 1601. A resolution of 100 nanoseconds allows us to deal with very fast-changing data; allocating this many bits gives us a range of tens of thousands of years. It is not expected that most change times in objects will actually be internally recorded with this precision and range; they only need be reported with such.

If the time of last change is unavailable, either because the deadline was exceeded or otherwise, then it is recommended that a FILETIME of {dwLowDateTime, dwHighDateTime}={0xFFFFFFFF,0x7FFFFFFF} (note the 0x7 to avoid accidental unsigned/signed confusions) should be passed back. If the deadline was exceeded, then the status MK_E_EXCEEDEDDEADLINE should be returned. If the time of change is unavailable, and would not be available no matter what deadline were used, then MK_E_UNAVAILABLE should be returned. Otherwise S_OK should be returned.

If pmkToLeft is NULL, then this function should generally first check for a recorded change-time in the Running Object Table with IRunningObjectTable::GetTimeOfLastChange( ) before proceeding with other strategies. Moniker classes that support wildcards will have to take into consideration exactly what does get put in the R.O.T. and look for the appropriate thing; since Generic Composite Monikers know nothing of wildcards, they may even need to do that in the non-NULL pmkToLeft case.

See IMoniker::IsRunning( ).

| Argument | Type | Description |
| --- | --- | --- |
| pbc | IBindCtx* | the binding context for this operation. |
| pmkToLeft | IMoniker* | the moniker to the left of this one in the composite in which it is found. |
| pfiletime | FILETIME* | the place in which the time of last change should be reported. |
| return value | HRESULT | S_OK, MK_E_EXCEEDEDDEADLINE, MK_E_UNAVAILABLE, MK_E_CONNECTMANUALLY |

2.0 IBindCtx Interface

The bind context parameter passed to many of the IMoniker operations serves a few purposes.

Its primary purpose is to accumulate the set of objects that get bound during an operation but which should be released when the operation is complete. This is particularly useful in generic composites: using the bind context in this way avoids binding an object, releasing it, only to have it bound again when the operation moves on to another piece of the composite.

Another purpose of the bind context is to pass a group of parameters which do not change as an operation moves from one piece of a generic composite to another. These are the binding opdons, and are described below. Some of these binding options have a related return value in certain error conditions; the bind context provides the means by which they can be returned.

The bind context is also the only means through which moniker operations should access contextual information about their environment. Preferably, there should be no direct calls in moniker implementations to API functions that query or set state in the environment; all such calls should instead funnel through the bind context. Doing this allows for future enhancements which can dynamically modify binding behaviour. In OLE 2, the most important piece of contextual information that moniker operations need to access is the Running Object Table; monikers should always access this table indirectly through IBindCtx::GetRunningObjectTable( ), rather than using the global function GetRunningObjectTable( ). IBindCtx interface allows for future extensions to the passed-in contextual information in the form of the ability to maintain a stringkeyed table of objects.

See IBindCtx::RegisterObjectParam( ) and related functions.

```
interface IBindCTX : IUnknown {
    virtual    HRESULT    RegisterObjectBound(punk) = 0;
    virtual    HRESULT    RevokeObjectBound(punk) = 0;
    virtual    HRESULT    ReleaseBoundObjects( ) = 0;
    virtual    HRESULT    SetBindOptions(pbindopts) = 0;
    virtual    HRESULT    GetBindOptions(pbindopts) = 0;
    virtual    HRESULT    GetRunningObjectTable(pprot) = 0;
    virtual    HRESULT    RegisterObjectParam(lpszKey, punk) = 0;
```

-continued

```
    virtual  HRESULT  GetObjectParam(lpszKey, ppunk) = 0;
    virtual  HRESULT  EnumObjectParam(ppenum) = 0;
    virtual  HRESULT  RevokeObjectParam(lpszKey) = 0;
    };
typed struct {
    DWORD cbStruct;        //the size in bytes of this structure. ie:
sizeof(BINDOPTS).
    DWORD grfFlags;
    DWORD grfMode;
    DWORD dwTickCountDeadline;
    }BINDOPTS;
HRESULT CreateBindCtx(reserved, ppbc);
```

IBindCtx::RegisterObjectBound

HRESULT IBindCtx::RegisterObjectBound(punk)

Remember the passed object as one of the objects that has been bound during a moniker operation and which should be released when it is complete overall. Calling this function causes the binding context to create an additional reference to the passed-in object with IUnknown::AddRef( ); the caller is still required to Release( ) its own copy of the pointer independently.

The effect of calling this function twice with the same object is cumulative, in that it will require two RevokeObjectBound( ) calls to completely remove the registration of the object within the binding context.

| Argument | Type | Description |
| --- | --- | --- |
| punk | IUnknown* | the object which is being registered as needing to be released. |
| return value | HRESULT | S_OK. |

IBindCtx::RevokeObjectBound

HRESULT IBindCtx::RevokeObjectBound(punk)

This function undoes the effect of IBindCtx::RegisterObjectBound( ): it removes the object from the set that will be released when the bind context in IBindCtx::ReleaseBoundObjects( ) (actually removes one occurrence of it). This function is likely to be rarely called, but is included for completeness.

| Argument | Type | Description |
| --- | --- | --- |
| punk | IUnknown* | the object which no longer needs to be released. |
| return value | HRESULT | S_OK, MK_E_NOTBOUND, E_OUTOFMEMORY |

IBindCtx::ReleaseBoundObjects

HRESULT IBindCtx::ReleaseBoundObjects( )

Releases all the objects currently registered with the bind context through RegisterObjectBound( ). This function is (conceptually) called by the implementation of IBindCtx::Release( ).

| Argument | Type | Description |
| --- | --- | --- |
| return value | HRESULT | S_OK |

IBindCtx::SetBindOptions

HRESULT IBindCtx::SetBindOptions(pbindopts)

Store in the bind context a block of parameters that will apply to later IMoniker operations using this bind context. Using block of parameters like this is just an alternative way to pass parameters to an operation. We distinguish the parameters we do for conveyance by this means because 1) they are common to most IMoniker operations, and 2) these parameters do not change as the operation moves from piece to piece of a generic composite.

| Argument | Type | Description |
| --- | --- | --- |
| pbindopts | BINDOPTS* | the block of parameters to set. These can later be retrieved with GetBindOptions( ). |
| return value | HRESULT | S_OK, E_OUTOFMEMORY |

BINDOPTS is defined as follows:

```
typedef struct tagBINDOPTS {
    DWORD cbStruct;         // the size in bytes of this Structure. ie:
sizeof(BINDOPTS).
    DWORD grfFlags;
    DWORD grfMode;
    DWORD dwTickCountDeadline;
    }BINDOPTS;
```

The members of this structure have the following meanings:

| Member | Description |
| --- | --- |
| grfFlags | A group of boolean flags. Legal values that may be or'd together are taken from the enumeration of BINDFLAGS; see below. Moniker implementations should simply ignore any set-bits in this field that they do not understand (presumably because their meanings were defined in some future OLE extension). |
| grfMode | A group of flags that indicates the intended use that the caller has towards the object that he ultimately receives from the associated moniker binding operation. Constants for this member are taken from the STGM enumeration, described in the chapter on "Persistent Storage For Objects." When applied to the BindToObject( ) operation, by far the most significant flag values are: STGM_READ, STGM_WRITE, and STGM_READWRITE. It is possible that some binding operations might make use of the other flags, particularly STGM_DELETEONRELEASE or STGM_CREATE, but such cases are quite esoteric. When applied to the BindToStorage( ) operation, most values are potentially useful here. The default value for grfMode is STGM_SHARE_EXCLUSIVE. |

-continued

| Member | Description |
|---|---|
| dwTickCountDeadline | This is an indication of when the caller would like the operation to complete. Having this parameter allows the caller to approximately & heuristically bound the execution time of an operation when it is more important that the operation perform quickly than it is that it perform accurately. Most often, this capability is used with IMoniker::GetTimeOfLastChange( ), as was previously described, though it can be usefully applied to other operations as well. This 32-bit unsigned value is a time in milliseconds on the local clock maintained by the GetTickCount( ) function. A value of zero indicates "no deadline;" callers should therefore be careful not to pass to the bind context a value of zero that was coincidentally obtained from GetTickCount( ). Clock wrapping is also a problem. Thus, if the value in this variable is less than the current time by more than $2^{31}$ milliseconds, then it should be interpreted as indicating a time in the future of its indicated value plus $2^{32}$ milliseconds.<br>Typical deadlines will allow for a few hundred milliseconds of execution. Each function should try to complete its operation by this time on the clock, or fail with the error MK_E_EXCEEDEDDEADLINE if it cannot do so in the time allotted. Functions are not required to be absolutely accurate in this regard, since it is almost impossible to predict how execution might take (thus, callers cannot rely on the operation completing by the deadline), but operations which exceeded their deadline excessively will usually cause intolerable user delays in the operation of their callers. Thus, in practice, the use of deadlines is a heuristic which callers can impose on the execution of moniker operations.<br>If a moniker operation exceeds its deadline because a given object or objects that it uses are not running, and if one of these had been running, then the operation would have completed more of its execution, then the monikers of these objects should be recorded in the bind context using RegisterObjectParam( ) under the parameter names "ExceededDeadline", "ExceededDeadline1", "ExceededDeadline2", etc.; use the first name in this series that is currently unused. This approach gives the caller some knowledge as to when to try the operation again. |

The enumeration BINDFLAGS, which contains the legal values for the bitfield BINDOPTS::grfFlags, is defined as follows:

```
typedef enum tagBINDFLAGS {
    BINDFLAGS_MAYBOTHERUSER = 1,
    BINDFLAGS_JUSTTESTEXISTENCE = 2,
}BINDFLAGS;
```

These flags have the following interpretation.

| Value | Description |
|---|---|
| BINDFLAGS_MAYBOTHERUSER | If not present, then the operation to which the bind context containing this parameter is applied should not interact with the user in any way, such to ask for a password for a network volume that needs mounting. If present, then this sort of interaction is permitted. If prohibited from interacting with the user when it otherwise would like to, an operation may elect to use a different algorithm that does not require user interaction, or it may fail with the error MK_MUSTBOTHERUSER. |
| BINDFLAGS_JUSTTESTEXISTENCE | If present, indicates that the caller of the moniker operation to which this flag is being applied is not actually interested in having the operation carried out, but only in learning of the operation could have been carried out had this flag not been specified. For example, this flag gives the caller the ability to express that he is only interested in finding out whether an object actually exists by using this flag in a BindToObject( ) call. Moniker implementations are free, however, to ignore this possible optimization and carry out the operation in full. Callers, therefore, need to be able to deal with both cases. See the individual routine descriptions for details of exactly what status is returned. |

IBindCtx::GetBindOptions

HRESULT IBindCtx::GetBindOptions(pbindopts)

Return the current binding options stored in this bind context. See IBindCtx::SetBindOpts( ). for a description of the semantics of each option.

Notice that the caller provides a BINDOPTS structure, which is filled in by this routine. It is the caller's responsibility to fill in the cbStruct member correctly.

| Argument | Type | Description |
|---|---|---|
| pbindOpts | BINDOPTS* | the structure of binding options which is to be filled in. |
| Return value | SCODE | |

IBindCtx::GetRunningObjectTable

HRESULT IBindCtx::GetRunningObjectTable(pprot)

Return access to the Running Object Table relevant to this binding process. Moniker implementations should get access to the Running Object Table using this function rather than the global API GetRunningObjectTable( ). The appropriate Running Object Table is determined implicitly at the time the bind context is created.

| Argument | Type | Description |
| --- | --- | --- |
| pprot | IRunningObjectTable** | the place to return the running object table. |
| return value | SCODE | |

IBindCtx::RegisterObjectParam

HRESULT IBindCtx::RegisterObjectParam(lpszKey, punk)

Register the given object pointer under the name lpszKey in the internally-maintained table of object pointers. The intent of this table is that it be used as a extensible means by which contextual information can be passed to the binding process. String keys are compared case-sensitive.

Like IBindCtx::RegisterObjectBound( ), this function creates an additional reference to the passed-in object using IUnknown::AddRef( ). The effect of calling this function a second time with the same lpszKey is to replace in the table the object passed-in the first time.

By convention, moniker implementers may freely use object parameters whose names begin with the string representation of the class id of the moniker implementation in question.

This facility is also used as means by which various errors can convey information back to the caller. Associated with certain error values are the following object parameters:

| Error | Parameters |
| --- | --- |
| MK_E_EXCEEDEDDEADLNE | Parameters named "ExceededDeadline", "ExceededDeadline1", "ExceededDeadline2", etc., if they exist, are monikers whose appearance as running would make it reasonable for the caller to attempt the binding operation again. |
| MK_E_CONNECTMANUALLY | The parameter named "ConnectManually" is a moniker whose display name should be shown to the user requesting that he manually connect it, then retry the operation. The most common reason for returning this value is that a password is needed. However, it could be that a floppy needs to be mounted. The existence of this error return is a concession. In the best case, this stuff should be completely handled inside the moniker implementations themselves. |
| E_CLASSNOTFOUND | The parameter named "ClassNotFound", if present, is a moniker to the storage of the object whose class was not able to be loaded in the process of a moniker operation. When the moniker is being used in an OLE compound document situation, a sophisticated client may wish to BindToStorage( ) on this moniker, then attempt to carry out a Treat As . . . or Convert To . . . operation as described in the "Persistent Storage For Objects" chapter. If this is successful, then the binding operation could be tried again. Such a methodology improves the usability of link operations. |

New moniker authors can freely use parameter names that begin with the string form of the CLSID of their moniker; see StringFrom CLSID( ).

The arguments to this function are as follows:

| Argument | Type | Description |
| --- | --- | --- |
| lpszKey | LPSTR | the name under which the object is being registered. |
| punk | IUnknown* | the object being registered. |
| return value | HRESULT | S_OK, E_OUTOFMEMORY |

IBindCtx::GetObjectParam

HRESULT IBindCtx::GetObjectParam(lpszKey, ppunk)

Lookup the given key in the internally-maintained table of contextual object parameters and return the corresponding object, if one exists.

| Argument | Type | Description |
| --- | --- | --- |
| lpszKey | LPSTR | the key under which to look for an object. |
| ppunk | IUnknown** | The place to return the object interface pointer. NULL is returned on failure (along with S_FALSE). |
| return value | HRESULT | S_OK, S_FALSE |

IBindCtx::EnumObjectParam

HRESULT IBindCtx::EnumObjectParam(ppenum)

Enumerate the strings which are the keys of the internally-maintained table of contextual object parameters.

| Argument | Type | Description |
| --- | --- | --- |
| ppenum | IEnumString** | the place to return the string enumerator. If the time of change is unavailable, and would not be available no matter what deadline were used, then MK_E_UNAVAILABLE should be returned. |
| return value | HRESULT | S_OK, E_OUTOFMEMORY |

IBindCtx::RevokeObjectParam

HRESULT IBindCtx::RevokeObjectParam(lpszKey)

Revoke the registration of the object currently found under this key in the internally-maintained table of contextual object parameters, if any such key is currently registered.

| Argument | Type | Description |
| --- | --- | --- |
| lpszKey | LPSTR | the key whose registration is to be revoked. |
| return value | HRESULT | S_OK, S_FALSE |

CreateBindCtx

HRESULT CreateBindCtx(reserved,ppbc)

Allocate and initialize a new BindCtx using an OLE-supplied implementation.

| Argument | Type | Description |
| --- | --- | --- |
| reserved | DWORD | reserved for future use; must be zero. |
| ppbc | IBindCtx* | the place in which to put the new BindCtx. |
| return value | HRESULT | S_OK, E_OUTOFMEMORY |

3.0 IOIeLink Interface

Now that we understand how monikers provide a generalized abstraction of a reference to data, we will examine in detail the workings of the most common place in which monikers are actually used: OLE 2 linked compound-document objects.

As mentioned earlier, OLE 2 provides for tracking links as they move about relative to their sources. In order to support the most general such support it is necessary to as the moniker of the link source to generate a tracking representation of itself (which would be another moniker, of course, perhaps called a "tracking moniker"). Though this most-general support has been designed, and will be implemented in the future, it is not implemented in OLE 2. Instead, in OLE 2 knowledge of one particularly important link-tracking algorithm is incorporated in to the OLE-provided link object: in addition to storing the moniker given to it with IOIeLink::SetSourceMoniker( ), it also stores a relative moniker formed using its own moniker, the source moniker, and IMoniker::RelativePathTo( ). The relative moniker has priority over the original, absolute moniker: the link object always tries to bind the relative moniker first, using the absolute moniker on if the relative one fails to bind. Using a relative moniker in addition to the absolute moniker in this way covers the following link tracking scenarios:

1. the link source and the link consumer have been copied or moved but retain the same relative structure. A very important common case of this is that of two documents in the same directory. Another case is that of a link between two objects both embedded in a third document. In these situations, the relative moniker succeeds in binding.
2. the link source does not move, but the consumer does (in a manner other than that of the previous case). Here, the relative moniker fails to bind, but the absolute one works.

From a container's perspective, the architectural difference between an embedding and a link is that a link supports IOIeLink interface whereas an embedding does not. IOIeLink interface contains functionality by which the moniker inside the link and the link's update options are manipulated.

```
interface IOleLink: IUnknown {
    virtual   HRESULT   SetUpdateOptions(dwUpdateOpt) = 0;
    virtual   HRESULT   GetUpdateOptions(pdwUpdateOpt) = 0;
    virtual   HRESULT   SetSourceMoniker(pmk, rclsid) = 0;
    virtual   HRESULT   GetSourceMoniker(ppmk) = 0;
    virtual   HRESULT   SetSourceDisplayName
                        (lpszDisplayName) = 0;
    virtual   HRESULT   GetSourceDisplayName
                        (lplpszDisplayName) = 0;
    virtual   HRESULT   BindToSource(bindflags, pbc) = 0;
    virtual   HRESULT   BindIfRunning( ) = 0;
    virtual   HRESULT   GetBoundSource(ppUnk) = 0;
    virtual   HRESULT   UnbindSource( ) = 0;
    virtual   HRESULT   Update(pbc) = 0;
};
```

IOIeLink::SetUndateOptions

HRESULT IOIeLink::SetUpdateOptions(dwUpdateOpt)

This function sets the link-update options for the link object. This controls exactly when the data and/or presentation cache on the consuming end of the line is updated. dwUpdateOpt is taken from the enumeration OLEUPDATE, defined as follows:

```
typedef enum tagOLEUPDATE {
    OLEUPDATE_ALWAYS=1,
    OLEUPDATE_ONCALL=3,
}OLEUPDATE;
```

These flags have the following semantics:

| Value | Description |
| --- | --- |
| OLEUPDATE_ALWAYS | update the link object whenever possible. This option supports the Automatic link-update option in the Links dialog box. This is the default value. |
| OLEUPDATE_ONCALL | update the link object only when IOleObject::Update( ) is called. This option supports the Manual link-update option in the Links dialog box. |

The arguments to this function have the following meanings.

| Argument | Type | Description |
| --- | --- | --- |
| dwUpdateOpt | DWORD | flags taken from the enumeration OLEUPDATE. |
| return value | HRESULT | S_OK, E_INVALIDARG |

IOIeLink::GetUpdateOptions

HRESULT IOIeLink::GetUpdateOptions(pdwUpdateOpt)

Retrieve update options previously set with IOIeLink::SetUpdateOptions( ).

| Argument | Type | Description |
| --- | --- | --- |
| pdwUpdateOpt | DWORD* | a place to return flags taken from the enumeration OLEUPDATE. |
| return value | HRESULT | S_OK |

IQIeLink::SetSourceMoniker

HRESULT IOIeLink::SetSourceMoniker(pmk, rclsid)

Stores inside of the link object a moniker which indicates the source of the link. This moniker becomes part of the persistent state of the object. In addition to storing this moniker, in order to support link source tracking, link objects also store a relative moniker computed as:

pmkOfThisLinkObject->RelativePathTo(pmk).

When in the running state (i.e.: the source moniker has been bound and connected), a link object registers itself on its link source to receive rename notifications. When one is received, the link object updates its source moniker to the new name. The primary reason for doing this is to handle as best we can the situation where a link is made to a newly created document that has never been saved, though doing this does provide better link tracking in general. For example, newly created Excel spreadsheets are named "SHEET1", "SHEET2", etc. Only when they are saved for the first time do they acquire a persistent identity which is appropriate to store in links to them. So long as the sheet is saved before its link consumer is closed the link will track correctly. Recall that from the container's perspective, a link is just an embedding that also happens to support the IOIeLink interface. In particular, a link object may be at different times in both the loaded and the running state. When in the loaded state, the link object still needs to be able to carry out a limited amount of class-specific, such as verb enumeration, data format enumeration, etc. In order to be able to carry this out, the link object keeps as part of its persistent state an internal cache of the CLSID of the object to which it was last connected. The parameter rclsid here is the initial value of the cache. The cache is updated whenever the link connects. Further, SetSourceMoniker( ) does a BindIfRunning( ), so if the link source indicated by pink is currently running, then rclsid has basically no effect. See also IOIeLink::BindToSource( ).

| Argument | Type | Description |
| --- | --- | --- |
| pmk | IMoniker* | the new moniker for the link. |
| rclsid | REFCLSID | the value to set for the cached class of the link source that is kept in the link object. Most often either CLSID_NULL or the previous value of the CLSID (obtainable with IOleObject::GetUserClassID( )) is passed. |
| return value | HRESULT | S_OK |

IOIeLink::GetSourceMoniker

HRESULT IOIeLink::GetSourceMoniker(ppmk)
    Retrieve the indication of the current link source.

| Argument | Type | Description |
| --- | --- | --- |
| ppmk | IMoniker** | the place at which the moniker currently in the link should be placed. |
| return value | HRESULT | S_OK |

IOIeLink::SetSourceDisplayName

HRESULT    IOIeLink::SetSourceDisplayName(lpszDisplayName)

As described above in IMoniker::GetDisplayName( )., monikers used to indicate the source of embedded link objects have a display name by which they can be shown to the user. Conversely display names can be parsed into moniker using MkParseDisplayName( ). Most often, the indication of a link source is provided directly in a moniker, such as the moniker passed through the clipboard in a Copy/Paste Link operation. Less frequently, it originates in a textual form, such as the text box in the Edit/Links . . . dialog.

Monikers originating in textual form of course need to be parsed into monikers in order to be stored as the source of a link. A key question is whether this is done before or after the display name/moniker is passed to the link object. Both scenarios are supported.

If the caller wishes to do the parsing, then he calls MkParseUserName( ) and passes the resulting moniker to IOIeLink::SetSourceMoniker( ).

If instead it wishes the link object itself to do the parsing, then it should call IOIeLink::SetSourceDisplayName( ). This allows the possibility that the link object can optimize the parsing with a subsequent binding.

In the latter case, then by the first time the link needs to be bound the display name will be parsed and the resulting moniker stored in its place. Until such parsing takes place, the link object will not participate in auto-link reconnections; thus, most callers will either want to themselves call MkParseDisplayName( ) or will want to let the link object do the parsing but run the link immediately after setting the display name in order to cause the parsing to happen.

| Argument | Type | Description |
| --- | --- | --- |
| lpszDisplayName | LPSTR | the display name of the new link source. May not be NULL. |
| return value | HRESULT | S_OK, MK_E_SYNTAX |

IOIeLink::GetSourceDisplayName

HRESULT    IOIeLink::GetSourceDisplayName(lplpszDisplayName)

This returns the display name of the source of the link using the most efficient means available.

The present implementation carries this out by simply asking the internal moniker for its display name. This is sometimes expensive, though very rarely (and never with any of the OLE- supplied monikers). Thus, clients for whom this is a time-critical operation should consider caching the display name themselves.

| Argument | Type | Description |
| --- | --- | --- |
| lplpszDisplayName | LPSTR* | the place to return the name of the link source. May not be NULL. |
| return value | HRESULT | S_OK + any error returned from IMoniker::GetDisplayName( ). |

IOIeLink::BindToSource

HRESULT IQIeLink::BindToSource(grfLinkBind, pbc)

Causes the link to bind the moniker contained within itself. When the user double-clicks a link and the server must be located, this is the workhorse function which is invoked to cause the connection to happen, though normally this is invoked by being called internally by DoVerb( ).

pbc is the bind context to use for the bind operation.

When binding a link, it may be the case that the current class of the link source is not the same as it was the previous time that the link tried to connect. Imagine, for example, a link to a Lotus spreadsheet object that the user subsequently converted (using the Change Type dialog) to an Excel sheet. grfLinkBind controls the behaviour of the binding operation in this scenario. It contains values taken from the enumeration OLELINKBIND:

```
typedef enum tagOLELINKBIND {
    OLELINKBIND_EVENIFCLASSDIFF = 1,
}OLELINKBIND;
```

If OLELINKBIND_EVENIFCLASSDIFF is not provided, then this function will return OLE_E_CLASSDIFF if the class is different than the previous time that this link successfully bound. If OLELINKBTND_EVENIFCLASS-DIFF is given, then the bind process will proceed even if the class has changed.

When OleRun( ) is invoked on an embedding which is in fact a link object, it conceptually just invokes this function as plink->BindToSource(0,0)

If OleRun( ) returned OLE_E_CLASSDIFF, then the client will have to call BindToSource( ) directly.

| Argument | Type | Description |
| --- | --- | --- |
| grfLinkBind | DWORD | value from the enumeration OLELINKBIND. |
| pbc | IBindCtx* | the bind context to use for the bind operation. May be NULL. |
| return value | HRESULT | S_OK, OLE_E_CLASSDIFF, MK_E_NOOBJECT, MK_E_EXCEEDEDDEADLINE, MK_E_SYNTAX |

IOIeLink::BindIfRuning

HRESULT IOIeLink::BindIfRunning( )

This binds the link to its source only if said source is in fact presently running.

| Argument | Type | Description |
| --- | --- | --- |
| return value | HRESULT | S_OK, MK_E_SYNTAX, others |

IOIeLink::GetBoundSource

HRESULT IOIeLink::GetBoundSource(ppUnk) This function retrieves the object to which the link is currently connected, if any is present.

In the event that no source is currently connected, then S_FALSE is returned by the function and NULL is returned through *ppunk.

| Argument | Type | Description |
| --- | --- | --- |
| ppUnk | IUnknown* | the place to return the currently-connected source of this object. May not be NULL. In the event that no source is currently connected, NULL is returned. |
| return value | HRESULT | S_OK, S_FALSE |

IOIeLink::UnBindSource

HRESULT IOIeLink::UnbindSource( )

If the link object is presently connected to its source, then break that connection.

| Argument | Type | Description |
| --- | --- | --- |
| return value | HRESULT | S_OK |

IOIeLink::Update

HRESULT IOIeLink::Update(pbc)

Carry out the same functionality as is described in IOIeObject::Update( ), but in addition record any bound objects in the passed in bind context. IOIeObject::Update( ) on an object which also supports IOIeLink should just call IOIeLink::Update(NULL) on itself. Non-NULL uses of pbc allow complex binding scenarios to be optimized by callers.

The OLE-provided Link Object implementation of IOIeLink::Update( ) requires that the link be made running; that is, that the source moniker be bound. In the event that the source is unavailable, then the implementation of Update( ) is careful not to lose the presentations that it already has cached from the previous time it connected. That is, a failed connect attempt will not cause any presentations to be lost.

| Argument | Type | Description |
| --- | --- | --- |
| pbc | IBindCtx* | the bind context to use for binding operations carried out during the update. May be NULL. |
| return value | HRESULT | S_OK, ... |

Link Object—IOIeObject::IsUpToDate

The implementation if IsUpToDate( ) in links is a bit tricky. The problem is two-fold:
 (1) how to avoid comparing the local clock against the remote clock at the other end of the link, since the two may be very much out of synchronization, and
 (2) how to handle the fact that we must treat equal change times reported from the source conservatively as "out of date" due to possible lack of precision in the source's clock. For example, if the source data is changing at the rate of 20 times per second, but the only clock that the source has available with which to report change times has a resolution of one second, then each group of 20 changes will report exactly the same change time.

The solutions to these problems are embodied in the OLE-provided link object implementation; however, it is instructive nevertheless that others understand how they are addressed. Consider that whenever a link object updates from its source, it stores the remote time (rtUpdate) beyond which the data in that update is known not to have changed; this is the time returned by GetTimeOfLastChange( ) on the source moniker. In addition to this time, the link object also stores the local time (ltChangeOfupdate) at which it first obtained a particular value of rtUpdate. That is, when rtUpdate is revised as a result of an Update( ), if the new value is different than the old, then ltChangeOfUpdate is set to the current local time; if it is the same, then ItChangeOfUpdate is left alone. Finally, the link object stores the local time(ltKnownUpToDate) at which it last knew itself to be up to date. For auto-links, this time is updated as part of their save sequence. Manual links update this time only at UpdateO time. When IsUpToDate( ) is invoked, it retrieves GetTimeOfLastChange( ), the value indicated by rtTimeOfLastChange in the diagram. Given this structure, a link is deemed to be up to date if (approximately):

$$(rtTimeOfLastChange - rtChangeOfUpdate) < (ltKnownUpToDate - ltUpdate)$$

More completely, backwards movement of clocks needs to be considered, and a case of equal remote times is taken as out of date (per the problem indicated above) only if less than two seconds has elapsed on our local clock (that is, we assume that remote clocks have a precision of at least two seconds).

4.0 IRunningObjectTableInterface

In general when binding to an object we want to open it if it is currently passive, but if not, then we want to connect to the running instance. A link to a Lotus 123 for Windows spreadsheet, for example, when first bound to should open the spreadsheet, but a second bind should connect to the already-open copy. The key technical piece that supports this is the Running Object Table.

The Running Object Table is a globally accessible table on each workstation. It keeps track of the objects that are currently running on that workstation so that if an attempt is made to bind to one a connection to the currently running instance can be made instead of loading the object a second time. The table conceptually is a series of tuples, each of the form:

(pmkObjectName,pvObject)

The first element is the moniker that if bound should connect to the running object. The second element is the object that is publicized as being available, the object that is running. In the process of blinding, monikers being bound with nothing to their left consult the pmkObjectName entries in the Running Object Table to see if the object that they (the moniker being bound) indicate is already running.

Access to the Running Object Table is obtained with the function GetRunningObjectTable( ). This returns an object with the interface IRunningObjectTable (note as described earlier, however, that moniker implementations should not use this API, but should instead access the Running Object Table from the bind context as they are passed).

As entries are placed into the Running Object Table, they are matched against the Alert Object Table to see if any auto-link reconnections need to be done.

```
interface IRunningObjectTable:IUnknown {
    virtual   HRESULT   Register(reserved, pUnkObject,
                                pmkObjectName, pdwRegister) = 0;
    virtual   HRESULT   Revoke(dwRegister) = 0;
    virtual   HRESULT   IsRunning(pmkObjectName) = 0;
    virtual   HRESULT   GetObject(pmkObjectName,
                                ppunkObject) = 0;
    virtual   HRESULT   NoteChangeTime(dwRegister,
                                pfiletime) = 0;
    virtual   HRESULT   GetTimeOfLastChange(pmkObjectName,
                                pfiletime) = 0;
    virtual   HRESULT   EnumRunning(ppenumMoniker) = 0;
};
SCODE    GetRunningObjectTable(reserved, pprot);
```

GetRunningObjectTable

HRESULT GetRunningObjectTable(reserved,pprot)

Return a pointer to the Running Object Table for the caller's context.

| Argument | Type | Description |
| --- | --- | --- |
| reserved | DWORD | reserved for future use; must be zero. |
| pprot | IRunningObjectTable** | the place to return the running object table. |
| return value | HRESULT | S_OK |

IRunningObjectTable::Register

HRESULT IRunningObjectTable::Register(reserved, pUnkObject, pmkObjectName, pdwRegister)

Register the fact that the object pUnkObject has just entered the running state and that if the moniker pmkObjectName is bound to, then this object should be used as the result of the bind (with an appropriate QueryInterface( )).

The moniker pmkObjectName should be frilly reduced before registration. See IMoniker::Reduce( ) for a more complete discussion. If an object goes by more than one fully reduced moniker, then it should register itself under all such monikers. Here, "fully reduced" means reduced to the state MKRREDUCE_THROUGUSER.

OLE compound document objects should announce themselves as running by calling this function as soon as all of the following are true:

1. The object is in the running state.
2. The object knows its full moniker (seeIOIeObject::SetMoniker( )). This is true if both of the following are true:
    2a. A moniker for the object relative to its container has been assigned to the object. Recall that this is part of the persistent state of the object.
    2b. The object knows the current moniker of its container (almost always through its container calling IOIeObject::SetMoniker( )). Recall that the moniker of the object's container is not part of the persistent state of the object.
3. There is any possibility that a link to the object or something that it contains exists.

Normally, if a link has ever been made to an object, then it should be assumed that the link to the object still might exist. The consumer of the link might be on a floppy disk somewhere, for example, which may later reappear. The exceptions are some rare situations where a link is created but almost immediately destroyed before the link source is saved.

The moniker with which the OLE object should register itself as running is its full moniker as described in IOIeObject::GetMoniker( ).

Registering a second object under the same moniker sets up a second independent registration, though MK_S_MONIKERALREADYREGISTERED is returned instead of S_OK. This is done without regard to the value of pUnkObject in the second registration; thus, registering the exact same (pmkObjectName, pUnkObject) pair a second time will set up a second registration. It is not intended that multiple registration under the same moniker be a common occurrence, as which registration actually gets used in various situations is non-deterministic.

The arguments to this function are as follows:

| Argument | Type | Description |
| --- | --- | --- |
| reserved | DWORD | reserved for future use; must be zero. |
| pUnkObject | IUnknown* | the object which has just entered the running state. |

-continued

| Argument | Type | Description |
|---|---|---|
| pmkObjectName | IMoniker* | the moniker which would bind to the newly running object. |
| pdwRegister | DWORD* | a place to return a value by which this registration can later be revoked. May not be NULL. |
| return value | HRESULT | S_OK, MK_S_MONIKERALREADYREGISTERED, E_NOMEMORY |

IRunningObjectTable::Revoke

HRESULT IRunningObjectTable::Revoked(dwRegister)

Undo the registration done in IRunningObjectTable::Register( ), presumably because the object is about to cease to be running. Revoking an object that is not registered as running returns the status code MK_S_NOT_RUNNING. Whenever any of the conditions that cause an object to register itself as running cease to be true, the object should revoke its registration(s). In particular, objects should be sure to extant registration of themselves from the Running Object Table as part of their release process; there is no means by which entries in the Running Object Table can be removed automatically by the system.

| Argument | Type | Description |
|---|---|---|
| dwRegister | DWORD | a value previously returned from IRunningObjectTable::Register( ). |
| return value | HRESULT | S_OK, MK_S_NOT_RUNNING. |

IRunningObjeetTable::IsRunning

HRESULT IRunningObjectTable::IsRunning(pmkObjectName)

Inquire by looking up in this Running Object Table as to whether an object with this moniker is currently registered as running. Success or failure is indicated using the return codes S_OK or S_FALSE. The R.O.T. compares monikers by sending IsEqual( ) to the monikers already in the table with moniker on the right as an argument.

| Argument | Type | Description |
|---|---|---|
| pmkObjectName | IMoniker* | the moniker that we want to see is running |
| return value | HRESULT | S_OK, S_FALSE. |

IRunningObjectTable::GetObject

HRESULT IRunningObjectTable::GetObject(pmkObjectName, ppunkObject)

If the object designated by pmkObject name is registered as actually running, then return the object so registered. The R.O.T. compares monikers by sending IsEqual( ) to the monikers already in the table with moniker on the right as an argument.

This is the function moniker implementations should use to test if they are already running (and get the pointer to the object if so).

| Argument | Type | Description |
|---|---|---|
| pmkObjectName | IMoniker* | the moniker in whom interest is being expressed. |
| ppunkObject | IUnknown** | the place to return the pointer to the object. A returned value of NULL indicates that the object is not registered. |
| return value | HERESULT | S_OK, MK_S_NOT_RUNNING |

IRunningObjectTable::NoteChangeTime

HRESULT IRunningObjectTable::NoteChangeTime (dwRegister,pfiletime)

Make a note of the time that a particular object has changed in order that IMoniker::GetTimeOfLastChange( ) can report an appropriate change time. This time so registered is retrievable with IRunningObjectTable::GetTimeOfLastChange( ). Objects should call this as part of their data change notification process.

| Argument | Type | Description |
|---|---|---|
| dwRegister | DWORD | the token previously returned from IRunningObjectTable::Register( ). The moniker whose change time is noted is the one specified in pmkObjectName in that call. |
| pfiletime | FILETIME* | on entry, the time at which the object has changed. |
| return value | HRESULT | S_OK |

IRunningObjectTable::GetTimeOfLastChange

HRESULT IRunningObjectTable::GetTimeOfLastChange (pmkObjectName,pfiletime)

Look up this moniker in the running object table and report the time of change recorded for it if same is present. The R.O.T. compares monikers by sending IsEqual( ) to the monikers already in the table with moniker on the right as an argument. Implementations of IMoniker::GetTimeOfLastChange( ), when invoked with pmkToLeft==NULL, will want to call this function as the first thing they do.

| Argument | Type | Description |
|---|---|---|
| pmkObjectName | IMoniker* | the moniker in which we are interested in the time of change. |
| pfiletime | FILETIME* | on exit, the place at which the time of change is returned. |
| return value | HRESULT | S_OK, MK_S_NOT_RUNNING |

IRunningObjectTable::EnumRunning

HRESULT IRunningObjectiable::EnumRunning(ppenumMoniker)

Enumerates the objects currently registered as running. The returned enumerator is of type IEnumMoniker, which enumerates monikers.

typedefEnum<IMoniker*>IEnumMoniker;

The monikers which have been passed to IRunningObjectTable::Register( ) are enumerated.

| Argument | Type | Description |
| --- | --- | --- |
| ppenumMoniker | IEnumMoniker** | the place at which to return the enumerator. |
| return value | HRESULT | S_OK, E_OUTOFMEMORY |

5.0 IOIeContainer and Related Interfaces

IOIeContainer interface provides the ability to enumerate objects in a container. An extension, IOIeItemContainer, is used by Item Monikers in the process of binding; see the chapter on moniker for more information.

```
interface IoleContainer : IParseDisplayName {
    virtual   HRESULT   EnumObjects(grfFlags, ppenum) = 0;
    virtual   HRESULT   LockContainer(fLock) = 0;
}
interface IoleItemContainer : IOleContainer {
    virtual   HRESULT   GetObject(lpszitem, dwSpeedNeeded, pbc,
    iid, ppvObject) = 0;
    virtual   HRESULT   GetObjectStorage(lpszItem, pbc, iid,
    ppvStorage) = 0;
    virtual   HRESULT   IsRunning (lpszitem) = 0;
};
```

IQleContainer::EnumObjects

HRESULT IOleContainer::EnumObjects(grfFlags,ppenum)

Enumerate the objects contained in this container. grfFlags is a group of flags which control the enumeration and which are taken from the enumeration OLECONIF:

```
typedef enum tagOLECONTF {
    OLECONTF_EMBEDDINGS = 1,
    OLECONTF_LINKS = 2
    OLECONTF_OTHERS = 4
    OLECONTF_ONLYUSER = 8
    OLECONTF_ONLYIFRUNNING = 16
} OLECONTF;
```

These flags have the following meanings:

| Value | Description |
| --- | --- |
| OLECONTF_EMBEDDINGS | The OLE embedded objects in the container should be enumerated. |
| OLECONTF_LINKS | The OLE linked objects in the container should be enumerated. |
| OLECONTF_OTHER | Objects in the container other than OLE compound document objects should be enumerated. Unless this flag is given, "pseudo-objects" in the container will be omitted. |
| OLECONTF_ONLYUSER | Not all of the objects in the container are to be enumerated, only the ones which the user is consciously aware of. Hidden named-ranges in Microsoft Excel, for example, would not be enumerated if this flag is given. |
| OLECONTF_ONLYIFRUNNING | If this flag is specified, then only the objects which are currently running inside this container are returned. |

The returned enumeration is of type IEnumUnknown:
typedef Enum<IUnknown*> IEnumUnknown;
The arguments to this type of function are as follows:

| Argument | Type | Description |
| --- | --- | --- |
| grfFlags | DWORD | flags from the enumeration OLECONTF. |
| ppenum | IEnumCNTDOBJ* | the place at which the enumerator should be returned. |
| return value | HRESULT | S_OK, E_FAIL |

IOIeContainer::LockContainer

HRESULT IOIeContainer::LockContainer(fLock)

This call is made by embedded objects on their container. It is used to keep the container running in the absence of other reasons for it to remain running. This is important during a silent update of a link to an embedding. A call to LockContainer(TRUE) should be balanced with a call to LockContainer(FALSE).

The container should keep track of whether and how many calls to LockContainer(TRUE) have been made. When that number is non-zero, it should remain running. If the lock count goes to zero and there are no other reasons to remain running, the container should shutdown. User actions can override locks; for example, if the container is visible and the user closes the application while the lock count is non-zero, the container should close.

Normally, object applications need not concern themselves with calling LockContainer( ): the Handler calls LockContainer( ) as appropriate when the object transitions to and from the running state. The Handler causes the object to transition into the running state, and calls LockContainer(TRUE) when it does so. It calls LockContainer(FALSE) in response to the reception of OnClose( ) notifications from the server.

| Argument | Type | Description |
| --- | --- | --- |
| fLock | BOOL | Indicates whether to lock (TRUE) or unlock (FALSE). |
| return value | HRESULT | S_OK, E_FAIL |

IOIeItemcontainer::GetObject

HRESULT IOIeItemContainer::GetObject(lpszItem, dwSpeedNeeded, pbc, riid, ppvObject)

IOIeItemContainer::GetObject( ) should first check to see of the given item designates an embedded object. If so, then it should load and run the object, then return it. If not, then it should check to see of the item designates a local object within the container. This latter case is just like OLE-SERVERDOC::GetObject( ) in OLE 1.

dwSpeedNeeded is an indication of how willing the caller is to wait to get to the object. This value is set by the implementation of Item Moniker; the value it uses is derived from the dwTickCountDeadline parameter in the Bind Context that it receives: dwSpeedNeeded is one of the following values:

```
typedef enum tagBINDSPEED {
    BINDSPEED_INDEFINITE = 1, //the caller is willing to wait
    indefinitely
    BINDSPEED_MODERATE = 2, //the caller is willing to wait a
    moderate amount of time
    BINDSPEED_IMMEDIATE = 3, //the caller is willing to wait only
    a very short time
} BINDSPEED;
```

If BINDSPEED_IMMEDIATE is specified, then the object should be returned only if it is already running or if it is a pseudo-object (an object internal to the item container, such as a cell-range in a spreadsheet or a character-range in a word processor); otherwise, MK_B_EXCEEDEDDEADLINE should be returned. BINDSPEED_MODERATE would include those things indicated by BINDSPEED_IMMEDIATE, plus, perhaps, those objects which are always running when loaded: in this case, load (not load & run) the designated object, ask if it is running, and return it if so; otherwise, fail with MK_E_EXCEEDEDDEADLINE as before. BINDSPEED_iNDEFINITE indicates that time is of no concern to the caller.

The actual bind context parameter is also here passed in pbc for the use of more sophisticated containers. Less sophisticated containers can simply ignore this and look at dwSpeedNeeded instead. In effect, what the implementation of Item Moniker does is convert the deadline in the bind context into an appropriate dwSpeedNeeded, in the hope that the latter is easier to take a decision on for most containers.

| Argument | Type | Description |
|---|---|---|
| lpszItem | LPSTR | the item in this container that should be bound to. |
| dwSpeedNeeded | DWORD | a value from the enumeration BINDSPEED. See above. |
| pbc | IBindCtx* | the actual deadline parameter involved in this binding operation. For the use of more sophisticated containers. Most can ignore this, and instead use dwSpeedNeeded. |
| riid | REFIID | the interface with which a connection to that object should be made. |
| ppvObject | void** | the bound-to object is returned here. |
| return value | HRESULT | S_OK, MK_E_EXCEEDDEDDEADLINE, MK_E_NOOBJECT, E_NOINTERFACE, E_OUTOFMEMORY |

IOIeItemContainer::GetObjectStorage

HRESULT IOIeItemContainer::GetObjectStorage(lpszItem, pbc,riid,ppvStorage)

If lpszItem designates an item in this container that has an independently identifiable piece of storage (such as does an embedded object), then return access to that storage using the indicated interface.

pbc is the bind context as received by the Item Moniker BindToStorage( ) call. Most container implementations can simply ignore this value; it is passed for the benefit for more sophisticated containers.

| Argument | Type | Description |
|---|---|---|
| lpszItem | LPSTR | the item access to whose storage is being requested. |
| pbc | IBindCtx* | as in IoIeItemContainer::GetObject( ). Can be ignored by most containers. |
| riid | REFIID | the interface by which the caller wishes to access that storage. Often IID_IStorage or IID_IStream are used. |
| ppvStorage | void** | the place to return the access to the storage |
| return value | HRESULT | S_OK, MK_E_EXCEEDEDDEADLINE, MK_E_NOOBJECT, E_OUTOFMEMORY, E_NOINTERFACE, MK_E_NOSTORAGE |

IOIeItemContainer::IsRunning

HRESULT IOIeItemContainer::IsRunning(lpszItem)

Answer whether the given item in this item container is in fact running or not. See IMoniker::IsRunning( ) for a sketch of how this function is used in Item Monikers.

| Argument | Type | Description |
|---|---|---|
| lpszItem | LPSTR | the item access to whose running status is being requested. |
| return value | HRESULT | S_OK, S_FALSE, MK_E_NOOBJECT |

Related API Functions

An object is in the running state when its associated server executable, if any, is running and connected to the object. Certain operations can only be done while the object is in this state. For example, as was described earlier, IOIeObject::InitFromData( ) is such a function. Function invocations that fail merely because the object is not running in general return the status code E_NOTRUNNING. In response to this error, a caller should put the object into the running state with OleRun( ) then try the operation again. Since it is harmless to OleRun( ) an object that is already running, containers may wish simply to OleRun( ) the object before attempting any operation which may fail in this manner.

OleRun

HRESULT OleRun(pUnknown)

Cause the object to enter the running state if it is not presently running. If the object is not running, then this is often a very expensive operation,on the order of many seconds, since an application needs to be launched. If the object is already running, then this function has no effect.

This function, when invoked on an OLE link, may return the result OLE_E_CLASSDIFF, as will happen in the situation, say where a link has been made to an object which has been Convert To..'d while the link has been passive. If the client wishes to go ahead anyway, he should invoke IOIeLink::BindToSource( ); see that function for more details.

| Argument | Type | Description |
| --- | --- | --- |
| pUnknown | IUnknown* | the embedded object which should be made running. |
| return value | HRESULT | S_OK, OLE_E_CLASSDIFF. |

OleIsRunning

BOOL OleIsRunning(pObject)

This answers whether the object is currently in the running state or not.

| Argument | Type | Description |
| --- | --- | --- |
| pObject | IOleObject* | the object to be inquired of. |
| return value | BOOL | true or false |

6.0 IDataObject Interface

IDataObject interface provides the ability to pass data to and from an object using SetData( ) and GetData( ). The data that is passed is arranged according to a particular format denoted by a clipboard format. Optionally, the data is tagged as being composed or laid-out according to the characteristics of a particular target device. The data being transferred can be conveyed by one of several different media.

The set of formats, etc., that can legally be passed to and from an object can be enumerated with EnumFormatEtc( ). In addition, an advisory connection can be made to the data object whereby it will notify a caller when data it contains changes.

```
interface IDataObject : IUnknown {
    virtual   HRESULT   GetData(pformatetc, pmedium) = 0;
    virtual   HRESULT   GetDataHere(pformatetc, pmedium) = 0;
    virtual   HRESULT   QueryGetData(pformatetc) = 0;
    virtual   HRESULT   GetCanonicalFormatEtc(pformatetcIn,
                          pformatEtcOut) = 0;
    virtual   HRESULT   SetData(pformatetc, pmedium,
                          fRelease) = 0;
    virtual   HRESULT   EnumFormatEtc(wDirection,
                          ppenumFormatEtc) = 0;
    virtual   HRESULT   DAdvise(pformatetc, grfAdvf,
                          pAdvSink, pdwConnection) = 0;
    virtual   HRESULT   DUnadvise(dwConnection) = 0;
    virtual   HRESULT   EnumDAdvise(ppenumAdvise) = 0;
};
```

IDataObject::GetData

HRESULT IDataObject::GetData(pformatetc, pmedium)

Retrieve data for a certain aspect of the object in a certain clipboard format formatted for a certain target device conveyed on a certain storage medium. The information as to what is to be retrieved and how it is to be passed is indicated in the parameter pformatetc.

pformatetc-->tymed may indicate that the caller is willing to receive the data on one of several media. The callee decides if it can support one of the media requested by the caller. If it cannot, then it returns DATA_E_FORMATETC. If it can, then it returns the actual data on a medium passed back through the pmedium parameter. Pmedium is conceptually an out parameter: the STGMEDIUM structure is allocated by the caller, but filled by the callee. The callee gets to decide who is responsible for releasing the resources maintained on behalf of the medium: itself, or the caller. The callee indicates its decision through the value it returns through function pointer pmedium--22 punkForRelease( ), as was described above. The caller always frees the returned medium by simply calling ReleaseStgMedium( ) (then, of course, freeing the STGMEDIUM structure itself).

If it is not presently possible to transfer ownership of a root-evel IStorage from process to another, though this will be rectified in later releases. Therefore, at present, use of Get-Data( ) with TYMED_ISTORAGE requires that the callee retain ownership of the data, that is, that it use a non-NULL pUnkForRelease. Alternatively, callers are encouraged to instead use GetDataHere( ), as in general it is more efficient.

| Argument | Type | Description |
| --- | --- | --- |
| pformatetc | FORMATETC* | the format, etc., in which the caller would like to obtain the returned data. |
| pmedium | STGMEDIUM* | a place in which the medium containing the returned data is communicated. |
| return value | HRESULT | S_OK, DATA_E_FORMATETC. |

IDataObject::SetData

HRESULT IDataObject::SetData(pformatetc, pmedium, fRelease)

Send data in a specified format, etc., to this object. As in IDataObject::GetData( ), pformatetc indicates the format, aspect, etc., on which the data is being passed. The actual data is passed through the caller-allocated pmedium parameter.

The caller decides who, itself or the callee, is responsible for releasing the resources allocated on behalf of the medium. It indicates its decision in the fRelease parameter. If false, then the caller retains ownership, and the callee may only use the storage medium for the duration of the call. If true, then the callee takes ownership, and should itself free the medium when it is done with it. The callee should not consider itself as having taken ownership of the data unless it successfully consumes it (i.e.: does not return DATA_E_FORMATETC or some other error). If it does take ownership, the callee frees the medium by calling ReleaseStg-Medium( ); see that function for a discussion of how the medium is actually freed.

| Argument | Type | Description |
| --- | --- | --- |
| pformatetc | formatetc* | the format, etc., in which to interpret the data contained in the medium. |
| pmedium | STGMEDIUM* | the actual storage medium (an in-parameter only). |
| fRelease | BOOL | indicates who has ownership of the medium after the call completes. |
| return value | HRESULT | S_OK, DATA_E_FORMATETC. |

7.0 IPersistStream Interface

IPersistStream is an interface that support the persistence objects that are cheap enough to use a simple serialize/deserialize pacification model. OLE 2 compound-document objects (embeddings and links) specifically do not use this interface; see IPersistStorage instead. Monikers are an example of objects that do use this stream-based persistence model.

Unlike the IStorage instances used in IPersistStorage, the IStream instances used in this interface are valid only for the duration of the call in which they are passed; the object may not retain hold of them after the call completes.

Notice that this interface derives from IPersist.

```
interface IPersistStream:IPersist {
    virtual    HRESULT    IsDirty( ) = 0;
    virtual    HRESULT    Load(pstm) = 0;
    virtual    HRESULT    Save(pstm, fClearDirty) = 0;
    virtual    HRESULT    GetSizeMax(pcbSize) = 0;
    };
    HRESULT    ReadClassStm(pstm, pcid);
    HRESULT    WriteClassStm(pstm, clsid);
    HRESULT    OleSaveToStream(pPersistStm, pstm);
    HRESULT    OleLoadFromStream(pstm, iidInterface, ppvObj);
```

IPersistStream::Load

HRESULT IPersistStream::Load(pstm)

Initialize the object from serialized state that it previously stored with IPersistStream::Save( ).

On entry, the stream is logically positioned just as it was in the call to Save( ). The implementation of Load( ) is permitted to both read from and seek about in the stream; however, it may not write to it. On exit, the stream should be left in the same position as it was on exit from Save( ), which is just past the end of the data.

| Argument | Type | Description |
| --- | --- | --- |
| pstm | IStream * | the stream from which the object should load itself. |
| return value | HRESULT | S_OK, E_FAIL, E_NOMEMORY |

IPersistStream::Save

HRESULT IPersistStream::Save(pstm, fClearDirty)

Save the state of the object to the indicated stream in such a way as it can be retrieved later with IPersistStream:Load( ). The object specifically does not write its own class identifier to the stream; this is done by the caller; this permits the caller in appropriate situations to more efficiently store homogeneous collections of objects. If fClearDirty is true, then the internal dirty flag is cleared as a result of this call.

On entry, the stream is positioned at the part of the stream at which the object should write its data; the object can immediately issue IStream::Write( ) calls. The object is specifically allowed to seek about in the stream should it choose to do so, it may also read back pieces of the stream that it has written; however, the object should not seek the stream before the position at which it was on function entry. On function exit, the stream should be positioned immediately past all the persistent data of the object.

The error STG_E_MEDIUMFULL is to be returned by this if pstm--22 Write( ) call returns STG_E_MEDIUM FULL. This function may also return the error STG_E_CANTSAVE if for some reason the object is not currently in a state where it is serializable. Such a situation might arise if the object contains other objects which may or may not themselves be serializable. On error return, the position of the seek pointer is undefined.

| Argument | Type | Description |
| --- | --- | --- |
| pstm | IStream * | the stream into which the object should be stored. |
| fClearDirty | BOOL | whether the internal dirty flag should be cleared as a result of the save. |
| return value | HRESULT | S_OK, STG_E_MEDIUMFULL, STG_E_CANTSAVE |

IPersistStream::GetSizeMax

HRESULT IPersistStream::GetSizeMax(pcbSize)

Answer an upper bound as to the size of stream that would be required if Save( ) were called on this object at this instant in time. This value can be used by callers to set buffer size for immediately subsequent Save( ) calls. This value should be a conservative estimate of the size required, since the caller of Save( ) may choose to provide a non-growable buffer.

| Argument | Type | Description |
| --- | --- | --- |
| pcbSize | LARGE_INTEGER* | the place to return the size hint. |
| return value | HRESULT | S_OK |

IPersistStream::IsDirty

HRESULT IPersistStream::IsDirty( )

Answer whether the object is dirty; i.e., whether it has changed in such a way that a Save( ) is required in order to avoid information loss. This flag is cleared in the implementation of IPersistStream::Save( ).

| Argument | Type | Description |
| --- | --- | --- |
| return value | HRESULT | S_OK, S_FALSE |

ReadClassStm

HRESULT ReadClassStm(pstm,pcid)

Read a CLSID from the stream that was previously written with WriteClassStm( ).

| Argument | Type | Description |
| --- | --- | --- |
| pstm | IStream * | the stream from which the CLSID is to be read. |
| pcid | CLSID * | the place at which the CLSID is to be returned. |
| return value | HRESULT | S_OK, S_FALSE if end-of-stream hit |

WriteClassStm

HRESULT WriteClassStm(pstm, clsid)

Write the indicated class identifier to the stream in such a way as it can be reconstituted with ReadClassStm( ).

| Argument | Type | Description |
| --- | --- | --- |
| pstm | IStream * | the stream into which the CLSID is to be written. |
| clsid | REFCLSID | the CLSID to write to the stream. |
| return value | HRESULT | S_OK, STG_E_MEDIUMFULL |

OleSaveToStream

HRESULT OleSaveToStream(pPersistStm, pstm)

This helper function simplifies saving an IPersistStream object. It first asks the object for its class with IPersistStream::GetClassID( ), then writes it to the stream with WriteClassStm( ). It then asks the object to save itself to the stream with pPersistStm--22 Save(pstm, true);
Note that this clears the dirty flag in the object.
pPersistStm may legally be NULL. This has the effect of simply writing CLSID_NULL to the stream. See also OleLoadFromStream( ).

| Argument | Type | Description |
| --- | --- | --- |
| pPersistStm | IpersistStream* | the object which is to be saved to the stream, preceded by its serialized class id. |
| pstm | IStream * | the stream in which the object is to be serialized. |
| return value | HRESULT | S_OK, STG_E_MEDIUMFULL |

OleLoadFromStream

HRESULT OleLoadFromStream(pstm, iidInterface, ppvObj)

This helper function simplifies loading an IPersistStream-supporting object from the stream in the common case where the class id of the object immediately precedes the data of the object in the stream. As usual, the caller indicates the interface by which he wishes to talk to the object, and a pointer to such an interface is returned through a void** parameter.

Calling this function on a stream with a class id of CLSID_NULL causes S_FALSE to be returned from this function and NULL to be returned through ppvObj.

| Argument | Type | Description |
| --- | --- | --- |
| pstm | IStream * | the stream from which the object is to be loaded. |
| iidInterface | REFIID | the interface by which the caller wishes to talk to the object. |
| ppvObj | void ** | the place to return the newly-created object. |
| return value | HRESULT | S_OK, S_FALSE, E_OUTOFMEMORY |

8.0 IPersistFile interface

IPersistFile interface is an interface which permits the loading and saving of documents which live in actual disk files (as opposed to objects which live in IStorage instances). The key point here is that the application itself is responsible for opening the file, since, in general, the detailed semantics about how to open an application vary from application to application. Notice that this interface derives from IPersist.

```
interface IPersistFile: IPersist {
    virtual HRESULT IsDirty( ) = 0;
    virtual HRESULT Load(lpszFileName, grfMode) = 0;
    virtual HRESULT Save(lpszFileName, fRemember) = 0;
    virtual HRESULT SaveCompleted(lpszFileNameSaved) = 0;
    virtual HRESULT GetCurFile(lplpszFileName) = 0;
};
HRESULT GetClassFile(lpszFileName, pcid);
```

IPersistFile::Load

HRESULT IPersistFile::Load(lpszFileNanme, grfMode)

Load the document that is contained in the given file name. The file name will not be a relative path, always an absolute one. This is purely an initialization function; the document is not to be shown to the user at this time. This function is called by the implementation of BindToObject( ) in file monikers.

| Argument | Type | Description |
| --- | --- | --- |
| lpszFileName | LPSTR | the absolute path name of the file to open. |
| grfMode | DWORD | the access mode with which the caller intends to use the file. Values taken from the STGM enumeration. These only express the intent that the caller has in opening the file; the application may add more restrictive permissions as necessary. A value of zero for this parameter is legal; the object should interpret the request with the usual defaults as if the user had opened the file. |
| return value | HRESULT | S_OK, E_NOMEMORY, any STG_E_*value, E_FAIL |

IPersistFile::Save

HRESULT IPersistFile::Save(lpszFileName, fRemember)

Save (a copy of) the object to the indicated file name. This function is not called by the OLE libraries, but some clients of objects will find it useful for programmatically manipulating documents.

If non-NULL, the lpszFileName indicates the full path name of the destination for the save. If the object currently has an associated disk file, then lpszFileName may legally be NULL, indicating that a simple "File/Save" is requested to now-current file name. Whether the object currently has an associated disk file can be determined with IPersist File::GetCurFile( ).

If lpszFileName is non-NULL, then fkemember distinguishes whether a "Save As . . . " or a "Save a Copy As . . . " is being asked for. True indicates that lpszFileName should become the working copy of the document ("Save As . . . "); false indicates that after the function the working copy shbuld be whatever it was before the function ("Save a Copy As . . . ").

In the case that the file saved to is on exit the now-current file of the document, then the internal dirty flag maintained by this object should be cleared as a result of this call. Also in this case, the caller is responsible for later calling IPersistFile:: SaveCompleted( ) when it is done with the data found in the file.

In the case that the file saved to is on exit the now-current file of the document and this new file is different than the original file of the document, then the object should send a "rename" notification to any extant advisory connections (see IAdviseSink::OnRename( )).

IPersistFile::SaveCompleted

HRESULT IPersistFile::SaveCompleted(lpszFileNameSaved)

In the case that the file saved to in IPersistFile::Save( ) is on exit from that function the now-current file of the document, the IPersistFile::SaveCompleted( ) should be called when the caller of Save( ) is done doing whatever it is that it needs to do with the contents of the file. In the interim, the IPersistFile object should not change the contents of the file. When the object receives SaveCompleted, it should send lAdviseSink:: OnSave( ) notifications to any extant advisory connections.

| Argument | Type | Description |
| --- | --- | --- |
| lpszFileNameSaved | LPSTR | the file name to which a Save( ) was previously done. This argument is passed mainly as a convenience to the callee. |
| Return value | HRESULT | S_OK |

IPersistFile::GetCurFile

HRESULT IPersistFile::GetCurFile(lplpszFileName)

This call returns one of two things, depending on whether the document has a currently-ssociated file or not. If it has such a file, then the absolute path name of that file is returned, and S_OK is the function return value. If it has no such file, then the file name prompt that would be used in a As . . . File/Save dialog is returned (just the default prompt for the file name, exclusive of any directory path), and S_FALSE is returned from the function.

| Argument | Type | Description |
| --- | --- | --- |
| lpsFileName | LPSTR | the file to which the document should be saved. May sometimes be NULL; see above. |
| fRemember | BOOL | valid only if lpszFileName is non-NULL. Determines to which disk file the document is to be logically associated after the call completes. |
| return value | HRESULT | S_OK, STG_E_*values, E_FAIL |

| Argument | Type | Description |
| --- | --- | --- |
| lplpszFileName | LPSTR * | the place to return the current path name or the default save prompt of the document, as appropriate for the current object state. |
| return value | HRESULT | S_OK indicates that the return value is a path name; S_FALSE indicates it is the save prompt. E_OUTOFMEMORY, E_FAIL |

IPersistFile::IsDirty

HRESULT IPersistFile::IsDirty( )

Answer whether a save is required in order to avoid information loss resulting from a change in the object that occurred after the last Save(L) to the object's home file. This flag is conditionally cleared in IPersistFile::Save( ).

| Argument | Type | Description |
| --- | --- | --- |
| return value | HRESULT | S_OK, S_FALSE |

Interface Remoting::Remote Procedure Calling and Marshalling

In the Component Object Model, clients communicate with objects solely through the use of vtable-based interface instances. The state of the object is manipulated by invoking functions on those interfaces. For each interface method, the object provides an implementation which does the appropriate manipulation of the object internals.

The underlying goal of interface remoting is to provide infrastructure and mechanisms such that the client and the server objects can in fact be in different processes. Thus, when the client makes a call on an interface of the object, a process transition must be made to the server process, the work carried out, and a return process transition made back to the client process.

A significant subgoal is that this infrastructure be transparent: it must not be the case that either client or object is necessarily aware that the other party is in fact in a different process; the glue that makes this happen must be automatically stuck in the loop at the right time.

The crux of the problem to be addressed in interface remoting can thus be summarized as follows:

"Given an already existing remoted-interface connection between a client process and a server process, how can a method invocation through that connection return a new interface pointer so as to create a second remoted-interface connection between the two processes?"

We state the problem in this way so as to avoid for the moment the issue of how an initial connection is made between the client and the server process; we will return to that later.

Let's look at an example. Suppose we have an object in a server process which supports an interface IFoo, and that interface of the object (and IUnknown) has sometime in the past been remoted to a client process through some means not here specified. In the client process, there is an object proxy which supports the exact same interfaces as does the original server object, but whose implementations of methods in those interfaces are special, in that they forward calls they receive on to calls on the real method implementations back in the server object. We say that the method implementations in the object proxy marshal the data, which is then conveyed to the server process, where it is unmarshalled. That is, "marshalling" refers to the packaging up of method arguments for transmission to a remote process; "unmarshalling" refers to the unpackaging of this data at the receiving end. Notice that in a given call, the method arguments are marshalled and unmarshalled in one direction, while the return values are marshalled and unmarshalled in the other direction.

For concreteness, let us suppose that the IFoo interface is defined as follows:

```
interface IFoo: IUnknown {
    virtual IBar * ReturnABar( ) = 0;
};
```

If in the client process pFoo--22 ReturnABar( ) is invoked, then the object proxy will forward this call on to the IFoo::ReturnABar( ) method in the server object, which will do whatever this method is supposed to do in order to come up with some appropriate IBar*. The server object is then required to return this IBar* back to the client process. The act of doing this will end up creating a second connection between the two processes.

It is the procedure by which this second connection is established which is the subject of our discussion here. This process involves two steps:

1. On the server side, the IBar* is packaged or marshalled into a data packet.

2. The data packet is conveyed by some means to the client process, where the data it contains is unmarshalled to create the new object proxy.

The process begins with the code doing the marshalling of the returned IBar*. This code has in hand a pointer to an interface that it knows in fact to be an IBar*. The first step in marshalling involves finding out whether the object of which this is an interface in fact supports Custom Marshalling. Custom marshalling is a mechanism that permits an object to be in control of creation of remote object proxies to itself. In certain situations, Custom Marshalling can be used to create a more efficient object proxy than would otherwise be the case. Use of Custom Marshalling is completely optional on the object's part; if the object chooses not to support Custom Marshalling, then Standard Marshalling is used to marshal the IBar*. Standard marshalling uses a system-provided object proxy implementation in the client process. This standard object proxy is a generic piece of code; it can be used as the object proxy for any interface on any object. However, the act of marshalling (and unmarshalling) method arguments and return values is inherently interface-specific, since it is highly sensitive to the semantics of the particular methods in question. To accommodate this, the standard object proxy dynamically loads in interface-specific pieces of code as needed in order to do the marshalling.

Let's examine how Custom Marshalling works.

Architecture of Custom Marshalling

Imagine that we are presently in a piece of code whose job it is to marshal an interface pointer that it has in hand. For clarity, in what follows we'll refer to this piece of code as the "original marshalling stub." The general case is that the original marshalling stub does not statically know the particular interface identifier (IID) to which the pointer conforms; the IID may be passed to this code as a second parameter. This is a common paradigm in OLE2. Examples include:

IUnknown::QueryInterfaceInterface(REFIID riid, void** ppvObject);
IOIeltemContainer::GetObject( . . . , REFIID riid, void** ppvObject);
IClassFactory::CreateInstance( . . . , REFIID riid, void** ppvNewlyCreatedObject);

For the moment, let us assume the slightly less general case where the marshalling stub in fact does know a little bit about the IID: in particular, let us assume that it knows that the interface in fact derives from IUnknown (we'll discuss later the situation in which this is not true).

To find out whether the object to which it has an interface supports Custom Marshalling, the original marshalling stub simply does a QueryInterfaceInterface( ) for the interface IMarshal. That is, an object signifies that it wishes to do Custom Marshalling simply by implementing the IMarshal interface. IMarshal is defined as follows:

```
interface IMarshal: IUnknown {
    virtual HRESULT GetUnmarshalClass(iid, pvInterface, dwDestContext, pvDestContext,
        mshlflags, pclsid) = 0;
    virtual HRESULT GetMarshalSizeMax(iid, pvInterface, dwDestContext, pvDestContext,
        mshlflags, pcb) = 0;
    virtual HRESULT MarshalInterface(pstm, iid, pvInterface, dwDestContext,
        pvDestContext, mshlflags) = 0;
    virtual HRESULT UnmarshalInterface(pstm, iid, ppvInterface) = 0;
    virtual HRESULT DisconnectObject(dwReserved) = 0;
    virtual HRESULT ReleaseMarshalData(pstm) = 0;
};
```

The idea is that if the object says "Yes, I do want to do custom Marshalling" that the original marshalling stub will use this interface in order to carry out the task. The sequence of steps that carry this out is:

1. Using GetUnmarshaiClass( ), the original marshalling stub asks the object which kind of (i.e.: which class of) proxy object it would like to have created on its behalf in the client process.

2. (optional) Using GetMarshalSizeMax( ), the stub asks the object how big of a marshalling packet it will need. The object will return an upper bound on the amount of space it will need.

3. The marshalling stub allocates a marshalling packet of appropriate size, then creates an IStream* which points into the buffer. Unless in the previous step the object gave an upper bound on the space needed, the IStream* must be able to grow its underlying buffer dynamically as IStream::Write( ) calls are made.

4. The original marshalling stub asks the object to marshal its data using MarshalInterfaceInterface( ).

We will discuss the methods of this interface in detail in a moment.

At this point, the contents of the memory buffer pointed to by the IStream* together with the class tag returned in step (1) comprises all the information necessary in order to be able to create the proxy object in the client process. It is the nature of remoting and marshalling that "original marshalling stubs" such as we have been discussing know how to communicate with the client process; recall that we are assuming that an initial connection between the two processes has already been established. The marshalling stub now communicates to the client process, by whatever means is appropriate, the class tag and the contents of the memory that contains the marshalled interface pointer. In the client process, the proxy object is created as an instance of the indicated class using the standard Component Object Model instance creation paradigm. IMarshal is used as the initialization interface; the initialization method is IMarshal::UNmarshalInterfaceInterface( ). The unmarshalling process looks something like the following:

```
void ExampleUnmarshal(CLSID& clsidProxyObject, IStream* pstm, IID&
    iidOriginallyMarshalled void** ppvReturn)
{
    IClassFactory* pcf;
    IMarshal* pmsh;
    CoGetClassObject(clsidProxyObject, CLSCTX_INPROC_HANDLER,
        NULL, IID_IClassFactory, (void**)&pcf);
    pcf->CreateInstance(NULL IID_IMarshal, (void**)pmsh);
    pmsh->UnmarshalInterface(pstm, iidOriginallyMarshalled, ppvReturn);
    pmsh->Release( );
    pcf->Release( );
}
```

There are three important reasons why an object may choose to do Custom Marshalling. First, objects which already are proxy objects can use Custom Marshalling to avoid creating proxies to proxies; new proxies are instead short-circuited back to the original server. This is both an important efficiency and an important robustness consideration. Second, object implementations whose whole state is kept in shared memory can often be remoted by creating an object in the client that talks directly to the shared memory rather than back to the original object. This can be a significant performance improvement, since access to the remoted object does not result in context switches. The Compound File implementations of IStorage and IStream are important examples of this use of Custom Marshalling. Third, some objects are of the nature that once they have been created, they are immutable: their internal state does not subsequently change. Many monikers are an example of such objects. These sorts of objects can be efficiently remoted by making independent copies of themselves in client processes. Custom marshalling is the mechanism by which they can do that, yet have no other party be the wiser for it.

However, Custom Marshalling may not be used by OLE2 embeddings; it is intended primarily for other situations such as Monikers, Compound Files, etc. More correctly, Custom Marshalling may not be used by OLE2 embeddings which are not completely implemented in an INPROC_SERVER. This restriction arises because of the fact architecture of how an OLE2 embedding handler, created when the object enters the loaded state, communicates with the Local Server as the running state is entered. It is possible that this restriction may be removed in the future.

Architecture of Standard Marshalling

If the object being remoted does not support Custom Marshalling, signified by the lack of support for IMarshal interface, then Standard Marshalling is used instead. With Standard Marshalling, the actual marshalling and unmarshalling of interface function parameters is handled by the system. However, the object being marshalled is given a second chance to indicate that it would like code that is specifies to run in the client process. Such code would presumably handle some processing locally, but refer the majority of requests back to the original object using the system supplied mechanism.

This is accomplished in the following way. Once the system has been determined that Standard Marshalling is to be used, the object isqueried in order for IStdMarshalInfo and IPersist. If either of these interfaces is supported, then the CLSID returned by invoking the one method contained in each is used to identify the handler that is to be loaded in the client context (see CoGetClassObject( )). The handler of this class must use the standard remoting connection architecture. Presently, this means that such handlers must aggregate in the OLE2 Default Handler, as is described in OleCreateDefaultHandler( ).

If neither of these interfaces is supported, then a vanilla handler which merely remotes all calls back to the original object is used. For components which are not embeddings, this is likely to be the common situation. It corresponds to the classic RPC scenario, where the remote proxy is little more than a forwarder of requests.

IStdMarshalInfo::GetClassForHandler

HRESULT IStdMarshalInfo::GetClassForHandler(dwDestContext, pvDestContext, pClsid)

Retrieves the class identifier used to determine the handler in the destination process that is used in standard marshalling.

Server applications which support class conversion (Activate As in the Convert dialog box) must implement the IStdMarshalInfo interface. Implementation is necessary for the correct handler to be determined in all cases. See also the discussion of Activate As in the chapter on "Persistent Storage for Objects."

the data packet can be retrieved and unmarshalled zero, one, or more times. The Running Object Table and the table maintained by CoRegisterClassObject( ) are examples of this situation. In effect, the marshalled data packet sitting in the table acts very much like another pointer to the object. Depending on the semantics of the table in question, the "data packet pointer" may need to either act as a reference-counted or non-reference-counted pointer to the interface. That is, depending on in which table the object is placed, the presence of the object in the table either does or does not keep the object alive. Further, because of this behavior, we must be careful to have marshalling-specific code execute at the time that these data-packets are removed from these tables and destroyed. We cannot simply throw the packets away, as the presence or absence of the internal state that they maintain may be important to the object that they indicate.

Technically, we address this space of possibilities in the following way. When an interface pointer is marshalled it is told by a parameter for which of the following three reasons it is being marshalled.

1. This is a normal marshal-then-unmarshal-once case.

2. This is a marshal for storing into a global table case, and the presence of the entry in to the table is to count as an additional reference to the interface.

3. This is a marshal for storing into a global table case, and the presence of the entry in to the table is not to count as an additional reference to the interface.

Further, whenever, a Case 2) or Case 3) marshalled-data-packet is removed from the table, it is the responsibility of the table implementor to call CoReleaseMarshalData( ).

Creating an Initial Connection Between Processes

Earlier we said we would later discuss how an initial remoting connection is established between two processes. It is now time to have that discussion.

The real truth of the matter is that the initial connection is established by some means outside of the architecture that we have been discussing here. The minimum that is required is some primitive communication channel between the two processes. As such, we cannot hope to discuss all the possibilities. But we will point out some common ones.

One common approach, used heavily in OLE 2.0, is that initial connections are established just like other connections: an interface pointer is marshalled in the server process, the

| Argument | Type | Description |
| --- | --- | --- |
| dwDestContext | DWORD | The type of destination context to which this object is being passed. |
| pvDestContext | void * | Pointer to the destination context. |
| pClsid | CLSID* | A pointer to where to return the handler's class identifier. |
| return value | HRESULT | S_OK |

Storing Marshalled Interface Pointers in Global Tables

In normal marshalling usage, interface pointers which are marshalled are merely transported across the "wire" to the other side (the other process), where they are unmarshalled. In this usage, the data packet that results from the marshalling process is unmarshalled exactly once. In contrast, there are occasions where we have need to marshal an interface pointer and store it in a globally accessible table. Once in the table, marshalled data packet is ferried the client process, and it is unmarshalled. The only twist is that the ferrying is done by some means other than the RPC mechanism which we've been describing. There are many ways this could be accomplished. Among them are:

The server process could put the packet in some global memory table, from which the client process could retrieve it. In OLE 2.0, examples of this technique include the Running Object Table and the running server table used internally by CoGetClassObject( )/CoRegisterClassObject( ).

The server process could put the data in a file, from which the client process could receive it.

(:-) The server process could print a block of data on the screen, then have the user type the data into the client process.

You get the idea . . .

Another common approach likely to be prevalent in networking situations is that a centralized directory service is used.

Remoting-Related Function Descriptions

The following functions are related to interface remoting:

HRESULT CoMarshalInterface(pstm, riid, pUnk, dwDestContext, pvDestContext, mshlflags);
HRESULT CoUnmarshalInterface(pstm, iid, ppv);
HRESULT CoDisconnectObject(pUnkInterface, dwReserved);
HRESULT CoReleaseMarshalData(pstm);
HRESULT CoGetStandardMarshal(iid, pUnkObject, dwDestContext, pvDestContext,
    mshlflags, ppmarshal);
HRESULT CoMarshalHresult(pstm, hresult);
HRESULT CoUnmarshalHresult(pstm, phresult);
HRESULT CoLockObjectExternal(pUnk, fLock, fLastUnlockReleases);
typedef enum tagMSHLFLAGS {
    MSHLFLAGS_NORMAL = 0,
    MSHLFLAGS_TABLESTRONG = 1,
    MSHLFLAGS_TABLEWEAK = 2,
    }MSHLFLAGS;

CoMarshalInterfaceInterface

HRESULT CoMarshalInterface(pstm, riid, pUnk, dwDestContext, pvDestContext, mshlflags)

Marshal the interface riid on the object on which pUnk is an IUnknown* into the given stream in such a way as it can be reconstituted in the destination using CoUnmarshalInterfaceInterface( ). This is the root level function by which an interface pointer can be marshalled into a stream. It carries out the test for Custom Marshalling, using it if present, and carries out Standard Marshalling if not; This function is normally only called by code in interface proxies or interface stubs that wish to marshal an interface pointer parameter, though it will sometimes also be called by objects which support Custom Marshalling.

This function is, in fact, a helper function in that it carries out nothing internally that is not otherwise publicly available.

Riid indicates the interface on the object which is to be marshalled. It is specifically not the case that pUnk need actually be of interface riid; this function will QueryInterface from pUnk to determine the actual interface pointer to be marshalled.

dwDestContext identifies the execution context relative to the current context in which the unmarshalling will be done. Different marshalling might be done, for example, depending on whether the unmarshal happens on the same workstation vs. on a different workstation on the network; an object could choose to do Custom Marshalling in one case but not the other. The legal values for dwDestContext are taken from the enumeration MSHCTX, which presently contains the following values.

```
tyepdef enum tagMSHCTX {
    MSHCTX_NOSHAREDMEM = 1,
    // only lower most bit is significant
} MSHCTX;
```

These flags have the following meanings.

| Value | Description |
| --- | --- |
| MSHCTX_NOSHAREDMEM | The unmarshalling context does not have shared memory access with the the marshalling context. |

In the future, more MSHCTX flags will be defined, particularly when network-remoting is implemented. pvDestContext is a parameter reserved for the use of future-defined MSHCTX's. ppvDestContext parameters may not be stored in the internal state of custom marshallers.

mslflags indicates the purpose for which the marshal is taking place, as was overviewed in an earlier part of this document. Values for this parameter are taken from the enumeration MSHLFLAGS, and have the following interpretation.

| Value | Description |
| --- | --- |
| MSHLFLAGS_NORMAL | The marshalling is occurring because of the normal case of passing an interface from one process to another. The marshalled-data-packet that results from the call will be transported to |

-continued

| Value | Description |
|---|---|
|  | the other process, where it will be unmarshalled (see CoUnmarshalInterface( )). With this flag, the marshalled data packet will be unmarshalled either one or zero times. CoReleaseMarshalData( ) is always (eventually) called to free the data packet. |
| MSHLFLAGS_TABLESTRONG | The marshalling is occurring because the data-packet is to be stored in a globally-accessible table from which it is to be unmarshalled zero, one, or more times. Further, the presence of the data-packet in the table is to count as a reference on the marshalled interface. When removed from the table, it is the responsibility of the table implementor to call CoReleaseMarshalData( ) on the data-packet. |
| MSHLFLAGS_TABLEWEAK | The marshalling is occurring because the data-packet is to be stored in a globally-accessible table from which it is to be unmarshalled zero, one, or more times. However, the presence of the data-packet in the table is not to count as a reference on the marshalled interface. Destruction of the data-packet is as in the MSHLFLAGS_TABLESTRONG case. |

A consequence of this design is that the marshalled data packet will want to store the value of mshlflags in the marshalled data so as to be able to do the right thing at unmarshal time.

| Argument | Type | Description |
|---|---|---|
| pstm | IStream * | the stream onto which the object should be marshalled. The stream passed to this function must be dynamically growable. In the absence of better information, it is suggested that this stream contain at least MARSHALINTERFACE_MIN bytes of space, though it is by no means guaranteed that this will be sufficient. |
| riid | REFIID | the interface that we wish to marshal. |
| pUnk | IUnknown * | the object on which we wish to marshal the interface riid. |
| dwDestContext | DWORD | the destination context in which the unmarshalling will occur. |
| pvDestContext | void* | related to some TBD destination contexts. |
| mshlflags | DWORD | the reason that the marshalling is taking place. |
| return value | HRESULT | S_OK, STG_E_MEDIUMFULL, E_FAIL |

CoUnmarshalInterface

HRESULT CoUnmarshalInterface(pstm, iid, ppv)

Unmarshal from the given stream an object previously marshalled with CoMarshalInterface( ).

| Argument | Type | Description |
|---|---|---|
| pstm | IStream * | the stream from which the object should be unmarshalled. |
| iid | REFIID | the interface with which we wish to talk to the reconstituted object. |
| ppv | void ** | the place in which we should return the interface pointer. |
| return value | HRESULT | S_OK, E_FAIL |

CoDisconnectObject

HRESULT CoDisconnectObject(pUnkInterface, dwReserved)

This function severs any extant Remote Procedure Call connections that are being maintained on behalf of all the interface pointers on this object. This is a very rude operation, and is not to be used in the normal course of processing; clients of interfaces should use IUnknown::Release( ) instead. In effect, this function is a privileged operation, which should generally only be invoked by the process in which the object actually is managed by the object implementation itself.

The primary purpose of this operation is to give an application process certain and definite control over remoting connections to other processes that may have been made from objects managed by the process. If the application process wishes to exit, then we do not want it to be the case that the extant reference counts from clients of the application's objects in fact keeps the process alive. When the application process wishes to exit, it should inform the extant clients of its objects that the objects are going away. Having so informed its clients, the process can then call this function for each of the objects that it manages, even without waiting for a confirmation from each client. Having thus released resources maintained by the remoting connections, the application process can exit safely and cleanly. In effect, CoDisconnectObject( ) causes a controlled crash of the remoting connections to the object.

For illustration, contrast this with the situation with DDE. If it has extant DDE connections, an application is required to send a DDE Terminate message before exiting, and it is also responsible for waiting around for an acknowledgment from each client before it can actually exit. Thus, if the client process has crashed, the application process will wait around forever. Because of this, with DDE there simply is no way for an application process to reliably and robustly terminate itself. Using CoDisconnectObject( ), we avoid this sort of situation.

| Argument | Type | Description |
|---|---|---|
| pUnkInterface | IUnknown * | the object that we wish to disconnect. May be any interface on the object |

-continued

| Argument | Type | Description |
|---|---|---|
| | | which is polymorphic with IUnknown*, not necessarily the exact interface returned by QueryInterface(IID_IUnknown . . . ). |
| dwReserved | DWORD | reserved for future use; must be zero. |
| return value | HRESULT | S_OK, E_FAIL |

CoReleaseMarshalData

HRESULT CoReleaseMarshalData(pstm)

This helper function destroys a previously marshalled data packet. This function must always be called in order to destroy data packets. Examples of when this occurs include:

1. an internal error during an RPC invocation prevented the UnmarshalInterface( ) operation from being attempted.

2. a marshalled-data-packet was removed from a global table.

3. following a successful, normal, unmarshal call.

This function works as should be expected: the class id is obtained from the stream; an instance is created; IMarshal is obtained from that instance; then IMarshal::ReleaseMarshalData( ) is invoked.

| Argument | Type | Description |
|---|---|---|
| pstm | IStream* | a pointer to a stream that contains the data packet which is to be destroyed |
| return value | HRESULT | S_OK, E_FAIL |

CoGetStandardMarshal

HRESULT CoGetStandardMarshal(idd, pUnkObject, dwDestContext, pvDestContext, mshlflags, ppmarshal)

Return an IMarshal instance that knows how to do the Standard Marshalling and unmarshalling in order to create a proxy in the indicated destination context. Custom marshalling implementations should delegate to the marshaller here returned for destination contexts that they do not fully understand or which for which they choose not to take special action. The standard marshaller is also used in the case that the object being marshalled does not support Custom Marshalling.

| Argument | Type | Description |
|---|---|---|
| iid | REFIID | the interface id we would like to marshal. |
| pUnkObject | IUnknown* | the object that we wish to marshal. It is specifically not the case that this interface is known to be of shape iid; rather, it can be any interface on the object which conforms to IUnknown. The standard marshaller will internally do a QueryInterface( ). |
| dwDestContext | DWORD | the destination context in which the unmarshalling will occur. |
| pvDextContext | void* | associated with the destination context |
| mshlflags | DWORD | the marshal flags for the marshalling operation. |

-continued

| Argument | Type | Description |
|---|---|---|
| ppmarshal | IMarshal ** | the place at which the standard marshaller should be returned. |
| return value | HRESULT | S_OK, E_FAIL |

CoMarshalHresult

SCODE CoMarshalHresult(pstm, hresult)

Marshal an HRESULT to the given stream in such a way as it can be unmarshalled with CoUnmarshalHresult( ). Custom marshallers should use this function when they have need to marshal an HRESULT.

| Argument | Type | Description |
|---|---|---|
| pstm | IStream* | the stream into which the HRESULT is to be marshalled. |
| hresult | HRESULT | the HRESULT to be marshalled. |
| return value | HRESULT | S_OK; errors as in IStream::Write( ). |

CoUnmarshalHresult

SCODE CoUnmarshalHresult(pstm, phresult)

Unmarshal an HRESULT previously marshalled with CoMarshalHresult( ). Custom unmarshallers will want to use this function if the corresponding custom marshaller uses CoMarshalHresult( ).

| Argument | Type | Description |
|---|---|---|
| pstm | IStream* | the stream into which the HRESULT is to be marshalled. |
| phresult | HRESULT* | the place at which the unmarshalled HRESULT is to be returned. |
| return value | HRESULT | S_OK; errors as in IStream::Read( ). |

CoLockObjectExternal

HRESULT CoLockObjectExternal(pUnk, fLock, fLastUnlockReleases)

This function locks an object so that its reference count cannot decrement to zero. It also releases such a lock. From the object's point of view, the lock functionality is implemented by having the system AddRef( ) the object and not Release( ) it until CoLockObjectExternal( . . . , FALSE, . . . ) is later called.

CoLockObjectExternal( ) must be called in the process in which the object actually resides (that is, the server process, not the process in which handlers for the object may be loaded).

The function can be used for the user's reference count as it acts external to the object, much like the user does. It can also be used for the IOIeContainer::LockContainer( ) functionality, although the container must still keep a lock count so that it exits when the lock count reaches zero and the container is invisible.

This function does not in any way change the normal registration/revoking process for objects.

| Argument | Type | Description |
|---|---|---|
| pUnk | IUnknown* | Points to the object to be locked or unlocked. |
| fLock | BOOL | Either locks or unlocks the object. FALSE releases such locks. TRUE holds the object alive (holds a reference to the object) independent of external or internal AddRef/Release operations, or registrations, or revokes. If fLock is TRUE, fLastLockReleases is ignored. |
| fLastLockReleases | | BOOL TRUE means release all pointers to the object if this lock is the last reference to the object which is supposed to hold it alive (there may be other references which are not supposed to hold it alive). |

CoRegisterMessageFilter

HRESULT CoRegisterMessageFilter(lpMessageFilter, lplpMessageFilter)

This function is documented in the chapter on concurrency control.

IMarshal Interface

IMarshal interface is the mechanism by which an object is custom-marshalled. IMarshal is defined as follows:

```
interface IMarshal : IUnknown {
    virtual HRESULT GetUnmarshalClass(iid, pvInterface,
        dwDestContext, pvDestContext, mshlflags, pclsid) = 0;
    virtual HRESULT GetMarshalSizeMax(iid, pvInterface,
        dwDestContext, pvDestContext, mshlflags, pcb) = 0;
    virtual HRESULT MarshalInterface(pstm, iid, pvInterface,
        dwDestContext, pvDestContext, mshlflags) = 0;
    virtual HRESULT UnmarshalInterface(pstm, iid, ppvInterface) = 0;
    virtual HRESULT DisconnectObject(dwReserved) = 0;
    virtual HRESULT ReleaseMarahalData(pstm) = 0;
};
```

The process of Custom Marshalling an interface pointer involves two steps, with an optional third:

1. The code doing the marshalling calls IMarshal::GetUnmarshalClass( ). This returns the class id that will be used to create an uninitialized proxy object in the unmarshalling context.

2. (optional) The marshaller calls IMarshal::GetMarshalSizeMax( ) to learn an upper bound on the amount of memory that will be required by the object to do the marshalling.

3. The marshaller calls IMarshal::MarshalInterface( ) to carry out the marshalling.

The class id and the bits that were marshalled into the stream are then conveyed by appropriate means to the destination, where they are unmarshalled. Unmarshalling involves the following essential steps:

1. Load the class object that corresponds to the class that the server said to use in
GetUnmarshalClass( ).
    IclassFactory* pcf;
    CoGetClassObject(clsid, CLSCTX_HANDLER, IID_IClassFactory, &pcf);

2. Instantiate the class, asking for IMarshal interface;
    IMarshal* proxy;
    pcf->CreateInstance(NULL IID_IMarshal, &proxy);

3. Initialize the proxy with IMarshal::UnmarshalInterface( ) using a copy of the bits that were originally produced by IMarshal::MarshalInterface( ) and asking for the interface that was originally marshalled.
    IOriginal* pobj;
    proxy->UnmarshalInterface(pstm, LID_Original, &pboj);
    proxy->Release( );
    pcf->Release( );

The object proxy is now ready for use.

IMarshal::GetUnmarshalCiass

HRESULT IMarshal::GetUnmarshalClass(iid, pvInterface, dwDestContext, pvDestContext, mshlflags, pclsid)

Answer the class that should be used in the unmarshalling process to create an uninitialized object proxy.

dwDestContext is described in the API function CoMarshalInterface( ). The implementation of GetUnmarshalClass( ) may wish for some destination contexts for which it takes no special action to delegate to the Standard Marshalling implementation, which is available through CoGetStandardMarshal( ). In addition, this delegation should always be done if the dwDestContext parameter contains any flags that the GetUnmarshalClass( ) does not fully understand; it is by this means that we can extend the richness of destination contexts in the future. For example, in the future, one of these bits will likely be defined to indicate that the destination of the marshalling is across the network.

If the caller already has in hand the iid interface identified as being marshalled, he should pass the interface pointer through pvInterface. If he does not have this interface already, then he should pass NULL. This pointer will sometimes, though rarely, be used in order to determine the appropriate unmarshal class. If the IMarshal implementation really needs it, it can always QueryInterface( ) on itself to retrieve the interface pointer; we optionally pass it here only to improve efficiency.

| Argument | Type | Description |
|---|---|---|
| iid | REFIID | the interface on this object that we are going to marshal. |
| pvInterface | void * | the actual pointer that will be marshalled. May be NULL. |
| dwDestContext | DWORD | the destination context relative to the current context in which the unmarshalling will be done. |
| pvDestContext | void* | non-NULL for some dwDestContext values. |
| mshlflags | DWORD | as in CoMarshalInterface( ). |
| pclsid | CLSID * | the class to be used in the unmarshalling process. |
| return value | HRESULT | S_OK, E_FAIL |

IMarshal::MarshalInterface

HRESULT IMarshal::MarshalInterface(pstm, iid, pvInterface, dwDestContext, pvDestContext, mshlflags)

Marshal a reference to the interface iid of this object into the given stream. The interface actually marshalled is the one that would be returned by this->QueryInterface(iid, . . . ). Once the contents of this stream are conveyed to the destination by whatever means, the interface reference can be reconstituted by instantiating with IMarshal interface the class here retrievable with GetUnmarshalClass( ) and then calling IMarshal::UnmarshalInterface( ). The implementation of IMarshal::MarshalInterface( ) writes in the stream any data required for initialization of this proxy.

If the caller already has in hand the iid interface identified as being marshalled, he should pass the interface pointer through pvInterface. If he does not have this interface already, then he should pass NULL; the IMarshal implementation will QueryInterface( ) on itself to retrieve the interface pointer.

On exit from this function, the seek pointer in the stream must be positioned immediately after the last byte of data written to the stream.

| Argument | Type | Description |
| --- | --- | --- |
| pstm | IStream * | the stream onto which the object should be marshalled. |
| iid | REFIID | the interface of this object that we wish to marshal. |
| pvInterface | void * | the actual pointer that will be marshalled. May be NULL. |
| dwDestContext | DWORD | as in CoMarshalInterface( ). |
| pvDestContext | void * | as in CoMarshalInterface( ). |
| mshlflags | DWORD | as in CoMarshalInterface( ). |
| return value | HRESULT | S_OK, STG_E_MEDIUMFULL, E_FAIL |

IMarshal::GetMarshalSizeMax

HRESULT IMarshal::GetMarshalSizeMax(iid, pvInterface, dwDestContext, pvDestContext, mshlflags, pcb)

Return an upper bound on the amount of data that would be written into the marshalling stream in an IMarshal::MarshalInterfaceO stream. Callers can optionally use this value to pre-allocate stream buffers used in the marshalling process. Note that when IMarshal::MarshalInterface( ) is ultimately called, the IMarshal cannot rely on the caller actually having called GetMarshalSizeMax( ) beforehand; it must still be wary of STG_E_MEDIUMFULL errors returned by the stream.

The value returned by this function is only guaranteed to be valid so long as the internal state of the object being marshalled does not change. As a consequence, the actual marshalling should be done immediately after this function returns, or the caller runs the risk that the object requires more memory to marshal that it originally indicated.

An object must return a reasonable maximum size needed for marshalling: callers have the option of allocating a fixed-size marshalling buffer.

| Argument | Type | Description |
| --- | --- | --- |
| iid | REFIID | the interface of this object that we wish to marshal. |
| pvInterface | void * | the actual pointer that will be marshalled. May be NULL. |
| dwDestContext | DWORD | as in CoMarshalInterface( ). |
| pvDestContext | void * | as in CoMarshalInterface( ). |
| mshlflags | DWORD | as in CoMarshalInterface( ). |
| pcb | ULONG * | the place at which the maximum marshal size should be returned. |
| return value | HRESULT | S_OK |

IMarshal::UnmarshalInterface

HRESULT IMarshal::UnmarshalInterface(pstm, iid, ppvInterface)

This is called as part of the unmarshalling process in order to initialize a newly created proxy; see the above sketch of the unmarshalling process for more details.

iid indicates the interface that the caller in fact would like to retrieve from this object; this interface instance is returned through ppvInterface. In order to support this, UnmarshalInterface( ) will often merely do a QueryInterface(iid, ppvInterface) on itself immediately before returning, though it is free to create a different object (an object with a different identity) if it wishes.

On successful exit from this function, the seek pointer must be positioned immediately after the data read from the stream. On error exit, the seek pointer should still be in this location: even in the face of an error, the stream should be positioned as if the unmarshal were successful. See also CoReleaseMarshalData( ).

| Argument | Type | Description |
| --- | --- | --- |
| pstm | IStream * | the stream from which the interface should be unmarshalled. |
| iid | REFIID | the interface that the caller ultimately wants from the object. |
| ppvInterface | void ** | the place at which the interface the caller wants is to be returned. |
| return value | HRESULT | S_OK, E_FAIL |

IMarshal::Disconnect

HRESULT IMarshal::DisconnectObject(dwReserved)

This function is called by the implementation of CoDisconnectObject( ) in the event that the object attempting to be disconnected in fact supports Custom Marshalling. This is completely analogous to how CoMarshalInterface( ) defers to IMarshal::MarshalInterface( ) in if the object supports IMarshal.

| Argument | Type | Description |
| --- | --- | --- |
| dwReserved | DWORD | as in CoDisconnectObject( ). |
| return value | HRESULT | as in CoDisconnectObject( ). |

IMarshal::ReleaseMarshalData

HRESULT IMarshal::ReleaseMarshalData(pstm)

This function is called by CoReleaseMarshalData( ) in order to actually carry out the destruction of a marshalled-data-packet. See that function for more details.

Note that whereas the IMarshal methods

GetUmarshalCiass

GetMarshalSizeMax

MarshalInterface

Disconnect are always called on the IMarshal interface instance in the originating side (server side), the method UnmarshalInterface is called on the receiving (client) side. (This should be no surprise.) However, the function ReleaseMarshalData (when needed) will be called on the receiving (client) side if the appropriate IMarshal instance can be successfully created there; otherwise, it is invoked on the originating (server) side.

| Argument | Type | Description |
| --- | --- | --- |
| pstm | IStream* | as in CoReleaseMarshalData( ). |
| return value | HRESULT | as in CoReleaseMarshalData( ). |

Although the present invention has been described in terms of preferred embodiments, it is not intended that the invention be limited to these embodiments. Modifications within the spirit of the invention will be apparent to those skilled in the art. The scope of the present invention is defined by the claims which follow.

The invention claimed is:

1. A computer-implemented method of retrieving server object data in a compound document, the method comprising:
   instantiating an identifier object for accessing server object data in a compound document, the server object data indicated within the compound document by a reference that includes a name and a first code identifier specifying first code that implements the identifier object;
   loading, for the identifier object, persistent data for the name, the name including a second code identifier specifying second code that implements a server object;
   instantiating the server object that the second code implements; and
   providing to a client a pointer to an interface of the server object.

2. The method of claim 1 wherein the identifier object implements a moniker interface.

3. The method of claim 1 wherein the first code identifier specifies an identifier object class.

4. The method of claim 1 further comprising, for the server object, loading the server object data from persistent storage.

5. The method of claim 1 wherein the identifier object is a composite identifier object with a file identifier object and an item identifier object.

6. The method of claim 1 further comprising persistently storing the name and the first code identifier for the reference in storage for the compound document.

7. The method of claim 1 wherein the second code identifier is a suffix associated with a class identifier for the server object.

8. The method of claim 1 further comprising, before the instantiating the identifier object, receiving a request from the client to access the server object data in the compound document.

9. The method of claim 1 wherein the compound document is a word processing document and the server object data is spreadsheet data or chart data.

10. The method of claim 1 wherein the client is a word processing program and the server object is a spreadsheet object or chart object.

11. A computer-readable medium storing computer-executable instructions for causing a computer system programmed thereby to perform a method of retrieving server object data in a compound document, the method comprising:
    instantiating an identifier object for accessing server object data in a compound document, the server object data indicated within the compound document by a reference that includes a name and a class identifier for the identifier object;
    loading, for the identifier object, persistent data for the name, the name including a suffix associated with a class identifier for a server object;
    instantiating the server object; and
    providing to a client a pointer to an interface of the server object.

12. The computer-readable medium of claim 11 wherein the identifier object implements a moniker interface.

13. The computer-readable medium of claim 11 wherein the method further comprises, before the instantiating the identifier object, receiving a request from the client to access the server object data in the compound document.

14. The computer-readable medium of claim 11 wherein the method further comprises, for the server object, loading the server object data from persistent storage.

15. The computer-readable medium of claim 11 further comprising persistently storing the name and the class identifier for the reference in storage for the compound document.

16. The computer-readable medium of claim 11 wherein the compound document is a word processing document and the server object data is spreadsheet data or chart data.

17. A computer-readable medium storing computer-executable instructions for causing a computer system programmed thereby to perform a method of retrieving server object data in a compound document, the method comprising:
    instantiating a moniker for accessing server object data in a compound document, the server object data indicated within the compound document by a reference that includes a name and a first code identifier specifying first code that implements the moniker;
    loading, for the moniker, persistent data for the name, the name including a second code identifier specifying second code that implements a server object;
    instantiating the server object that the second code implements; and
    providing to a client a pointer to an interface of the server object.

18. The computer-readable medium of claim 17 wherein the first code identifier is a class identifier for the moniker and the second code identifier is a suffix associated with a class identifier for the server object.

19. The computer-readable medium of claim 17 wherein the method further comprises persistently storing the name and the first code identifier for the reference in storage for the compound document.

20. The computer-readable medium of claim 17 wherein the client is a word processing program and the server object is a spreadsheet object or chart object.

* * * * *